(12) United States Patent
Tseng et al.

(10) Patent No.: US 12,061,378 B2
(45) Date of Patent: Aug. 13, 2024

(54) PHOTOGRAPHING OPTICAL LENS ASSEMBLY, IMAGING APPARATUS AND ELECTRONIC DEVICE

(71) Applicant: LARGAN PRECISION CO., LTD., Taichung (TW)

(72) Inventors: Yu-Tai Tseng, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 339 days.

(21) Appl. No.: 17/088,995

(22) Filed: Nov. 4, 2020

(65) Prior Publication Data

US 2021/0396959 A1     Dec. 23, 2021

(30) Foreign Application Priority Data

Jun. 20, 2020   (TW) ................. 109120974

(51) Int. Cl.
| | | |
|---|---|---|
| G02B 9/64 | (2006.01) | |
| G02B 3/04 | (2006.01) | |
| G02B 7/09 | (2021.01) | |
| G02B 7/10 | (2021.01) | |
| H04N 23/55 | (2023.01) | |

(52) U.S. Cl.
CPC ............. G02B 9/64 (2013.01); G02B 3/04 (2013.01); G02B 7/09 (2013.01); G02B 7/10 (2013.01); H04N 23/55 (2023.01)

(58) Field of Classification Search
CPC ... G02B 3/04; G02B 7/09; G02B 7/10; G02B 9/64; G02B 7/08; G02B 13/18; G02B 27/0012; G02B 27/646; G02B 13/0045; G02B 1/041; G02B 13/009; G02B 15/16; G02B 15/14; G02B 15/20; G02B 27/00; G02B 27/64; G02B 13/00; G02B 1/04; G02B 3/00; G02B 7/00; H04N 23/55
USPC ........ 359/676, 708, 750, 751, 755, 754, 819
See application file for complete search history.

(56) References Cited

U.S. PATENT DOCUMENTS

| | | | |
|---|---|---|---|
| 11,477,386 B2 * | 10/2022 | Shabtay | ............. G02B 13/0065 |
| 2008/0151390 A1 | 6/2008 | Li | |
| 2011/0188131 A1 | 8/2011 | Sano | |
| 2011/0273611 A1 | 11/2011 | Matsusaka et al. | |
| 2013/0016261 A1 | 1/2013 | Tanaka et al. | |

(Continued)

FOREIGN PATENT DOCUMENTS

| | | |
|---|---|---|
| CN | 109212729 A | 1/2019 |
| TW | 201539028 A | 10/2015 |

*Primary Examiner* — Thomas K Pham
*Assistant Examiner* — Kuei-Jen L Edenfield
(74) *Attorney, Agent, or Firm* — Locke Lord LLP; Tim Tingkang Xia, Esq.

(57) ABSTRACT

An imaging apparatus includes a photographing optical lens assembly and an image sensor. The photographing optical lens assembly includes a plurality of lens elements. The plurality of lens elements includes, in order from an object side to an image side, a first lens element, a second lens element and a last lens element. Each of the lens elements has an object-side surface facing the object side and an image-side surface facing the image side. At least one of the lens elements is plastic and at least one of the lens elements has at least one inflection point. There is at least one variable axial distance between adjacent lens elements thereof.

23 Claims, 31 Drawing Sheets

(56) References Cited

U.S. PATENT DOCUMENTS

| | | | |
|---|---|---|---|
| 2013/0265649 A1* | 10/2013 | Ohashi | G02B 15/1421 |
| | | | 359/692 |
| 2014/0307332 A1 | 10/2014 | Yoneyama | |
| 2014/0313395 A1 | 10/2014 | Lee | |
| 2015/0029385 A1 | 1/2015 | Lee | |
| 2015/0109485 A1 | 4/2015 | Ozaki et al. | |
| 2015/0138425 A1 | 5/2015 | Lee et al. | |
| 2015/0253543 A1 | 9/2015 | Mercado | |
| 2016/0124191 A1* | 5/2016 | Hashimoto | G02B 9/64 |
| | | | 359/708 |
| 2017/0031137 A1 | 2/2017 | Shi | |
| 2017/0351064 A1* | 12/2017 | Chang | G02B 9/60 |
| 2018/0335609 A1* | 11/2018 | Chang | G02B 13/18 |
| 2019/0004286 A1 | 1/2019 | Heu et al. | |
| 2020/0209593 A1* | 7/2020 | Hirano | G02B 9/64 |
| 2021/0055517 A1* | 2/2021 | Li | G02B 13/0045 |

\* cited by examiner

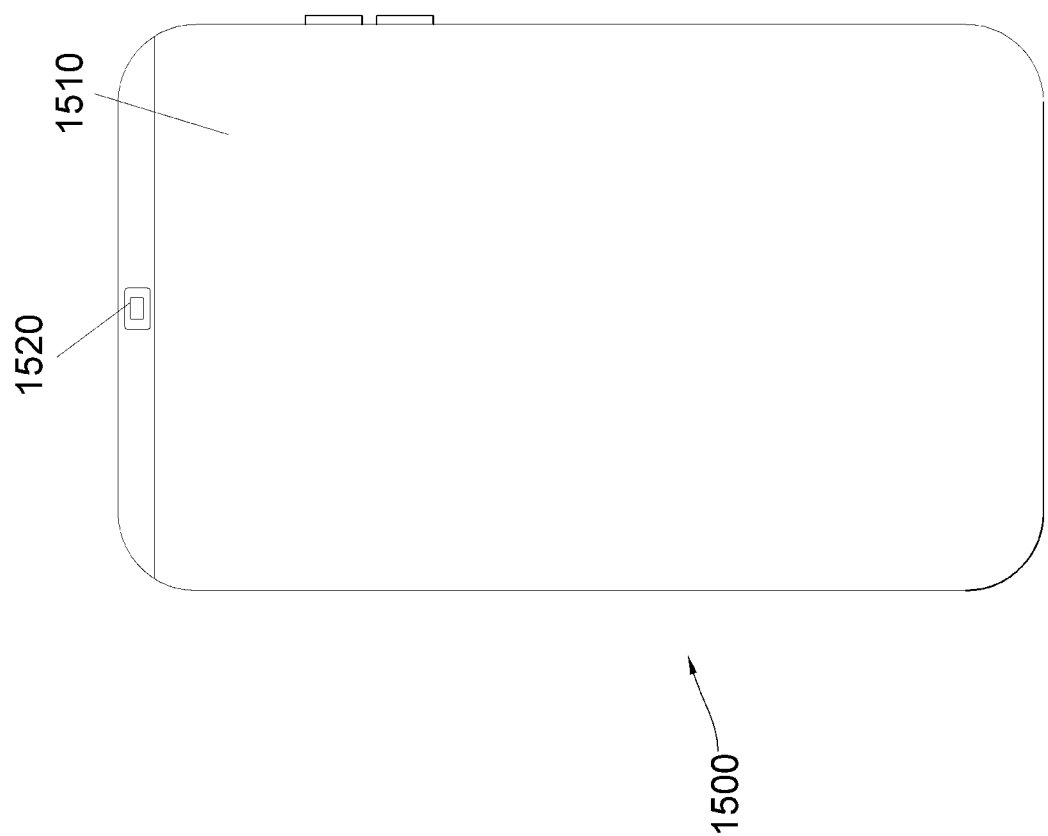

PHOTOGRAPHING OPTICAL LENS ASSEMBLY, IMAGING APPARATUS AND ELECTRONIC DEVICE

RELATED APPLICATIONS

This application claims priority to Taiwan Application Serial Number 109120974, filed on Jun. 20, 2020, which is incorporated by reference herein in its entirety.

BACKGROUND

Technical Field

The present disclosure relates to a photographing optical lens assembly and an imaging apparatus, and more particularly, to a photographing optical lens assembly and an imaging apparatus applicable to electronic devices.

Description of Related Art

With the advancement of semiconductor manufacturing technology, performances of image sensors have been improved, and the pixels have been reduced to an even smaller size, while the size of the image sensors is also increased. Therefore, imaging optical systems with high image quality along with improved image sensors have become an indispensable part of modern electronic devices.

With the rapid development of technology, applications of electronic devices equipped with imaging optical systems increase significantly, and the requirements for optical lens assemblies are more diverse. However, for the conventional imaging optical system, it is difficult to meet the needs of close-up shots and long shots simultaneously, and to balance the requirements such as sensitivity, aperture size, volume or viewing angle. Therefore, there is a need for an optical lens assembly to obtain an image with good quality in the center region and peripheral region thereof even under different imaging scenarios, to meet market demands.

SUMMARY

According to one aspect of the present disclosure, an imaging apparatus comprises a photographing optical lens assembly and an image sensor. The photographing optical lens assembly comprises a plurality of lens elements. The plurality of lens elements comprise, in order from an object side to an image side, a first lens element, a second lens element and a last lens element. Each of the lens elements has an object-side surface facing the object side and an image-side surface facing the image side. The image sensor is disposed on the image side of the last lens element. At least one of the lens elements is plastic, and at least one of the lens elements comprises at least one inflection point. There is at least one variable axial distance between two adjacent lens elements thereof.

The photographing optical lens assembly comprises an object distance between an imaged object and the object-side surface of the first lens element; when the object distance is infinite, an axial distance between the object-side surface of the first lens element and the image sensor is TLinf, a focal length of the photographing optical lens assembly is finf, and the variable axial distance is ATinf; when the object distance is 500 mm, the axial distance between the object-side surface of the first lens element and the image sensor is TLmacro, and the variable axial distance is ATmacro; a minimum among Abbe numbers of the lens elements of the photographing optical lens assembly is Vdmin, and the following conditions are satisfied:

$0.60 < TLinf/finf < 2.50;$ $10.0 < Vdmin < 28.0;$ and $0.05 < |ATinf - ATmacro|/(TLinf - TLmacro)| < 0.80.$ According to one aspect of the present disclosure, an imaging apparatus comprises a photographing optical lens assembly, an image sensor, a first driving device and a second driving device. The photographing optical lens assembly comprises a plurality of lens elements, and each of the lens elements has an object-side surface facing an object side and an image-side surface facing an image side. The plurality of lens elements comprises, in order from the object side to the image side, a first lens element, a second lens element and a last lens element. At least one of the lens elements is plastic. At least one of the lens elements comprises at least one inflection point. There is at least one variable axial distance between two adjacent lens elements thereof. The at least one variable axial distance can change due to at least one of the adjacent lens elements moved by the second driving device.

The photographing optical lens assembly comprises an object distance between an imaged object and the object-side surface of the first lens element; when the object distance is infinite, an axial distance between the object-side surface of the first lens element and the image sensor is TLinf, and a focal length of the photographing optical lens assembly is finf; a minimum among Abbe numbers of the lens elements of the photographing optical lens assembly is Vdmin, and the following conditions are satisfied:

$0.60 < TLinf/finf < 2.50;$ and $10.0 < Vdmin < 21.0.$

According to another aspect of the present disclosure, an electronic device comprises at least two imaging apparatuses facing a same side. The at least two imaging apparatuses comprise, a first imaging apparatus comprising the aforementioned imaging apparatus with the aforementioned photographing optical lens assembly, and a second imaging apparatus comprising an optical lens assembly and an image sensor. A field of view of the first imaging apparatus differs from a field of view of the second imaging apparatus by at least 30 degrees.

BRIEF DESCRIPTION OF THE DRAWINGS

FIG. 15A is a front view of the electronic device according to the 11th embodiment of the present disclosure;

DETAILED DESCRIPTION

Figure 1A:
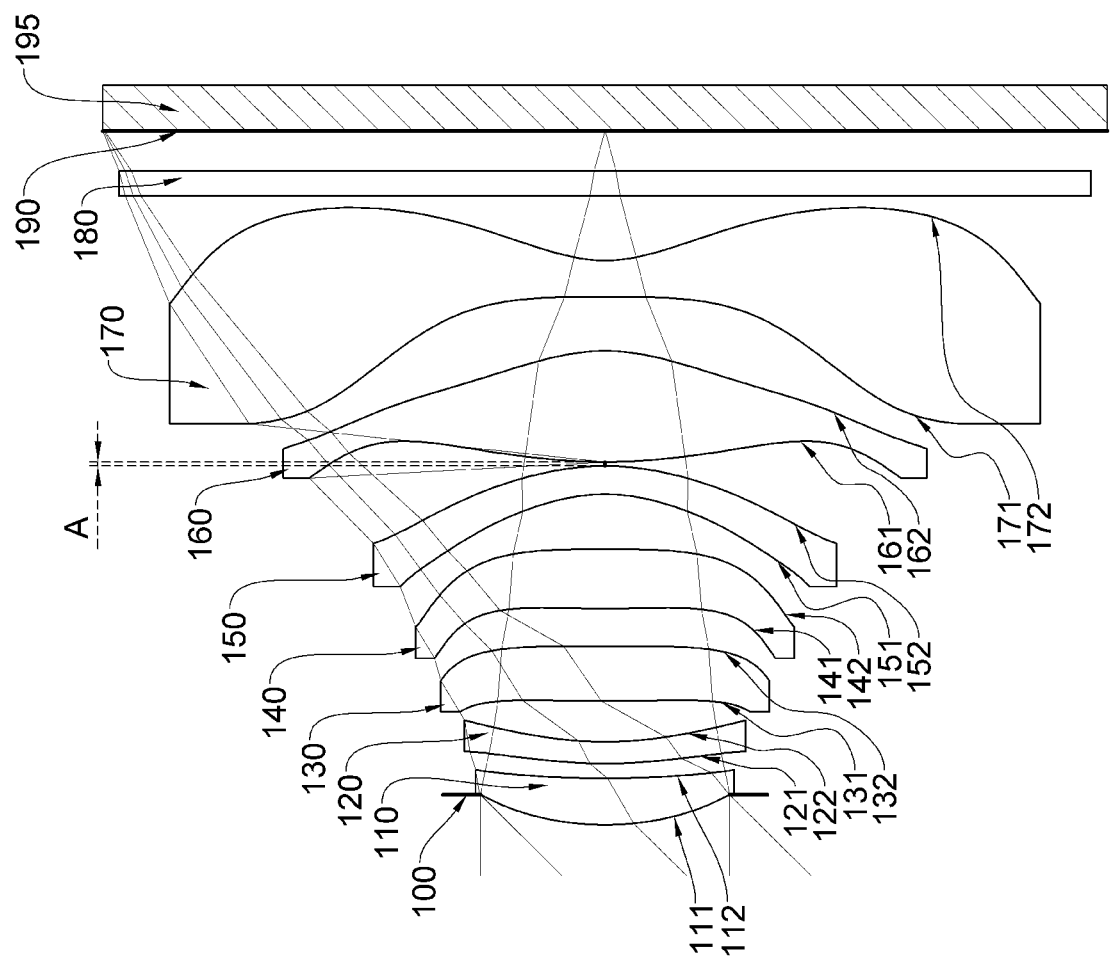
FIG. 1A is a schematic view of an imaging apparatus according to the 1st embodiment of the present disclosure.

The present disclosure provides an imaging apparatus including a photographing optical lens assembly and an image sensor. The photographing optical lens assembly includes a plurality of lens elements. Each of the lens elements has an object-side surface facing an object side and an image-side surface facing an image side. The plurality of lens elements includes, in order from the object side to the image side, a first lens element, a second lens element and a last lens element. At least one of the lens elements is made of plastic to reduce manufacturing costs, increase the lens design freedom, and optimize off-axis aberration corrections. At least one of the lens elements has at least one inflection point to correct field curvature, allow miniaturization, and flatten the Petzval surface of the imaging apparatus. There is at least one variable axial distance between two adjacent lens elements thereof, and the at least one variable axial distance is changeable. The image blur in the peripheral region thereof may be corrected by adjusting the at least one variable axial distance.

The first lens element has positive refractive power for providing significant converging power to improve compactness and miniaturization of the imaging apparatus. The second lens element has negative refractive power to balance astigmatism caused from the first lens element, thereby correcting spherical and chromatic aberrations. The last lens element has negative refractive power to provide a miniaturized module to reduce the size of the imaging apparatus. The image-side surface of the last lens element is concave in a paraxial region thereof and comprises a convex critical point in an off-axial region thereof, which is beneficial to correct off-axis aberrations and reduce the size of the photographing optical lens assembly.

When the object distance is infinite, the axial distance between the object-side surface of the first lens element and the image sensor is TLinf, and the focal length of the photographing optical lens assembly is finf. When the following condition is satisfied: 0.60<TLinf/finf<2.50, it is favorable for balancing the total track length and the field of view of the photographing optical lens assembly to meet the specification requirements. Moreover, the following condition can be satisfied: 0.70<TLinf/finf<1.80. Moreover, the following condition can be satisfied: 0.80<TLinf/finf<1.50.

A minimum among Abbe numbers of the lens elements of the photographing optical lens assembly is Vdmin. When the following condition is satisfied: 10.0<Vdmin<28.0, the optical path of the photographing optical lens assembly can be adjusted to balance the light convergence among different wavelengths for correcting chromatic aberration. Moreover, the following condition can be satisfied: 10.0<Vdmin<21.0. Moreover, the following condition can be satisfied: 12.0<Vdmin<20.0. Moreover, the following condition can be satisfied: 13.0<Vdmin<19.0.

When the object distance is infinite, the axial distance between the object-side surface of the first lens element and the image sensor is TLinf, and the at least one variable axial distance is ATinf. When the object distance is 500 mm, the axial distance between the object-side surface of the first lens element and the image sensor is TLmacro, and the at least one variable axial distance is ATmacro. When the following condition is satisfied: 0.05<(ATinf−ATmacro)/(TLinf−TLmacro)|<0.80, the central and peripheral regions of the image can be independently corrected in close-up and long shot settings.

A maximum among refractive indexes of the lens elements of the photographing optical lens assembly is Nmax. When the following condition is satisfied: 1.665<Nmax<1.780, it is favorable for providing sufficient refractive power in the optical path while controlling the costs and the yields of the lens elements. Moreover, the following condition can be satisfied: 1.680<Nmax<1.720.

When the object distance is infinite, the focal length of the photographing optical lens assembly is finf, and an entrance pupil diameter of the photographing optical lens assembly is EPDinf. When the following condition is satisfied: 1.20<finf/EPDinf<2.0, it is favorable for adjusting the aperture of the photographing lens system so as to maintain sufficient incoming light with improved image brightness. Moreover, the following condition can be satisfied: 1.30<finf/EPDinf<1.90.

When the object distance is infinite, the at least one variable axial distance is ATinf. When the object distance is 500 mm, the at least one variable axial distance is ATmacro. A minimum among the central thicknesses of the lens elements of the photographing optical lens assembly is CTmin. When the following condition is satisfied: 0.01<|ATinf−ATmacro|/CTmin<0.50, the variable axial distance and the thickness of the lens elements can be controlled to ensure a good balance between the molding of the lens elements and yields of the photographing optical lens assembly.

When the object distance is infinite, half of a maximum field of view of the photographing optical lens assembly is HFOVinf. When the object distance is 500 mm (in macro mode), half of a maximum field of view of the photographing optical lens assembly is HFOVmacro. When the following conditions are satisfied: 35.0 degrees<HFOVinf<65.0 degrees and 35.0 degrees<HFOVmacro<65.0 degrees, it can ensure an appropriate image-capturing range to provide sufficient image data, while avoiding excessive distortion caused by an overly large view angle. Moreover, the following condition can be satisfied: 40.0 degrees<HFOVinf<55.0 degrees; 40.0 degrees<HFOVmacro<55.0 degrees.

When the object distance is infinite, the axial distance between the aperture stop and the image surface is SLinf, the axial distance between the object-side surface of the first lens element and the image sensor is TLinf. When the following condition is satisfied: 0.70<SLinf/TLinf<1.0, it is favorable for positioning the aperture stop to control the size of the photographing optical lens assembly. Moreover, the following condition can be satisfied: 0.80<SLinf/TLinf<0.97.

A sum of central thicknesses of the plurality of lens elements is ΣCT. When the object distance is infinite, the axial distance between the object-side surface of the first lens element and the image sensor is TLinf. When the following condition is satisfied: 0.48<ΣCT/TLinf<0.80, space can be fully utilized to facilitate the miniaturization of the photographing optical lens assembly.

A maximal image height of the photographing optical lens assembly is ImgH. When the following condition is satisfied: 5.20 mm<ImgH<10.0 mm, a sufficient light-receiving area can be ensured for image brightness and specification requirements. Moreover, the following condition can be satisfied: 6.0 mm<ImgH<8.5 mm.

When the object distance is infinite, the axial distance between the object-side surface of the first lens element and the image sensor is TLinf; and a maximal image height of the photographing optical lens assembly is ImgH. When the following condition is satisfied: 1.0<TLinf/ImgH<1.80, the total track length of the photographing optical lens assembly can be compressed while providing sufficient light-receiving area to avoid image vignetting. Moreover, the following condition can be satisfied: 1.0<TLinf/ImgH<1.50. Moreover, the following condition can be satisfied: 1.0<TLinf/ImgH<1.30.

When the object distance is infinite, the at least one variable axial distance is ATinf, the axial distance between the object-side surface of the first lens element and the image sensor is BLinf, the focal length of the photographing optical lens assembly is finf; when the object distance is 500 mm, the at least one variable axial distance is ATmacro, the axial distance between the object-side surface of the first lens element and the image sensor is BLmacro; a maximal image height of the photographing optical lens assembly is ImgH. When the following condition is satisfied: 0.07<|ATinf−ATmacro|/(BLinf−BLmacro)|<0.90, close-up and long shots can produce good image quality by adjusting the distance between the lens elements and the image sensor as well as the axial distances between the lens elements. When the following condition is satisfied: 0.72<ImgH/finf<1.80, a favorable field of view of the photographing optical lens assembly can meet the requirements of modern devices.

A maximal image height of the photographing optical lens assembly is ImgH; when the object distance is infinite, the axial distance between the image-side surface of the last lens element and the image sensor is BLinf. When the following condition is satisfied: 3.70<ImgH/BLinf<10.0, it is favorable to reduce the size of the photographing optical lens assembly, while having a sufficient light-receiving range. Moreover, the following condition can be satisfied: 5.0<ImgH/BLinf<10.0.

The imaging apparatus includes a first driving device and a second driving device, which can move different lens elements of the imaging apparatus with different displacements under different imaging scenarios.

An Abbe number of a lens element of the photographing optical lens assembly is V. When at least two lens elements in the photographing optical lens assembly satisfy V<20.0, the materials of the lens elements can provide sufficient control to adjust the focusing positions of different wavelengths and to avoid image overlaps.

There can be only one variable axial distance in the photographing optical lens assembly. It is favorable for providing high image quality at the close-up and long shots while avoiding over-complicated mechanism, which can lead to increased costs and reduced yields.

The photographing optical lens assembly can include at least seven lens elements, and a variable axial distance is located on the image side of the sixth lens element, so that adjustments of the axial distance between the lens elements thereof are allocated near the imaging surface, which can correct aberrations in different fields of view to improve image quality in the peripheral region thereof. The photographing optical lens assembly can comprise at least seven and at most ten lens elements, which can effectively balance the size and image quality of the photographing optical lens assembly.

In another imaging apparatus, a maximum effective radius of the object-side surface of the first lens element is Y11, a maximum effective radius of the image-side surface of the last lens element is Ylast. When the following condition is satisfied: 0.10<Y11/Ylast<0.50, the size ratio of the first lens element to the last lens element can be controlled to balance the lens aperture and the size of the photographing optical lens assembly.

When the object distance is infinite, the axial distance between the object-side surface of the first lens element and the image sensor is TLinf. When the following condition is satisfied: 3.0 mm<TLinf<15.0 mm, the size of the photographing optical lens assembly can be controlled to avoid being excessively large. Moreover, the following condition can be satisfied: 5.0 mm<TLinf<11.0 mm.

In another imaging apparatus, a maximum among the axial distances between adjacent lens elements is the axial distance between two lens elements closest to the image sensor. By having aspheric lens surfaces in the photographing optical lens assembly, it is favorable for balancing the difference between the optical path lengths of the center and peripheral fields near the image side, thereby correcting astigmatism.

In another imaging apparatus, the first driving device is for correcting the central region of the image, and the second driving device is for correcting the peripheral region of the image. Different driving devices are utilized independently for correcting different parts of the imaging apparatus to improve image quality.

Another imaging apparatus includes an optical image stabilization device, which can enhance the user experience by reducing the device shake and the impact on images thereof.

In another imaging apparatus, there is a driving device comprising shape memory alloys or piezoelectric materials, which can simplify the device structure and reduce the probability of errors during operations.

In another imaging apparatus, when the first driving device is actuated, the axial distance between the adjacent lens elements is unchanged, which can correct astigmatism near the optical axis. Furthermore, the image sensor can have at least 50 million pixels, which can provide higher image resolution. Moreover, the image sensor can have 100 million or more pixels.

In another imaging apparatus, when the second driving device is actuated, the axial distance between the adjacent lens elements changes, which can correct astigmatism of the image periphery. When the object distance is infinite, the at least one variable axial distance is ATinf; when the object distance is 500 mm, the at least one variable axial distance is ATmacro; when the following condition is satisfied: 0.07 mm<(ATinf-ATmacro)|*10<1.0 mm, the displacement of movable lens elements can be well controlled to effectively correct astigmatism of the image periphery.

In another imaging apparatus, when the first driving device is actuated, the second driving device is also driven to move, which can simplify the design of the lens mechanism to improve the concentricity and avoid the deviation of the axes of the lens elements, which leads to blurred images.

The present disclosure provides an electronic device including at least two imaging apparatuses facing the same side. The at least two imaging apparatuses includes a first imaging apparatus comprising the aforementioned imaging apparatus and a second imaging apparatus comprising an optical lens assembly and an image sensor. The field of view of the first imaging apparatus differs from the field of view of the second imaging apparatus by at least 30 degrees to provide images with different ranges of view and different degree of details to satisfy use diversity.

Figure 10A:
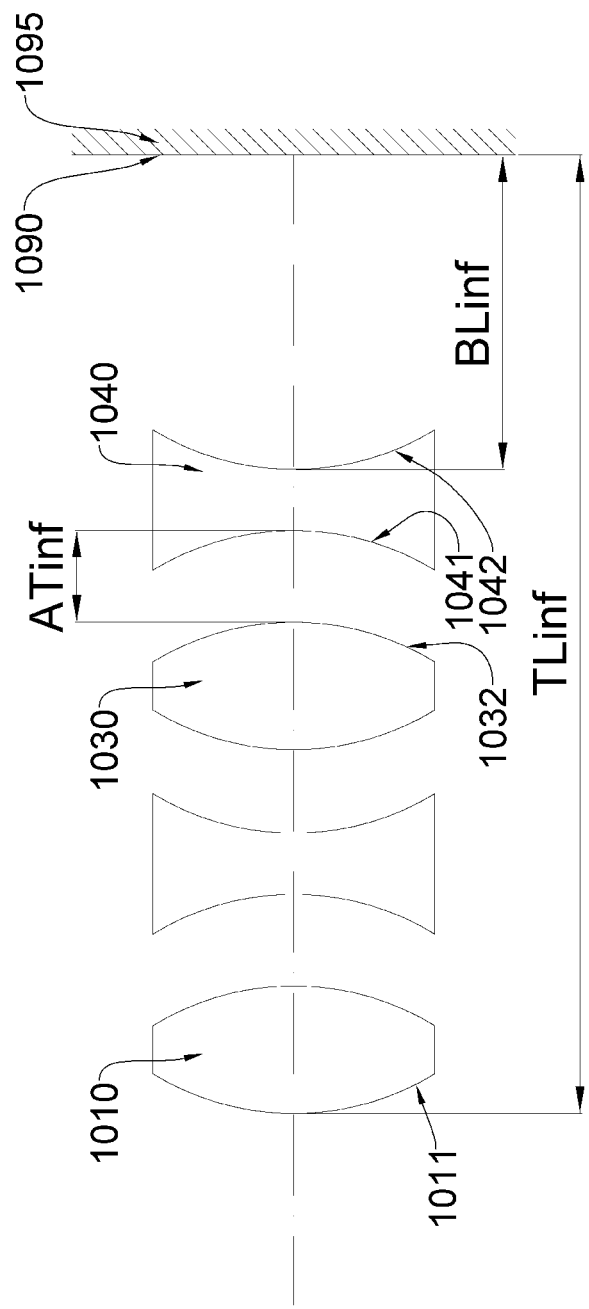
FIG. 10A is a schematic view showing the parameters ATinf, BLinf and TLinf of the present disclosure when the object distance is infinite.

Please refer to FIG. 10A, which illustrates a schematic diagram of the axial distance between the adjacent lens elements and the distance between the lens element and the image sensor when the object distance is infinite; wherein the axial distance between the image-side surface 1032 of the third lens element 1030 and the object-side surface 1041 of the fourth lens element 1040 is a variable axial distance ATinf, the axial distance between the image-side surface 1042 of the fourth lens element 1040 and the image sensor 1095 is BLinf, the axial distance between the object-side surface 1011 of the first lens element 1010 and the image sensor 1095 is TLinf.

Figure 10B:
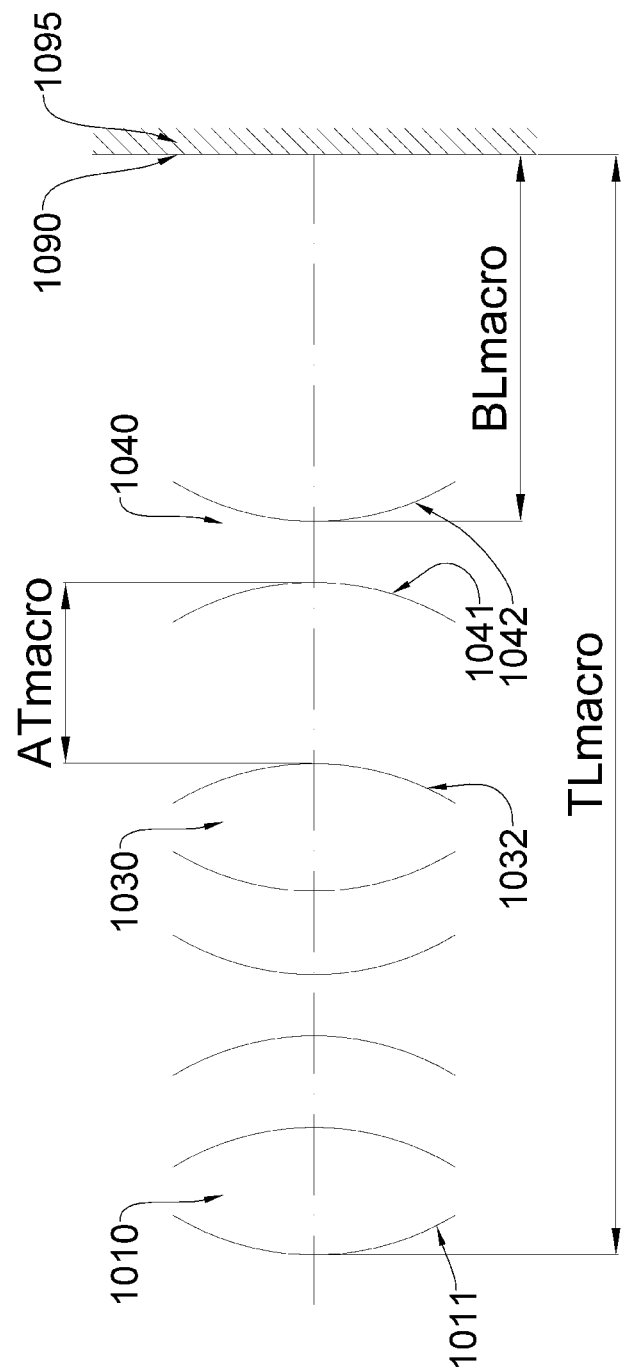
FIG. 10B is a schematic view showing the parameters ATmacro, BLmacro and TLmacro of the present disclosure when the object distance is 500 mm.

Please refer to FIG. 10B, which illustrates a schematic diagram of the axial distance between the adjacent lens elements and the distance between the lens element and the image sensor when the object distance is 500 mm (macro mode); wherein the axial distance between the image-side surface 1032 of the third lens element 1030 and the object-side surface 1041 of the fourth lens element 1040 is a variable axial distance ATmacro, the axial distance between the image-side surface 1042 of the fourth lens element 1040 and the image sensor 1095 is BLmacro, the axial distance between the object-side surface 1011 of the first lens element 1010 and the image sensor 1095 is TLmacro. When the imaging apparatus of the present invention changes its object distance between infinity mode and macro mode, the variable axial distances (ATinf, ATmacro) will correspondingly change while the axial distance between other lens elements will remain unchanged.

Figure 11A:
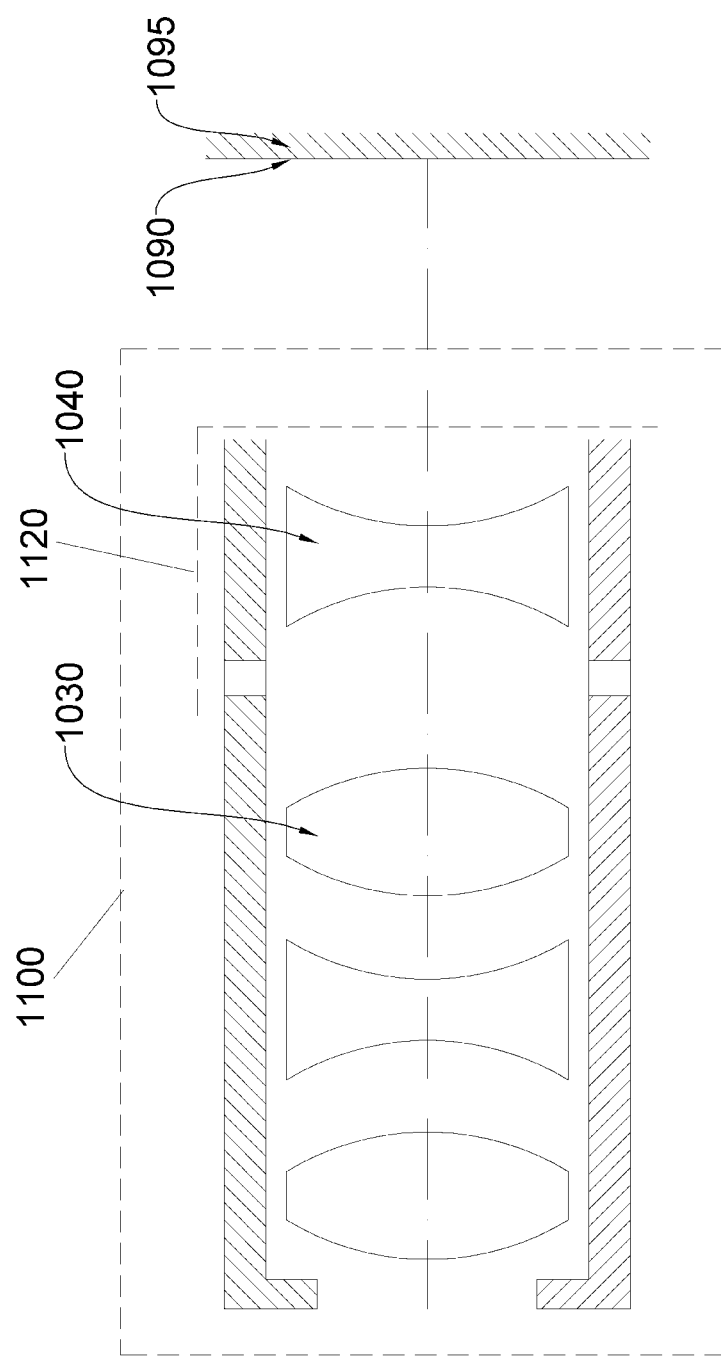
FIG. 11A is a schematic view of the first driving device and the second driving device of the imaging apparatus of the present disclosure.

Please refer to FIG. 11A, which illustrates a schematic diagram of the relationship between the driving devices and the lens elements of the imaging apparatus of the present invention. The second driving device 1120 is attached to the first driving device 1100 and can be used for fine adjustments with some of the lens elements (such as the fourth lens element 1040) to change the axial distance between the third lens element 1030 and the fourth lens element 1040. It can be realized with only one lens barrel, but it is not limited thereto.

Figure 11B:
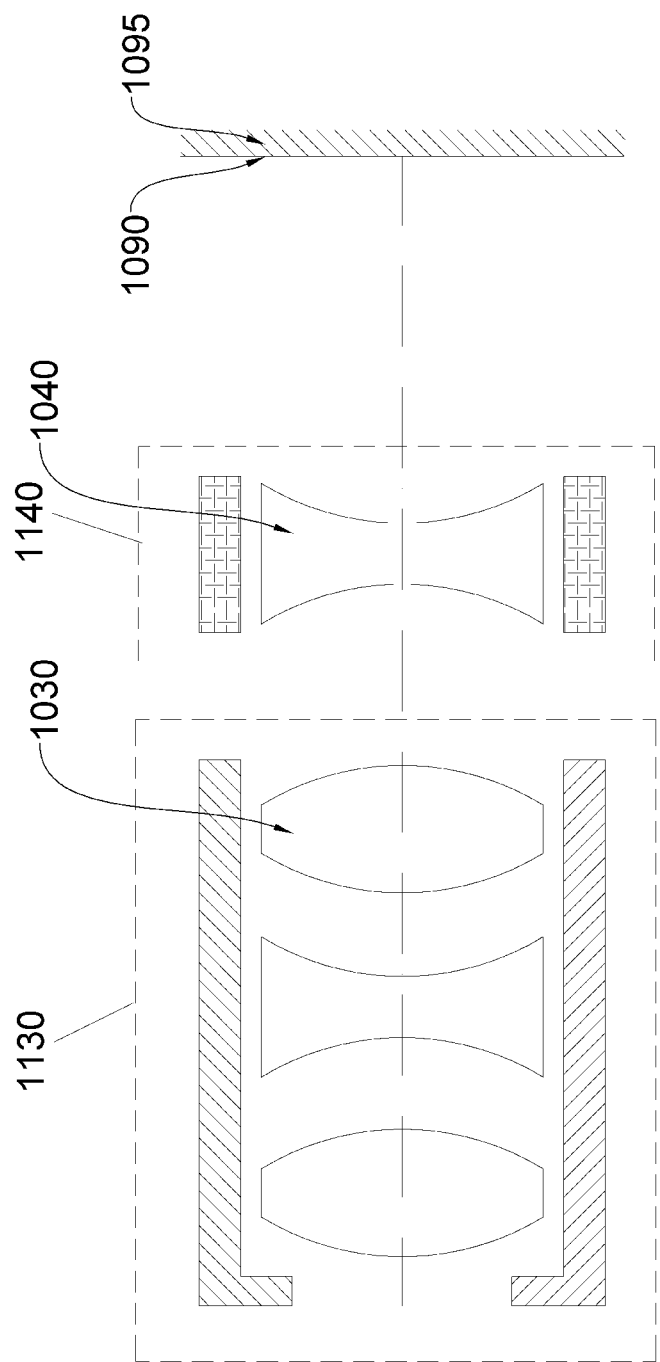
FIG. 11B is a schematic view of another first driving device and second driving device of the imaging apparatus of the present disclosure.

Please refer to FIG. 11B, which illustrates a schematic diagram of the relationship between the driving devices and the lens elements of the imaging apparatus of the present invention. The first driving device 1130 and the second driving device 1140 operate independently. The part driven by the first driving device 1130 (such as the third lens element 1030) would not cause position changes of the part driven by the second driving device 1140 (such as the fourth lens element 1040), and vice versa.

Figure 12A:
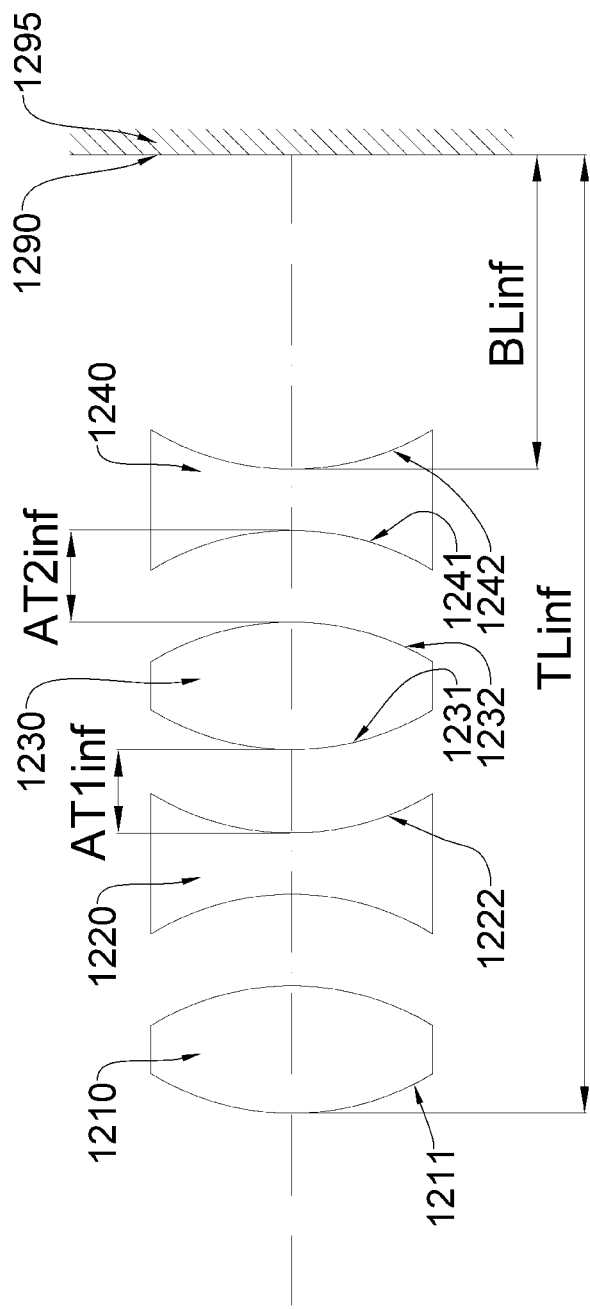
FIG. 12A is a schematic view showing the parameters AT1inf, AT2inf, BLinf and TLinf of the present disclosure when the object distance is infinite.

Please refer to FIG. 12A, which illustrates a schematic diagram of the axial distance between the adjacent lens elements and the distance between the lens element and the image sensor when the object distance is infinite; wherein the axial distance between the image-side surface 1222 of the second lens element 1220 and the object-side surface 1231 of the third lens element 1230 is a variable axial distance AT1inf, the axial distance between the image-side surface 1232 of the third lens element 1230 and the object-side surface 1241 of the fourth lens element 1240 is a variable axial distance AT2inf, the axial distance between the image-side surface 1242 of the fourth lens element 1240 and the image sensor 1295 is BLinf, the axial distance between the object-side surface 1211 of the first lens element 1210 and the image sensor 1295 is TLinf.

Figure 12B:
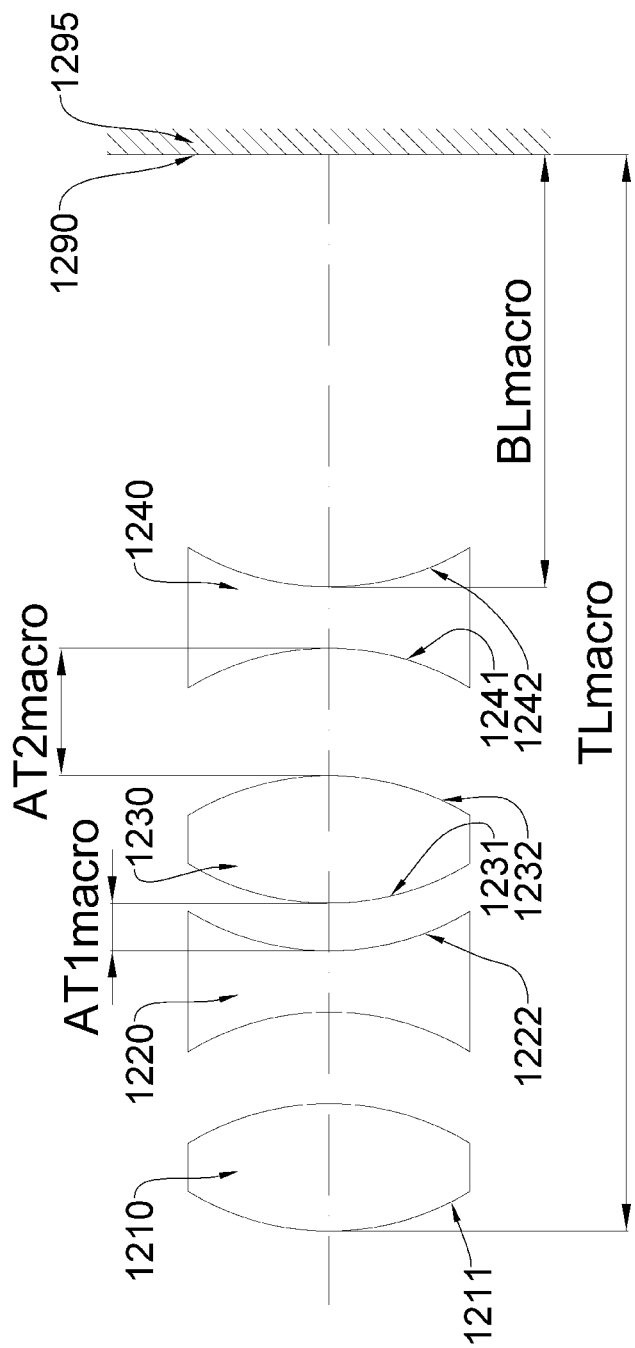
FIG. 12B a schematic view showing the parameters AT1macro, AT2macro, BLmacro and TLmacro of the present disclosure when the object distance is 500 mm.

Please refer to FIG. 12B, which illustrates a schematic diagram of the axial distance between the adjacent lens elements, and the axial distance between the lens element and the image sensor when the object distance is 500 mm (macro mode). The axial distance between the image-side surface 1222 of the second lens element 1220 and the object-side surface 1231 of the third lens element 1230 is a variable axial distance AT1macro; the axial distance between the image-side surface 1232 of the third lens element 1230 and the object-side surface 1241 of the fourth lens element 1240 is a variable axial distance AT2macro; the axial distance between the image-side surface 1242 of the fourth lens element 1240 and the image sensor 1295 is BLmacro, the axial distance between the object-side surface 1211 of the first lens element 1210 and the image sensor 1295 is TLmacro. When the object distance of the imaging apparatus of the present invention changes between the infinity mode and macro mode, the variable axial distances (AT1inf, AT2inf, AT1macro, AT2macro) will correspondingly change, and other axial distances between the lens elements will remain unchanged.

Figure 13A:
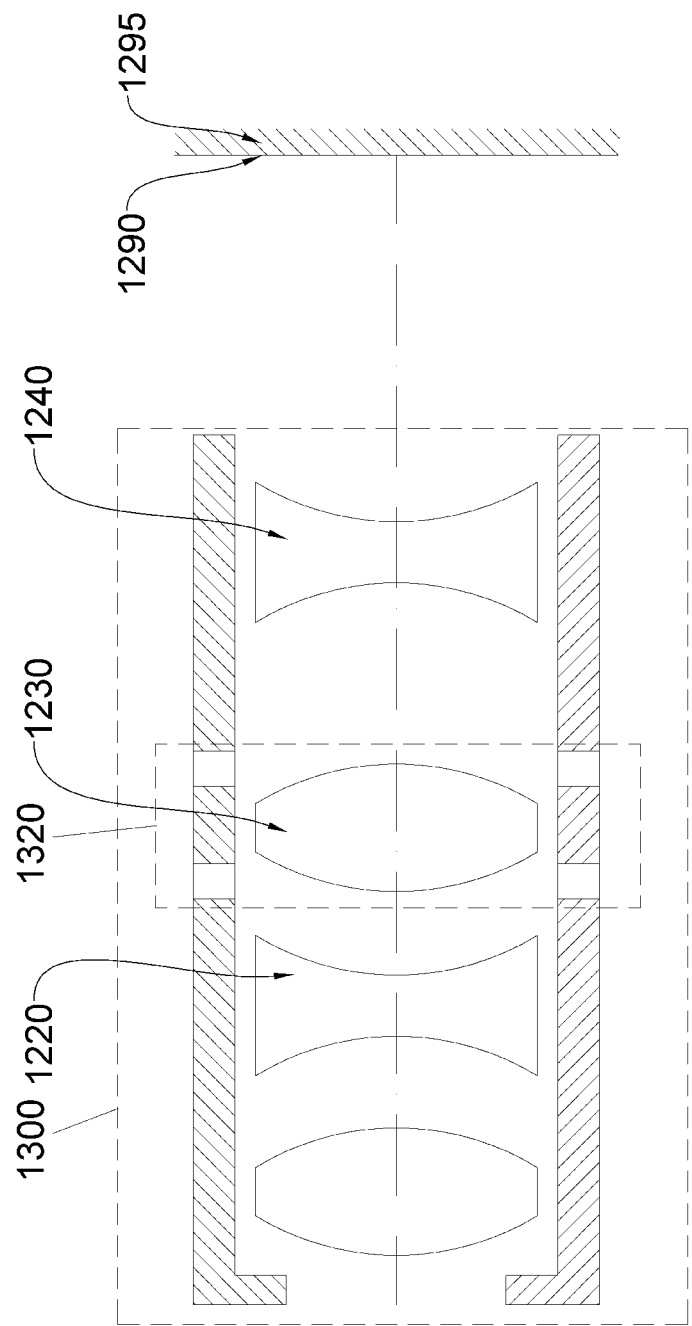
FIG. 13A is a schematic view of another first driving device and second driving device of the imaging apparatus of the present disclosure.

Please refer to FIG. 13A, which illustrates a schematic diagram of the relationship between the driving devices and the lens elements of the imaging apparatus of the present invention. The second driving device 1320 is attached to the first driving device 1300 and can be used for fine adjustments with some of the lens elements (such as the third lens element 1230) to change the axial distance between the second lens element 1220 and the third lens element 1230 and the axial distance between the third lens element 1230 and the fourth lens element 1240. It can be realized with only one lens barrel, but it is not limited thereto. The two variable axial distances can change by the first driving device 1300 and the second driving device 1320 as shown in FIG. 13A.

Figure 13B:
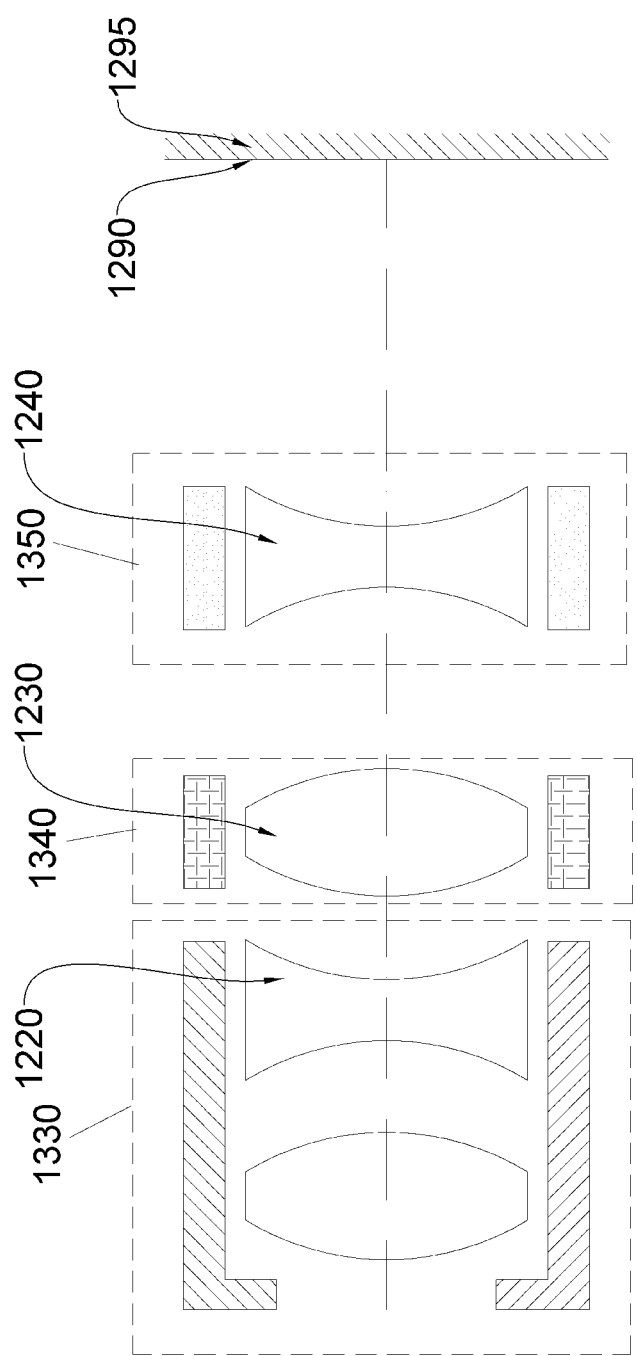
FIG. 13B is a schematic view of the first driving device, the second driving device and the third driving device of the imaging apparatus of the present disclosure.

Please refer to FIG. 13B, which illustrates a schematic diagram of the relationship between the driving devices and the lens elements of the imaging apparatus of the present invention. The first driving device 1330, the second driving device 1340 and the third driving device 1350 operate separately. The displacement of each of the second lens element 1220, the third lens element 1230 and the fourth lens element 1240 does not cause position changes of the others thereof. The two variable axial distances can change by the first driving device 1330, the second driving device 1340 and the third driving device 1350 as shown in FIG. 13B.

According to the present disclosure, the first and second driving devices may include drivable elements such as magnets, coils, balls, elastic piece, screws, solenoid valves, shape memory alloys (SMA), or piezoelectric materials.

According to the present disclosure, the aforementioned features and conditions can be utilized in numerous combinations to achieve corresponding effects.

According to the photographing optical lens assembly of the present disclosure, the object side and the image side are defined along the optical axis.

According to the photographing optical lens assembly of the present disclosure, the lens elements thereof can be made of glass or plastic material. When the lens elements are made of glass material, the distribution of the refractive power of the photographing lens system may be more flexible to design. Technologies such as grinding or molding can be used for producing glass lens elements. When the lens elements are made of plastic material, manufacturing costs can be effectively reduced. Furthermore, surfaces of each lens element can be arranged to be aspheric (ASP). Since these aspheric surfaces can be easily formed into shapes other than spherical shapes so as to have more control variables for eliminating aberrations and to further decrease the required quantity of lens elements, the total track length of the photographing lens system can be effectively reduced. Process such as plastic injection molding or molded glass lens can be used for making the aspheric surfaces.

According to the photographing optical lens assembly of the present disclosure, if a surface of a lens element is aspheric, it means that the surface has an aspheric shape throughout its optical effective area, or a portion(s) thereof.

According to the photographing optical lens assembly of the present disclosure, additives may be selectively added to the material of any one (or more) lens element to change the transmittance of said lens element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the lens assembly. Thus, additives can prevent the interference caused to the image by light in a particular wavelength range. In addition, additives may be evenly mixed in the plastic material for manufacturing lens elements with an injection molding process.

According to the photographing optical lens assembly of the present disclosure, the imaging optical system can include at least one stop, such as an aperture stop, a glare stop or a field stop, so as to favorably reduce the amount of stray light and thereby improving the image quality.

According to the photographing optical lens assembly of the present disclosure, an aperture stop can be configured as a front stop or a middle stop. The front stop disposed between an imaged object and the first lens element can provide a longer distance between an exit pupil of the imaging optical system and the image surface so that the generated telecentric effect can improve the image-sensing efficiency of an image sensor, such as a CCD or CMOS sensor. The middle stop disposed between the first lens element and the image surface is favorable for enlarging the field of view of the imaging optical system, thereby providing the imaging optical system with the advantage of a wide-angle lens.

An aperture control unit may be disposed in the imaging optical system of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the imaging optical system.

According to the photographing optical lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the photographing optical lens assembly of the present disclosure, the image surface of the photographing optical lens assembly, based on the corresponding image sensor, can be a plane or a curved surface with an arbitrary curvature, especially a curved surface being concave facing towards the object side. Meanwhile, the imaging optical system of the present disclosure may optionally include one or more image correction components (such as a field flattener) between the image surface and the lens element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and be arranged near the image surface.

According to the above description of the present disclosure, the following specific embodiments are provided for further explanation.

1st Embodiment

Figure 1B:
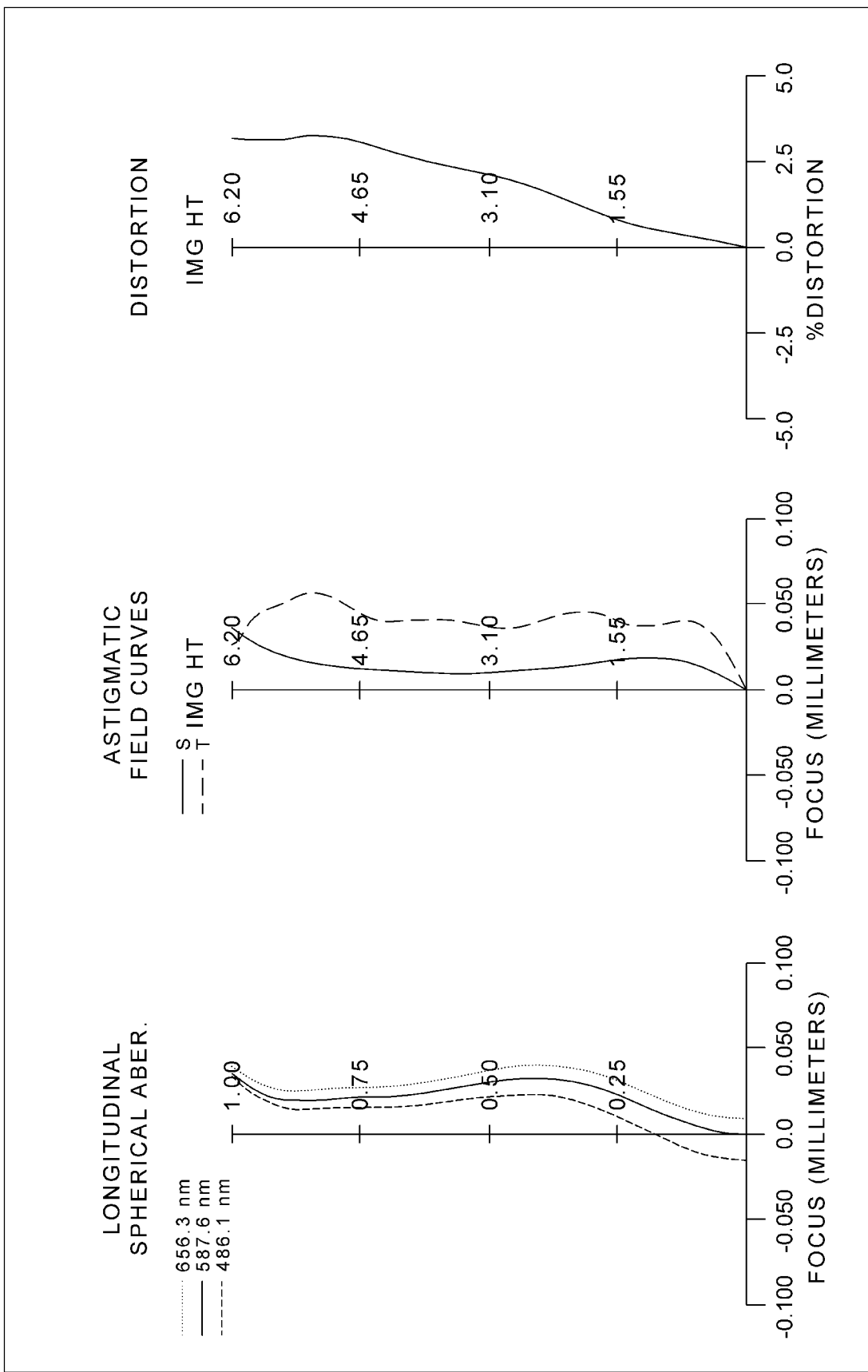
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure when the object distance is infinite. FIG. 1B shows, in order from left to right, longitudinal spherical aberration curves, astigmatic field curves and a distortion curve of the imaging apparatus according to the 1st embodiment.

In FIG. 1A, the imaging apparatus includes a photographing optical lens assembly (not otherwise herein labeled) of the present disclosure and an image sensor 195. The photographing optical lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, a filter 180 and an image surface 190. There is no additional lens element inserted among the first lens element 110 through the seventh lens element 170. There are air gaps in the paraxial region between adjacent lens elements among the first lens element 110, the second lens element 120, the third lens element 130, the fourth lens element 140, the fifth lens element 150, the sixth lens element 160 and the seventh lens element 170. There is a variable axial distance A between the fifth lens element 150 and the sixth lens element 160, which changes values when switching between the infinity mode and macro mode, and it can be realized by the driving device shown in FIG. 11A or FIG. 11B.

The first lens element 110 has positive refractive power and is made of plastic material. The first lens element 110 has an object-side surface 111 being convex in a paraxial region thereof, and an image-side surface 112 being concave in a paraxial region thereof. Both the object-side surface 111 and the image-side surface 112 are aspheric.

The second lens element 120 has negative refractive power and is made of plastic material. The second lens element 120 has an object-side surface 121 being convex in a paraxial region thereof, and an image-side surface 122 being concave in a paraxial region thereof. Both the object-side surface 121 and the image-side surface 122 are aspheric.

The third lens element 130 has positive refractive power and is made of plastic material. The third lens element 130 has an object-side surface 131 being convex in a paraxial region thereof, and an image-side surface 132 being concave in a paraxial region thereof. Both the object-side surface 131 and the image-side surface 132 are aspheric.

The fourth lens element 140 has positive refractive power and is made of plastic material. The fourth lens element 140 has an object-side surface 141 being convex in a paraxial region thereof, and an image-side surface 142 being convex in a paraxial region thereof. Both the object-side surface 141 and the image-side surface 142 are aspheric.

The fifth lens element 150 has negative refractive power and is made of plastic material. The fifth lens element 150 has an object-side surface 151 being concave in a paraxial region thereof, and an image-side surface 152 being convex in a paraxial region thereof. Both the object-side surface 151 and the image-side surface 152 are aspheric.

The sixth lens element 160 has positive refractive power and is made of plastic material. The sixth lens element 160 has an object-side surface 161 being convex in a paraxial region thereof, and an image-side surface 162 being convex in a paraxial region thereof. Both the object-side surface 161 and the image-side surface 162 are aspheric.

The seventh lens element 170 has negative refractive power and is made of plastic material. The seventh lens element 170 has an object-side surface 171 being concave in a paraxial region with at least one inflection point in an off-axis region thereof, and an image-side surface 172 being concave in a paraxial region thereof with at least one inflection point in an off-axis region. Both the object-side surface 171 and the image-side surface 172 are aspheric.

The filter 180 is disposed between the seventh lens element 170 and the image surface 190. The filter 180 is made of glass material and does not affect a focal length of the photographing optical lens assembly. The image sensor 195 is disposed on or near the image surface 190.

The detailed optical data of the 1st embodiment are shown in TABLE 1, wherein the units of the curvature radius, the thickness and the focal length are expressed in mm, f is the focal length of the photographing optical lens assembly (including two data respectively, with the object distance being infinity in an infinity mode and the object distance being 500 mm in a macro mode), Fno is an f-number of the photographing optical lens assembly (including two data respectively in the infinity mode and the macro mode), HFOV is half of a maximal field of view (including two data respectively in the infinity mode and the macro mode), and surfaces #0 to #18 refer to the surfaces in order from the object side to the image side, the thickness of each of the lens elements (and the axial distance between each of adjacent lens elements) includes two modes: infinity mode (the object distance at infinity) and macro mode (the object distance at 500 mm). The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment) Infinity /Macro
f = 5.95/5.95 mm, Fno = 1.93/1.96, HFOV = 45.2/45.0 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Ape. Stop | Plano | | −0.372 | | | | |
| 2 | Lens 1 | 3.520 | ASP | 0.575 | Plastic | 1.544 | 55.9 | 9.24 |
| 3 | | 11.058 | ASP | 0.183 | | | | |
| 4 | Lens 2 | 5.303 | ASP | 0.270 | Plastic | 1.686 | 18.4 | −32.82 |
| 5 | | 4.203 | ASP | 0.503 | | | | |
| 6 | Lens 3 | 22.122 | ASP | 0.679 | Plastic | 1.544 | 55.9 | 56.94 |
| 7 | | 76.495 | ASP | 0.467 | | | | |
| 8 | Lens 4 | 14.883 | ASP | 0.738 | Plastic | 1.544 | 55.9 | 19.40 |
| 9 | | −35.690 | ASP | 0.681 | | | | |
| 10 | Lens 5 | −2.210 | ASP | 0.350 | Plastic | 1.679 | 18.4 | −12.96 |
| 11 | | −3.139 | ASP | 0.050/0.060 | | | | |
| 12 | Lens 6 | 6.511 | ASP | 1.376 | Plastic | 1.544 | 55.9 | 3.29 |
| 13 | | −2.283 | ASP | 0.669 | | | | |
| 14 | Lens 7 | −45.003 | ASP | 0.450 | Plastic | 1.544 | 55.9 | −3.03 |
| 15 | | 1.716 | ASP | 0.800 | | | | |
| 16 | Filter | Plano | | 0.310 | Glass | 1.517 | 64.2 | — |
| 17 | | Plano | | 0.494/0.564 | | | | |
| 18 | Image Surface | Plano | | — | | | | |

Remark: Reference wavelength is d-line 587.6 nm.

TABLE 2

Aspheric Coefficient

| Surface # | 2 | 3 | 4 | 5 | 6 |
|---|---|---|---|---|---|
| k= | 6.6580E−01 | 1.3063E+01 | −6.1868E+00 | −6.5674E+00 | −2.0000E+01 |
| A4= | −8.9465E−04 | −1.1593E−02 | −2.8130E−02 | −1.6082E−02 | −1.3962E−02 |
| A6= | 2.2615E−03 | 8.3034E−03 | 1.5440E−02 | 1.0184E−02 | 4.3611E−03 |
| A8= | −1.9008E−03 | −4.3017E−03 | −6.7879E−03 | −4.1727E−03 | −3.7202E−03 |
| A10= | 9.8690E−04 | 1.8431E−03 | 2.5688E−03 | 1.5901E−03 | 1.2145E−03 |
| A12= | −2.0907E−04 | −4.5999E−04 | −6.6162E−04 | −4.4352E−04 | −2.0174E−04 |
| A14= | 1.3855E−05 | 3.8389E−05 | 6.3274E−05 | 5.1250E−05 | |

| Surface # | 7 | 8 | 9 | 10 | 11 |
|---|---|---|---|---|---|
| k= | −2.0000E+01 | −2.0000E+01 | 3.0000E+00 | −1.6465E+00 | −2.8071E+00 |
| A4= | −1.7509E−02 | −2.8714E−02 | −2.4979E−02 | 2.3035E−02 | 9.6100E−03 |
| A6= | 1.3334E−03 | 5.4516E−03 | 1.4172E−03 | −8.7299E−03 | −3.9623E−03 |
| A8= | 3.5700E−04 | −4.7654E−03 | −1.2506E−03 | 8.4015E−04 | 3.4092E−04 |
| A10= | −8.1448E−04 | 2.0681E−03 | 1.7234E−04 | 1.6958E−04 | 6.3312E−05 |
| A12= | 2.4185E−04 | −5.4846E−04 | 5.5438E−05 | −3.7063E−05 | −1.2770E−05 |
| A14= | −2.7812E−05 | 5.3571E−05 | −2.3848E−05 | 1.7010E−06 | 6.3681E−07 |
| A16= | | | 2.3895E−06 | | |

| Surface # | 12 | 13 | 14 | 15 |
|---|---|---|---|---|
| k= | 1.2516E+00 | −7.5643E+00 | −2.0000E+01 | −5.1946E+00 |
| A4= | −1.1208E−02 | −4.1940E−03 | −1.9400E−02 | −1.1877E−02 |
| A6= | 2.6885E−03 | 3.3592E−03 | 6.6226E−04 | 1.2194E−03 |
| A8= | −5.6541E−04 | −6.9272E−04 | 3.3195E−05 | −8.5221E−05 |
| A10= | 5.2663E−05 | 6.1167E−05 | 2.5126E−06 | 3.6936E−06 |
| A12= | −2.4524E−06 | −2.4697E−06 | −4.7939E−07 | −8.9860E−08 |
| A14= | 4.7435E−08 | 3.7087E−08 | 1.9587E−08 | 8.4149E−10 |
| A16= | | 1.9997E−11 | −2.5951E−10 | 1.8205E−12 |

The equation of the aspheric surface profiles is expressed as follows:

$$X(Y) = (Y^2/R) \Big/ \left(1 + sqrt(1 - (1+k)*(Y/R)^2)\right) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, when the object distance is infinite, the focal length of the photographing optical lens assembly is finf, the f-number of the photographing optical lens assembly is Fnoinf, and half of a maximum field of view of the photographing optical lens assembly is HFOVinf. When the object distance is 500 mm, half of a maximum field of view of the photographing optical lens assembly is HFOVmacro. These parameters have the following values: finf=5.95 mm; Fnoinf=1.93; HFOVinf=45.2 degrees and HFOVmacro=45.0 degrees.

In the 1st embodiment, a maximum among refractive indexes of the lens elements of the photographing optical lens assembly is Nmax, and the following condition is satisfied: Nmax=1.686.

In the 1st embodiment, a minimum among Abbe numbers of the lens elements of the photographing optical lens assembly is Vdmin, and the following condition is satisfied: Vdmin=18.4.

In the 1st embodiment, the sum of central thicknesses of the lens elements is ΣCT; when the object distance is infinite, the axial distance between the object-side surface (111) of the first lens element (110) and the image sensor (195) is TLinf, and the following condition is satisfied: ΣCT/TLinf=0.52.

In the 1st embodiment, when the object distance is infinite, the focal length of the photographing optical lens assembly is finf, and the entrance pupil diameter of the photographing optical lens assembly is EPDinf, and the following condition is satisfied: finf/EPDinf=1.93.

In the 1st embodiment, when the object distance is infinite, the axial distance between the aperture stop (100) and the image sensor (195) is SLinf, and the axial distance between the object-side surface (111) of the first lens element (110) and the image sensor (195) is TLinf, and the following condition is satisfied: SLinf/TLinf=0.96.

In the 1st embodiment, when the object distance is infinite, the axial distance between the object-side surface (111) of the first lens element (110) and the image sensor (195) is TLinf, and the following condition is satisfied: TLinf=8.60 mm.

In the 1st embodiment, the maximal image height of the photographing optical lens assembly is ImgH, and the following condition is satisfied: ImgH=6.200 mm.

In the 1st embodiment, the maximal image height of the photographing optical lens assembly is ImgH; when the object distance is infinite, the focal length of the photographing optical lens assembly is finf, and the following condition is satisfied: ImgH/finf=1.04.

In the 1st embodiment, the maximal image height of the photographing optical lens assembly is ImgH. When the object distance is infinite, the axial distance between the image-side surface (172) of the seventh lens element (170) and the image sensor (195) is BLinf, and the following condition is satisfied: ImgH/BLinf=3.87.

In the 1st embodiment, when the object distance is infinite, the axial distance between the object-side surface (111) of the first lens element (110) and the image sensor (195) is TLinf, the focal length of the photographing optical lens assembly is finf, and the following condition is satisfied: TLinf/finf=1.44.

In the 1st embodiment, when the object distance is infinite, the axial distance between the object-side surface (111) of the first lens element (110) and the image sensor (195) is TLinf, the maximal image height of the photographing optical lens assembly is ImgH, and the following condition is satisfied: TLinf/ImgH=1.39.

In the 1st embodiment, the maximum effective radius of the object-side surface (111) of the first lens element (110) is Y11, the maximum effective radius of the image-side surface (172) of the seventh lens element (170) is Ylast (with the seventh lens element being the last lens element), and the following condition is satisfied: Y11/Ylast=0.29.

In the 1st embodiment, when the object distance is infinite, at least one variable axial distance is ATinf. When the object distance is 500 mm, at least one variable axial distance is ATmacro, and the following condition is satisfied: |(ATinf-ATmacro)|*10=0.10 mm.

In the 1st embodiment, when the object distance is infinite, at least one variable axial distance is ATinf. When the object distance is 500 mm, at least one variable axial distance is ATmacro; and a minimum among axial central thicknesses of the lens elements of the photographing optical lens assembly is CTmin, and the following condition is satisfied: |(ATinf-ATmacro)/CTmin=0.04.

In the 1st embodiment, when the object distance is infinite, at least one variable axial distance is ATinf, the axial distance between the object-side surface (111) of the first lens element (110) and the image sensor (195) is TLinf. When the object distance is 500 mm, at least one variable axial distance is ATmacro, the axial distance between the object-side surface (111) of the first lens element (110) and the image sensor (195) is TLmacro; and the following condition is satisfied:

|(ATinf-ATmacro)/(TLinf-TLmacro)|=0.13.

In the 1st embodiment, when the object distance is infinite, at least one variable axial distance is ATinf, the axial distance between the image-side surface (172) of the seventh lens element (170) and the image sensor (195) is BLinf. When the object distance is 500 mm, at least one variable axial distance is ATmacro, the axial distance between the image-side surface (172) of the seventh lens element (170) and the image sensor (195) is BLmacro; and the following condition is satisfied: |(ATinf−ATmacro)/(BLinf−BLmacro)|=0.14.

2nd Embodiment

Figure 2A:
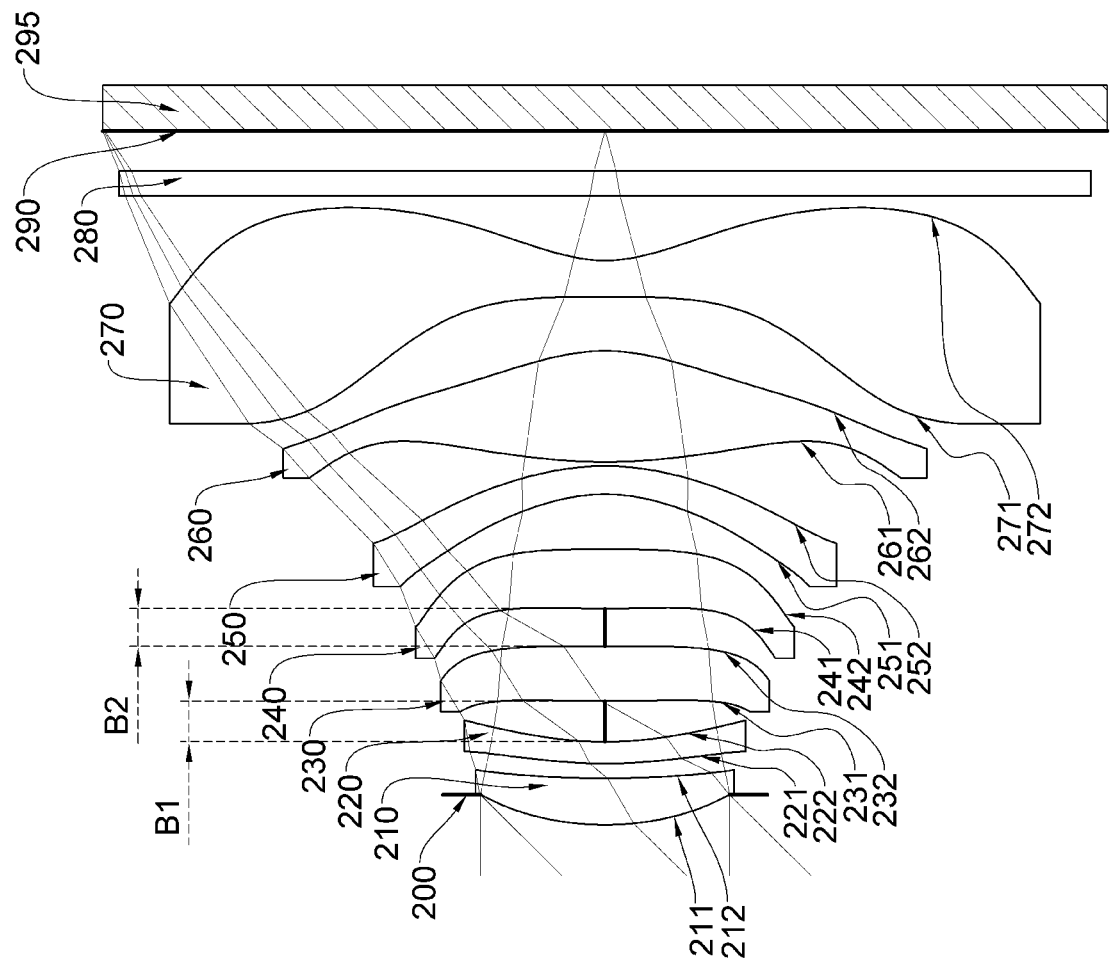
FIG. 2A is a schematic view of an imaging apparatus according to the 2nd embodiment of the present disclosure.
Figure 2B:
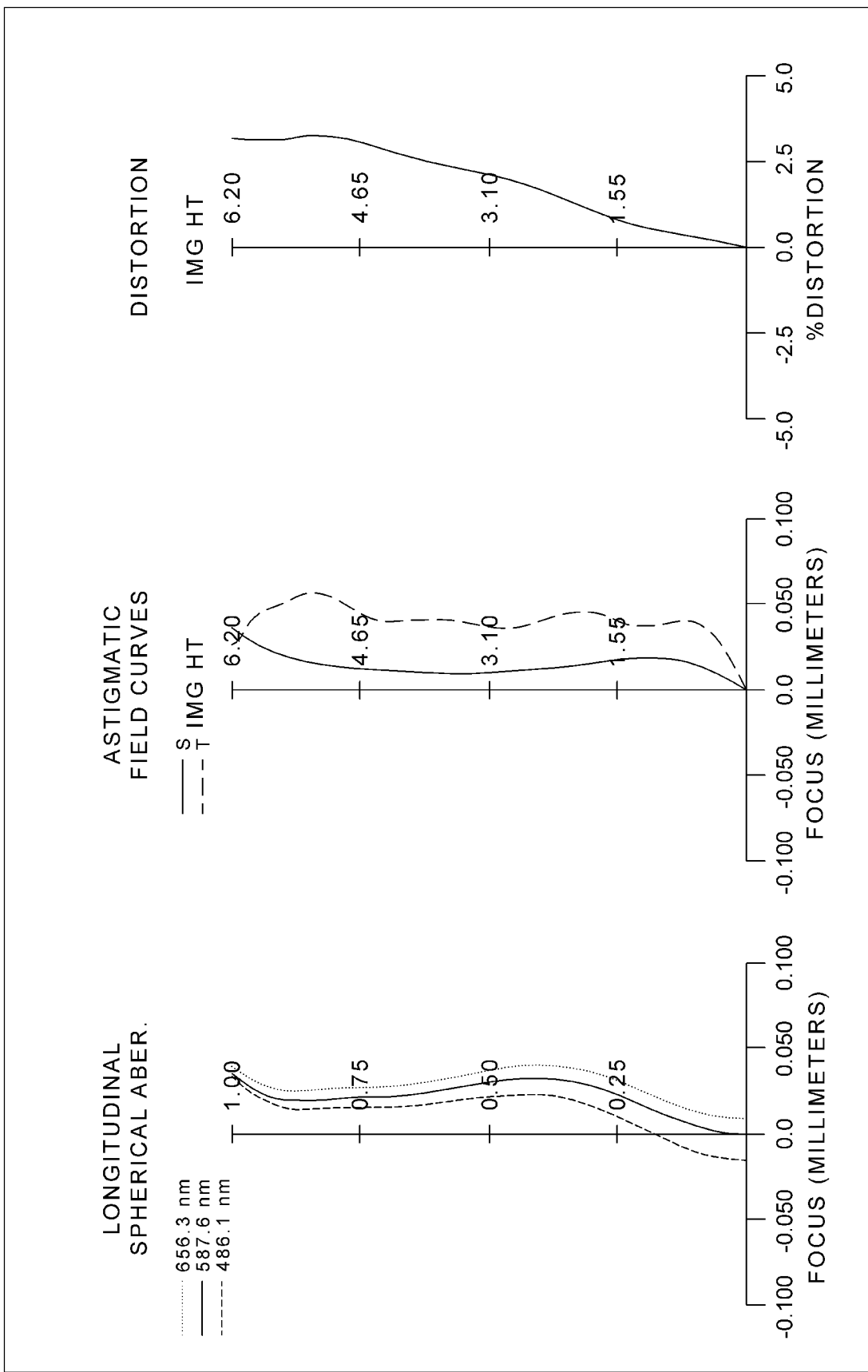
FIG. 2B shows longitudinal spherical aberration curves, astigmatic field curves and a distortion curve of the imaging apparatus according to the 2nd embodiment.

The imaging apparatus of the 2nd embodiment of the present invention uses the same optical system as the 1st embodiment, but the imaging apparatus of the 2nd embodiment includes two variable axial distances. FIG. 2A is a schematic view of an imaging apparatus according to the 2nd embodiment of the present disclosure when the object distance is infinite. FIG. 2B shows, in order from left to right, longitudinal spherical aberration curves, astigmatic field curves and a distortion curve of the imaging apparatus according to the 2nd embodiment.

In FIG. 2A, the imaging apparatus includes a photographing optical lens assembly (not otherwise herein labeled) of the present disclosure and an image sensor 295. The photographing optical lens assembly includes, in order from an object side to an image side, an aperture stop 200, a first lens element 210, a second lens element 220, a third lens element 230, a fourth lens element 240, a fifth lens element 250, a sixth lens element 260, a seventh lens element 270, a filter 280, and an image surface 290. There is no additional lens element inserted among the first lens element 210 through the seventh lens element 270 and there are air gaps in the paraxial region between adjacent lens elements among the first lens element 210, the second lens element 220, the third lens element 230, the fourth lens element 240, the fifth lens element 250, the sixth lens element 260 and the seventh lens element 270. There is a variable axial distance B1 between the second lens element 220 and the third lens element 230, and there is a variable axial distance B2 between the third lens element 230 and the fourth lens element 240, and it can be realized by the driving device shown in FIG. 13A or FIG. 13B.

The detailed optical data of the 2nd embodiment are shown in TABLE 3, and the aspheric surface data are shown in TABLE 4.

TABLE 3

(2nd Embodiment) Infinity /Macro
f = 5.95/5.95 mm, Fno = 1.93/1.96, HFOV = 45.2/45.0 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Ape. Stop | Plano | | −0.372 | | | | |
| 2 | Lens 1 | 3.520 | ASP | 0.575 | Plastic | 1.544 | 55.9 | 9.24 |
| 3 | | 11.058 | ASP | 0.183 | | | | |
| 4 | Lens 2 | 5.303 | ASP | 0.270 | Plastic | 1.686 | 18.4 | −32.82 |
| 5 | | 4.203 | ASP | 0.503/0.513 | | | | |
| 6 | Lens 3 | 22.122 | ASP | 0.679 | Plastic | 1.544 | 55.9 | 56.94 |
| 7 | | 76.495 | ASP | 0.467/0.457 | | | | |
| 8 | Lens 4 | 14.883 | ASP | 0.738 | Plastic | 1.544 | 55.9 | 19.40 |
| 9 | | −35.690 | ASP | 0.681 | | | | |
| 10 | Lens 5 | −2.210 | ASP | 0.350 | Plastic | 1.679 | 18.4 | −12.96 |
| 11 | | −3.139 | ASP | 0.050 | | | | |
| 12 | Lens 6 | 6.511 | ASP | 1.376 | Plastic | 1.544 | 55.9 | 3.29 |
| 13 | | −2.283 | ASP | 0.669 | | | | |
| 14 | Lens 7 | −45.003 | ASP | 0.450 | Plastic | 1.544 | 55.9 | −3.03 |
| 15 | | 1.716 | ASP | 0.800 | | | | |
| 16 | Filter | Plano | | 0.310 | Glass | 1.517 | 64.2 | — |
| 17 | | Plano | | 0.494/0.567 | | | | |
| 18 | Image Surface | Plano | | — | | | | |

Remark: Reference wavelength is d-line 587.6 nm.

TABLE 4

Aspheric Coefficient

| Surface # | 2 | 3 | 4 | 5 | 6 |
|---|---|---|---|---|---|
| k= | 6.6580E−01 | 1.3063E+01 | −6.1868E+00 | −6.5674E+00 | −2.0000E+01 |
| A4= | −8.9465E−04 | −1.1593E−02 | −2.8130E−02 | −1.6082E−02 | −1.3962E−02 |
| A6= | 2.2615E−03 | 8.3034E−03 | 1.5440E−02 | 1.0184E−02 | 4.3611E−03 |
| A8= | −1.9008E−03 | −4.3017E−03 | −6.7879E−03 | −4.1727E−03 | −3.7202E−03 |
| A10= | 9.8690E−04 | 1.8431E−03 | 2.5688E−03 | 1.5901E−03 | 1.2145E−03 |
| A12= | −2.0907E−04 | −4.5999E−04 | −6.6162E−04 | −4.4352E−04 | −2.0174E−04 |
| A14= | 1.3855E−05 | 3.8389E−05 | 6.3274E−05 | 5.1250E−05 | |

| Surface # | 7 | 8 | 9 | 10 | 11 |
|---|---|---|---|---|---|
| k= | −2.0000E+01 | −2.0000E+01 | 3.0000E+00 | −1.6465E+00 | −2.8071E+00 |
| A4= | −1.7509E−02 | −2.8714E−02 | −2.4979E−02 | 2.3035E−02 | 9.6100E−03 |
| A6= | 1.3334E−03 | 5.4516E−03 | 1.4172E−03 | −8.7299E−03 | −3.9623E−03 |
| A8= | 3.5700E−04 | −4.7654E−03 | −1.2506E−03 | 8.4015E−04 | 3.4092E−04 |
| A10= | −8.1448E−04 | 2.0681E−03 | 1.7234E−04 | 1.6958E−04 | 6.3312E−05 |
| A12= | 2.4185E−04 | −5.4846E−04 | 5.5438E−05 | −3.7063E−05 | −1.2770E−05 |
| A14= | −2.7812E−05 | 5.3571E−05 | −2.3848E−05 | 1.7010E−06 | 6.3681E−07 |
| A16= | | | 2.3895E−06 | | |

| Surface # | 12 | 13 | 14 | 15 |
|---|---|---|---|---|
| k= | 1.2516E+00 | −7.5643E+00 | −2.0000E+01 | −5.1946E+00 |
| A4= | −1.1208E−02 | −4.1940E−03 | −1.9400E−02 | −1.1877E−02 |
| A6= | 2.6885E−03 | 3.3592E−03 | 6.6226E−04 | 1.2194E−03 |
| A8= | −5.6541E−04 | −6.9272E−04 | 3.3195E−05 | −8.5221E−05 |
| A10= | 5.2663E−05 | 6.1167E−05 | 2.5126E−06 | 3.6936E−06 |
| A12= | −2.4524E−06 | −2.4697E−06 | −4.7939E−07 | −8.9860E−08 |
| A14= | 4.7435E−08 | 3.7087E−08 | 1.9587E−08 | 8.4149E−10 |
| A16= | | 1.9997E−11 | −2.5951E−10 | 1.8205E−12 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again, wherein HFOVinf and HFOVmacro are the half of a maximum field of view when the object distance is infinite and 500 mm, respectively.

Moreover, these parameters can be calculated from TABLE 3 and TABLE 4 and satisfy the conditions stated in table below.

| 2nd Embodiment | | | |
|---|---|---|---|
| finf [mm] | 5.95 | ImgH [mm] | 6.200 |
| Fnoinf | 1.93 | ImgH/finf | 1.04 |
| HFOVinf [deg.] | 45.2 | ImgH/BLinf | 3.87 |
| HFOVmacro [deg.] | 45.0 | TLinf/finf | 1.44 |
| Nmax | 1.686 | TLinf/ImgH | 1.39 |
| Vdmin | 18.4 | Y11/Ylast | 0.29 |
| ΣCT/TLinf | 0.52 | \|(ATinf − ATmacro)\|*10 [mm] | 0.10; 0.10 |
| finf/EPDinf | 1.93 | \|(ATinf − ATmacro)\|/CTmin | 0.04; 0.04 |
| SLinf/TLinf | 0.96 | \|(ATinf − ATmacro)/(TLinf − TLmacro)\| | 0.14 |
| TLinf [mm] | 8.60 | \|(ATinf − ATmacro)/(BLinf − BLmacro)\| | 0.14 |

3rd Embodiment

Figure 3A:
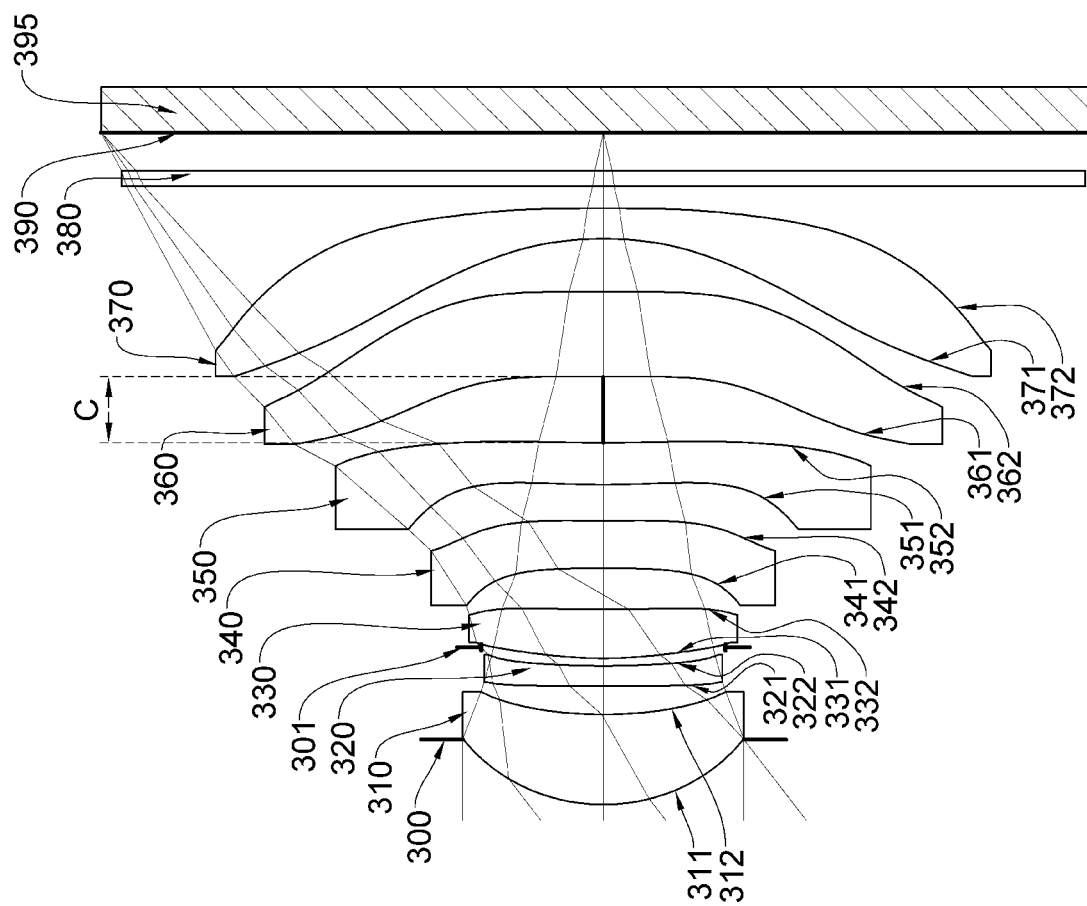
FIG. 3A is a schematic view of an imaging apparatus according to the 3rd embodiment of the present disclosure.
Figure 3B:
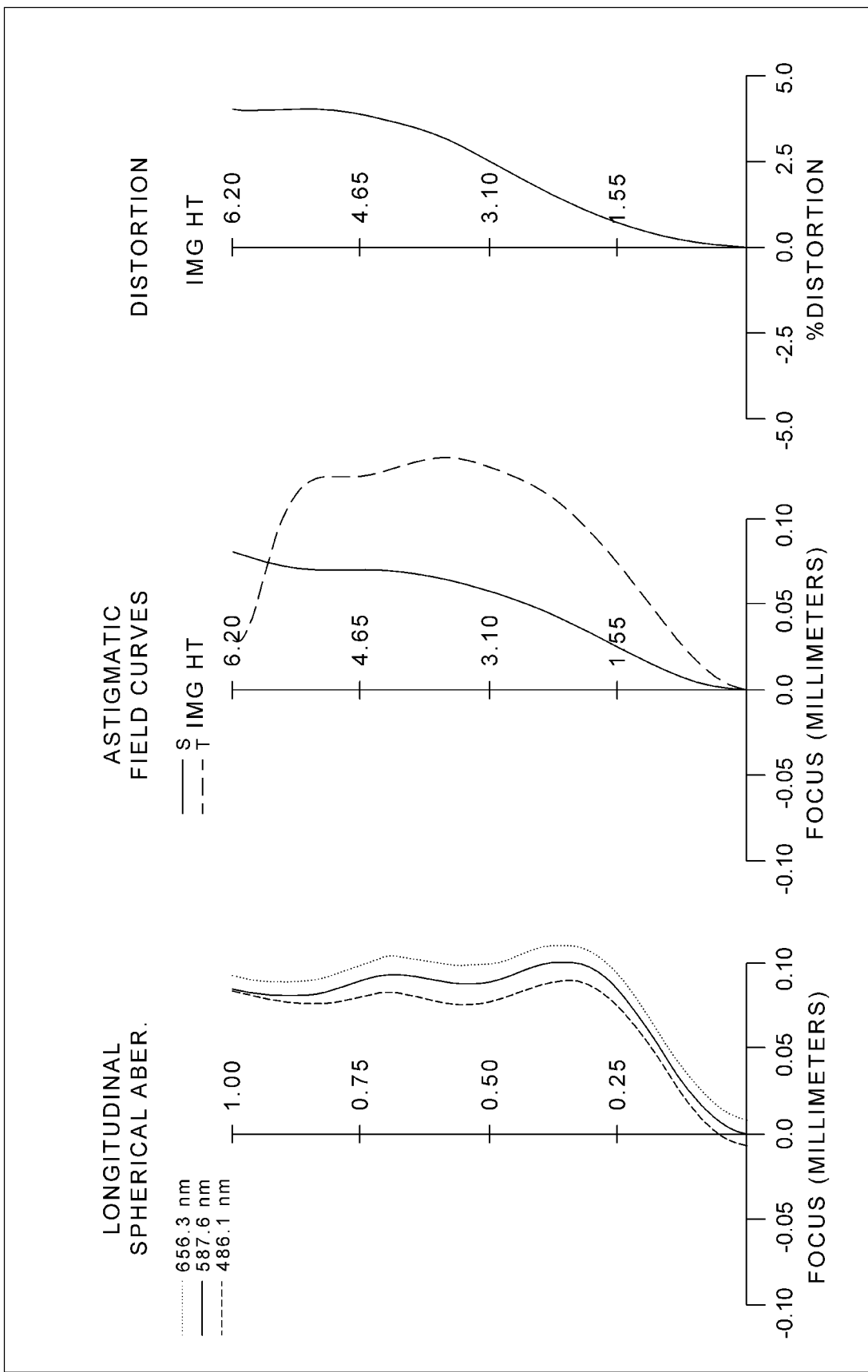
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure when the object distance is infinite. FIG. 3B shows, in order from left to right, longitudinal spherical aberration curves, astigmatic field curves and a distortion curve of the imaging apparatus according to the 3rd embodiment.

In FIG. 3A, the imaging apparatus includes a photographing optical lens assembly (not otherwise herein labeled) of the present disclosure and an image sensor 395. The photographing optical lens assembly includes, in order from an object side to an image side, an aperture stop 300, a first lens element 310, a second lens element 320, a stop 301, a third lens element 330, a fourth lens element 340, a fifth lens element 350, a sixth lens element 360, a seventh lens element 370, a filter 380, and an image surface 390. There is no additional lens element inserted among the first lens element 310 through the seventh lens element 370 and there are air gaps in the paraxial region between adjacent lens elements among the first lens element 310, the second lens element 320, the third lens element 330, the fourth lens element 340, the fifth lens element 350, the sixth lens element 360 and the seventh lens element 370. There is a variable axial distance C between the fifth lens element 350 and the sixth lens element 360, and it can be realized by the driving device shown in FIG. 11A or FIG. 11B.

The first lens element 310 has positive refractive power and is made of plastic material. The first lens element 310 has an object-side surface 311 being convex in a paraxial region thereof, and an image-side surface 312 being concave in a paraxial region thereof. Both the object-side surface 311 and the image-side surface 312 are aspheric.

The second lens element 320 has negative refractive power and is made of plastic material. The second lens element 320 has an object-side surface 321 being concave in a paraxial region thereof, and an image-side surface 322 being concave in a paraxial region thereof. Both the object-side surface 321 and the image-side surface 322 are aspheric.

The third lens element 330 has positive refractive power and is made of plastic material. The third lens element 330 has an object-side surface 331 being convex in a paraxial region thereof, and an image-side surface 332 being concave in a paraxial region thereof. Both the object-side surface 331 and the image-side surface 332 are aspheric.

The fourth lens element 340 has negative refractive power and is made of plastic material. The fourth lens element 340 has an object-side surface 341 being concave in a paraxial region thereof, and an image-side surface 342 being concave in a paraxial region thereof. Both the object-side surface 341 and the image-side surface 342 are aspheric.

The fifth lens element 350 has positive refractive power and is made of plastic material. The fifth lens element 350 has an object-side surface 351 being convex in a paraxial region thereof, and an image-side surface 352 being concave in a paraxial region thereof. Both the object-side surface 351 and the image-side surface 352 are aspheric.

The sixth lens element 360 has positive refractive power and is made of plastic material. The sixth lens element 360 has an object-side surface 361 being convex in a paraxial region thereof, and an image-side surface 362 being concave in a paraxial region thereof. Both the object-side surface 361 and the image-side surface 362 are aspheric.

The seventh lens element 370 has negative refractive power and is made of plastic material. The seventh lens element 370 has an object-side surface 371 being concave in a paraxial region with at least one inflection point in an off-axis region thereof, and an image-side surface 372 being convex in a paraxial region with at least one inflection point in an off-axis region thereof. Both the object-side surface 371 and the image-side surface 372 are aspheric.

The photographing optical lens assembly further includes a filter 380 disposed between the seventh lens element 370 and the image surface 390. The filter 380 is made of glass material and does not affect the focal length of the photographing optical lens assembly. The image sensor 395 is disposed on or near the image surface 390.

The detailed optical data of the 3rd embodiment are shown in TABLE 5, and the aspheric surface data are shown in TABLE 6.

TABLE 5

(3rd Embodiment) Infinity /Macro
f = 7.64/7.61 mm, Fno = 2.20/2.27, HFOV = 37.6/37.3 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Ape. Stop | Plano | | −0.805 | | | | |
| 2 | Lens 1 | 2.313 | ASP | 1.115 | Plastic | 1.530 | 60.0 | 6.95 |
| 3 | | 5.178 | ASP | 0.354 | | | | |

TABLE 5-continued (3rd Embodiment) Infinity /Macro
f = 7.64/7.61 mm, Fno = 2.20/2.27, HFOV = 37.6/37.3 deg.

| Surface # | | Curvature Radius | | Thickness Infinity/Macro | Material | Index | Abbe # | Focal Length |
|---|---|---|---|---|---|---|---|---|
| 4 | Lens 2 | −785.542 | ASP | 0.247 | Plastic | 1.650 | 21.8 | −14.88 |
| 5 | | 9.789 | ASP | 0.230 | | | | |
| 6 | Stop | Plano | | −0.136 | | | | |
| 7 | Lens 3 | 4.843 | ASP | 0.605 | Plastic | 1.544 | 56.0 | 11.86 |
| 8 | | 18.570 | ASP | 0.510 | | | | |
| 9 | Lens 4 | −31.377 | ASP | 0.587 | Plastic | 1.686 | 18.4 | −24.56 |
| 10 | | 36.676 | ASP | 0.448 | | | | |
| 11 | Lens 5 | 11.770 | ASP | 0.517 | Plastic | 1.582 | 30.2 | 61.29 |
| 12 | | 17.276 | ASP | 0.818/0.848 | | | | |
| 13 | Lens 6 | 34.976 | ASP | 1.050 | Plastic | 1.686 | 18.4 | 116.03 |
| 14 | | 61.633 | ASP | 0.659 | | | | |
| 15 | Lens 7 | −4.422 | ASP | 0.375 | Plastic | 1.530 | 60.0 | −8.37 |
| 16 | | −1249.550 | ASP | 0.272 | | | | |
| 17 | Filter | Plano | | 0.197 | Glass | 1.517 | 64.2 | — |
| 18 | | Plano | | 0.467/0.550 | | | | |
| 19 | Image Surface | Plano | | — | | | | |

Remark: Reference wavelength is d-line 587.6 nm.
* The effective radius of Surface 6 is 1.510 mm.

TABLE 6

Aspheric Coefficient

| Surface # | 2 | 3 | 4 | 5 | 7 |
|---|---|---|---|---|---|
| k= | 2.2504E−01 | 5.7019E+00 | −5.0000E+01 | −4.0312E+01 | −1.0696E+00 |
| A4= | −4.1834E−03 | 1.3816E−03 | −9.7008E−04 | −1.9470E−02 | −4.0439E−02 |
| A6= | 5.5777E−03 | −1.8706E−03 | 1.2260E−02 | 3.2603E−02 | 4.3753E−02 |
| A8= | −5.9783E−03 | 3.2533E−03 | −8.7566E−03 | −1.9418E−02 | −4.3606E−02 |
| A10= | 3.5002E−03 | −2.4898E−03 | 3.7069E−03 | 5.7557E−03 | 2.9652E−02 |
| A12= | −1.1687E−03 | 9.0696E−04 | −4.8044E−04 | 8.9090E−04 | −1.2641E−02 |
| A14= | 2.0660E−04 | −1.0238E−04 | | −7.6266E−04 | 3.0984E−03 |
| A16= | −1.5034E−05 | | | 1.3318E−04 | −3.1706E−04 |

| Surface # | 8 | 9 | 10 | 11 | 12 |
|---|---|---|---|---|---|
| k= | 1.3634E+01 | 1.0000E+01 | 9.9979E+00 | 1.1857E+01 | 1.0495E+01 |
| A4= | −9.1354E−03 | −3.3768E−02 | −3.0067E−02 | −2.0154E−02 | −1.5322E−02 |
| A6= | −1.2641E−02 | −7.7791E−03 | −3.3696E−03 | −3.8877E−04 | 2.6788E−03 |
| A8= | 2.0387E−02 | 9.8893E−03 | 4.5345E−03 | 2.2360E−04 | −2.2644E−04 |
| A10= | −1.9472E−02 | −8.4298E−03 | −2.3215E−03 | −1.3062E−04 | −5.4952E−06 |
| A12= | 9.7984E−03 | 3.3294E−03 | 5.8420E−04 | 1.4783E−05 | 2.2113E−06 |
| A14= | −2.5942E−03 | −6.8034E−04 | −5.9132E−05 | −4.1150E−08 | −1.2894E−07 |
| A16= | 2.8514E−04 | 5.2685E−05 | 1.6083E−06 | −3.2008E−08 | 2.0108E−09 |

| Surface # | 13 | 14 | 15 | 16 |
|---|---|---|---|---|
| k= | −1.0000E+00 | −1.0000E+00 | −7.7256E−01 | −1.0000E+00 |
| A4= | −2.4690E−02 | −1.8174E−02 | −1.9676E−02 | −2.0629E−02 |
| A6= | 1.2781E−03 | 7.0418E−04 | 8.2599E−03 | 6.8474E−03 |
| A8= | 4.9527E−05 | 1.9194E−04 | −1.7244E−03 | −1.3393E−03 |
| A10= | 4.4627E−05 | −4.7908E−05 | 2.1663E−04 | 1.6159E−04 |
| A12= | −1.1832E−05 | 6.1378E−06 | −1.6610E−05 | −1.2739E−05 |
| A14= | 1.1871E−06 | −4.8240E−07 | 7.7472E−07 | 6.5619E−07 |
| A16= | −6.0259E−08 | 2.2863E−08 | −2.1120E−08 | −2.1153E−08 |
| A18= | 1.5438E−09 | −5.9078E−10 | 3.0037E−10 | 3.8396E−10 |
| A20= | −1.5921E−11 | 6.2640E−12 | −1.6138E−12 | −2.9639E−12 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again, wherein HFOVinf and HFOVmacro are the half of a maximum field of view when the object distance is infinite and 500 mm, respectively.

Moreover, these parameters can be calculated from TABLE 5 and TABLE 6 and satisfy the conditions stated in table below.

| 3rd Embodiment | | | |
|---|---|---|---|
| finf [mm] | 7.64 | ImgH [mm] | 6.200 |
| Fnoinf | 2.20 | ImgH/finf | 0.81 |
| HFOVinf [deg.] | 37.6 | ImgH/BLinf | 6.63 |
| HFOVmacro [deg.] | 37.3 | TLinf/finf | 1.09 |
| Nmax | 1.686 | TLinf/ImgH | 1.34 |
| Vdmin | 18.4 | Y11/Ylast | 0.36 |
| ΣCT/TLinf | 0.54 | \|(ATinf − ATmacro)\|*10 [mm] | 0.30 |
| finf/EPDinf | 2.20 | \|(ATinf − ATmacro)\|/CTmin | 0.12 |
| SLinf/TLinf | 0.90 | \|(ATinf − ATmacro)/(TLinf − TLmacro)\| | 0.26 |
| TLinf [mm] | 8.31 | \|(ATinf − ATmacro)/(BLinf − BLmacro)\| | 0.36 |

4th Embodiment

Figure 4A:
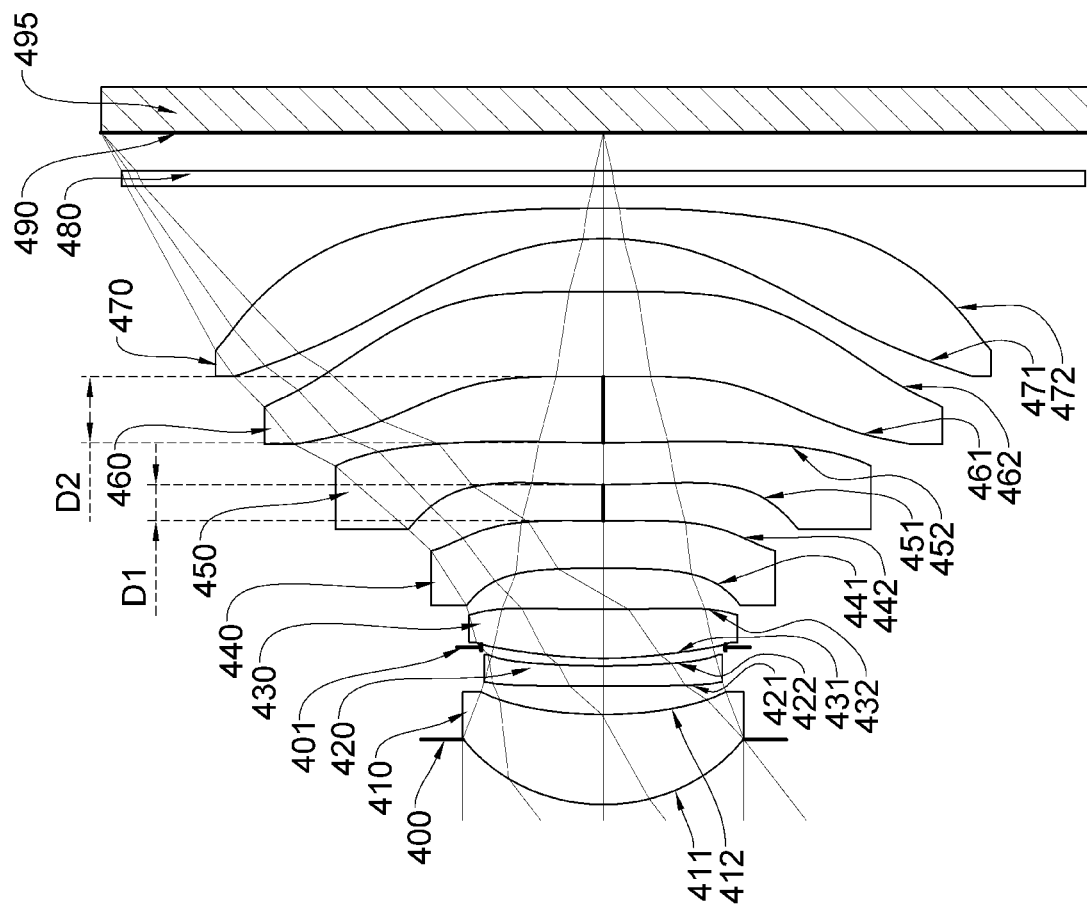
FIG. 4A is a schematic view of an imaging apparatus according to the 4th embodiment of the present disclosure.
Figure 4B:
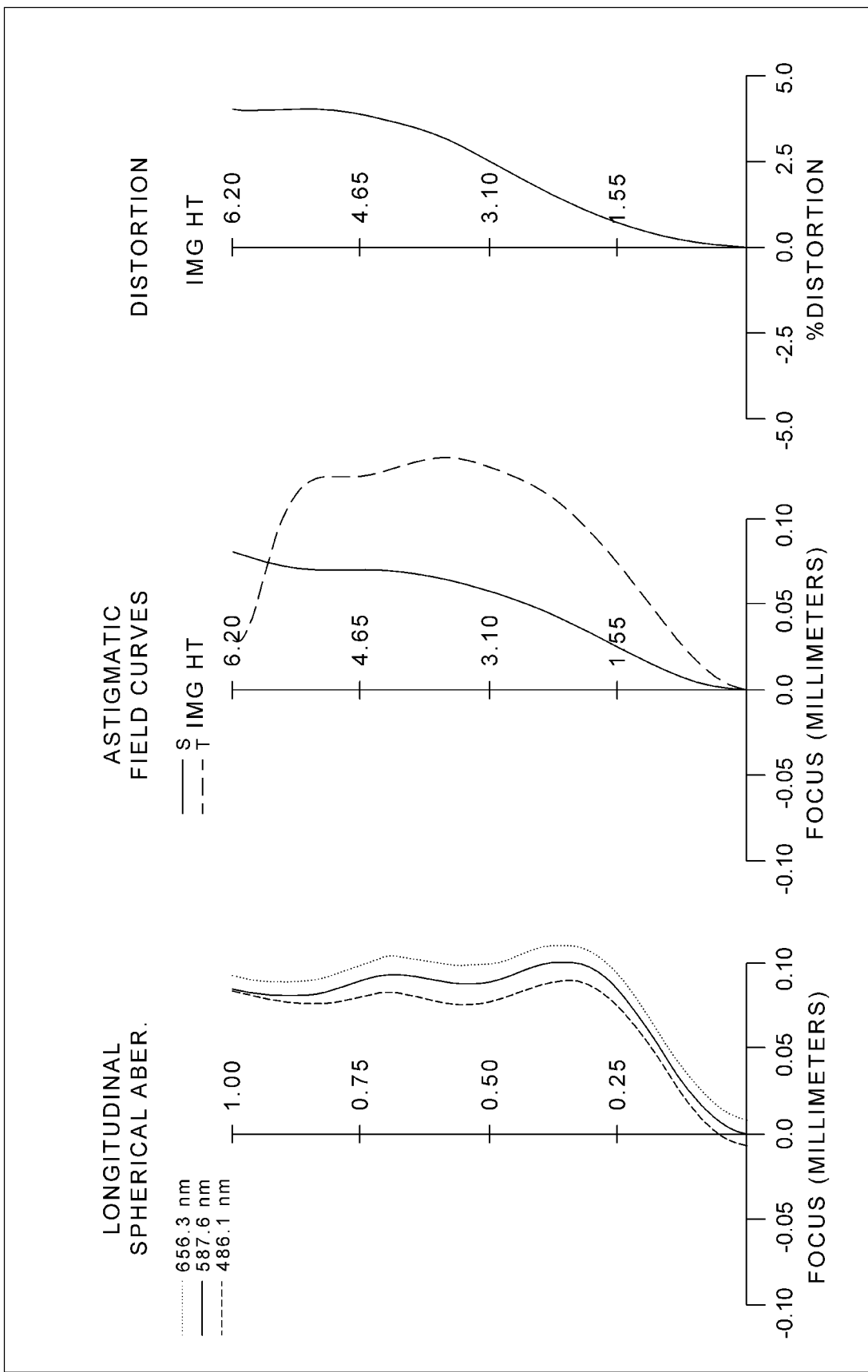
FIG. 4B shows longitudinal spherical aberration curves, astigmatic field curves and a distortion curve of the imaging apparatus according to the 4th embodiment.

The imaging apparatus of the 4th embodiment of the present invention uses the same optical system as the 3rd embodiment, but the imaging apparatus of the 4th embodiment includes two variable axial distances. FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes a photographing optical lens assembly (not otherwise herein labeled) of the present disclosure and an image sensor 495. The photographing optical lens assembly includes, in order from an object side to an image side, an aperture stop 400, a first lens element 410, a second lens element 420, a stop 401, a third lens element 430, a fourth lens element 440, a fifth lens element 450, a sixth lens element 460, a seventh lens element 470, a filter 480, and an image surface 490. There are air gaps in the paraxial region between adjacent lens elements among the first lens element 410, the second lens element 420, the third lens element 430, the fourth lens element 440, the fifth lens element 450, the sixth lens element 460, and the seventh lens element 470. There is a variable axial distance D1 between the fourth lens element 440 and the fifth lens element 450, and there is a variable axial distance D2 between the fifth lens element 450 and the sixth lens element 460, and it can be realized by the driving device shown in FIG. 13A or FIG. 13B.

The detailed optical data of the 4th embodiment are shown in TABLE 7, and the aspheric surface data are shown in TABLE 8.

TABLE 7

(4th Embodiment) Infinity /Macro
f = 7.64/7.64 mm, Fno = 2.20/2.27, HFOV = 37.6/37.2 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Ape. Stop | Plano | | −0.805 | | | | |
| 2 | Lens 1 | 2.313 | ASP | 1.115 | Plastic | 1.530 | 60.0 | 6.95 |
| 3 | | 5.178 | ASP | 0.354 | | | | |
| 4 | Lens 2 | −785.542 | ASP | 0.247 | Plastic | 1.650 | 21.8 | −14.88 |
| 5 | | 9.789 | ASP | 0.230 | | | | |
| 6 | Stop | Plano | | −0.136 | | | | |
| 7 | Lens 3 | 4.843 | ASP | 0.605 | Plastic | 1.544 | 56.0 | 11.86 |
| 8 | | 18.570 | ASP | 0.510 | | | | |
| 9 | Lens 4 | −31.377 | ASP | 0.587 | Plastic | 1.686 | 18.4 | −24.56 |
| 10 | | 36.676 | ASP | 0.448/0.478 | | | | |
| 11 | Lens 5 | 11.770 | ASP | 0.517 | Plastic | 1.582 | 30.2 | 61.29 |
| 12 | | 17.276 | ASP | 0.818/0.788 | | | | |
| 13 | Lens 6 | 34.976 | ASP | 1.050 | Plastic | 1.686 | 18.4 | 116.03 |
| 14 | | 61.633 | ASP | 0.659 | | | | |
| 15 | Lens 7 | −4.422 | ASP | 0.375 | Plastic | 1.530 | 60.0 | −8.37 |
| 16 | | −1249.550 | ASP | 0.272 | | | | |
| 17 | Filter | Plano | | 0.197 | Glass | 1.517 | 64.2 | — |
| 18 | | Plano | | 0.467/0.594 | | | | |
| 19 | Image Surface | Plano | | — | | | | |

Remark: Reference wavelength is d-line 587.6 nm.
* The effective radius of Surface 6 is 1.510 mm.

TABLE 8

| Aspheric Coefficient | | | | | |
|---|---|---|---|---|---|
| Surface # | 2 | 3 | 4 | 5 | 7 |
| k= | 2.2504E−01 | 5.7019E+00 | −5.0000E+01 | −4.0312E+01 | −1.0696E+00 |
| A4= | −4.1834E−03 | 1.3816E−03 | −9.7008E−04 | −1.9470E−02 | −4.0439E−02 |
| A6= | 5.5777E−03 | −1.8706E−03 | 1.2260E−02 | 3.2603E−02 | 4.3753E−02 |
| A8= | −5.9783E−03 | 3.2533E−03 | −8.7566E−03 | −1.9418E−02 | −4.3606E−02 |

TABLE 8-continued

| Aspheric Coefficient | | | | | |
|---|---|---|---|---|---|
| A10= | 3.5002E−03 | −2.4898E−03 | 3.7069E−03 | 5.7557E−03 | 2.9652E−02 |
| A12= | −1.1687E−03 | 9.0696E−04 | −4.8044E−04 | 8.9090E−04 | −1.2641E−02 |
| A14= | 2.0660E−04 | −1.0238E−04 | | −7.6266E−04 | 3.0984E−03 |
| A16= | −1.5034E−05 | | | 1.3318E−04 | −3.1706E−04 |

| Surface # | 8 | 9 | 10 | 11 | 12 |
|---|---|---|---|---|---|
| k= | 1.3634E+01 | 1.0000E+01 | 9.9979E+00 | 1.1857E+01 | 1.0495E+01 |
| A4= | −9.1354E−03 | −3.3768E−02 | −3.0067E−02 | −2.0154E−02 | −1.5322E−02 |
| A6= | −1.2641E−02 | −7.7791E−03 | −3.3696E−03 | −3.8877E−04 | 2.6788E−03 |
| A8= | 2.0387E−02 | 9.8893E−03 | 4.5345E−03 | 2.2360E−04 | −2.2644E−04 |
| A10= | −1.9472E−02 | −8.4298E−03 | −2.3215E−03 | −1.3062E−04 | −5.4952E−06 |
| A12= | 9.7984E−03 | 3.3294E−03 | 5.8420E−04 | 1.4783E−05 | 2.2113E−06 |
| A14= | −2.5942E−03 | −6.8034E−04 | −5.9132E−05 | −4.1150E−08 | −1.2894E−07 |
| A16= | 2.8514E−04 | 5.2685E−05 | 1.6083E−06 | −3.2008E−08 | 2.0108E−09 |

| Surface # | 13 | 14 | 15 | 16 |
|---|---|---|---|---|
| k= | −1.0000E+00 | −1.0000E+00 | −7.7256E−01 | −1.0000E+00 |
| A4= | −2.4690E−02 | −1.8174E−02 | −1.9676E−02 | −2.0629E−02 |
| A6= | 1.2781E−03 | 7.0418E−04 | 8.2599E−03 | 6.8474E−03 |
| A8= | 4.9527E−05 | 1.9194E−04 | −1.7244E−03 | −1.3393E−03 |
| A10= | 4.4627E−05 | −4.7908E−05 | 2.1663E−04 | 1.6159E−04 |
| A12= | −1.1832E−05 | 6.1378E−06 | −1.6610E−05 | −1.2739E−05 |
| A14= | 1.1871E−06 | −4.8240E−07 | 7.7472E−07 | 6.5619E−07 |
| A16= | −6.0259E−08 | 2.2863E−08 | −2.1120E−08 | −2.1153E−08 |
| A18= | 1.5438E−09 | −5.9078E−10 | 3.0037E−10 | 3.8396E−10 |
| A20= | −1.5921E−11 | 6.2640E−12 | −1.6138E−12 | −2.9639E−12 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again, wherein HFOVinf and HFOVmacro are the half of a maximum field of view when the object distance is infinite and 500 mm, respectively.

Moreover, these parameters can be calculated from TABLE 7 and TABLE 8 and satisfy the conditions stated in table below.

| 4th Embodiment | | | |
|---|---|---|---|
| finf [mm] | 7.64 | ImgH [mm] | 6.200 |
| Fnoinf | 2.20 | ImgH/finf | 0.81 |
| HFOVinf [deg.] | 37.6 | ImgH/BLinf | 6.63 |
| HFOVmacro [deg.] | 37.2 | TLinf/finf | 1.09 |
| Nmax | 1.686 | TLinf/ImgH | 1.34 |
| Vdmin | 18.4 | Y11/Ylast | 0.36 |
| ΣCT/TLinf | 0.54 | \|(ATinf − ATmacro)\|*10 [mm] | 0.30; 0.30 |
| finf/EPDinf | 2.20 | \|(ATinf − ATmacro)\|/CTmin | 0.12; 0.12 |
| SLinf/TLinf | 0.90 | \|(ATinf − ATmacro)/(TLinf − TLmacro)\| | 0.24 |
| TLinf [mm] | 8.31 | \|(ATinf − ATmacro)/(BLinf − BLmacro)\| | 0.24 |

5th Embodiment

Figure 5A:
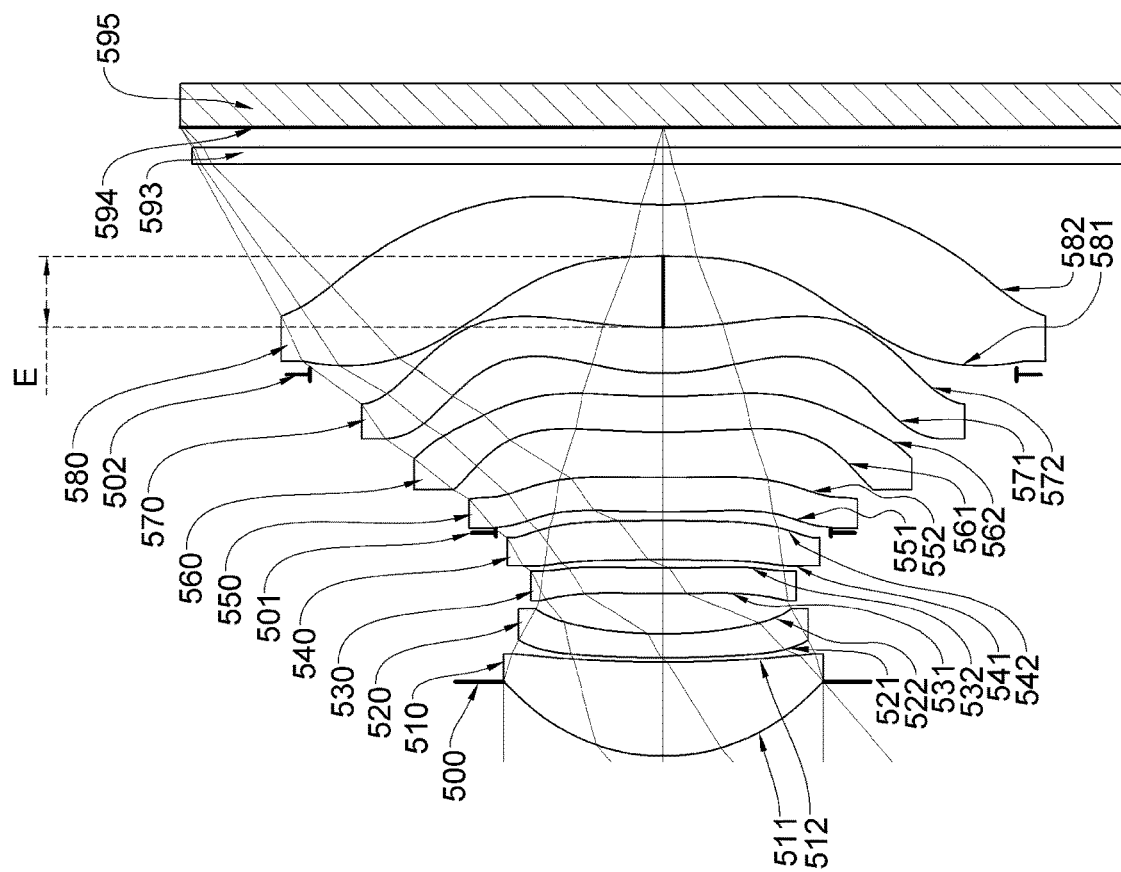
FIG. 5A is a schematic view of an imaging apparatus according to the 5th embodiment of the present disclosure.
Figure 5B:
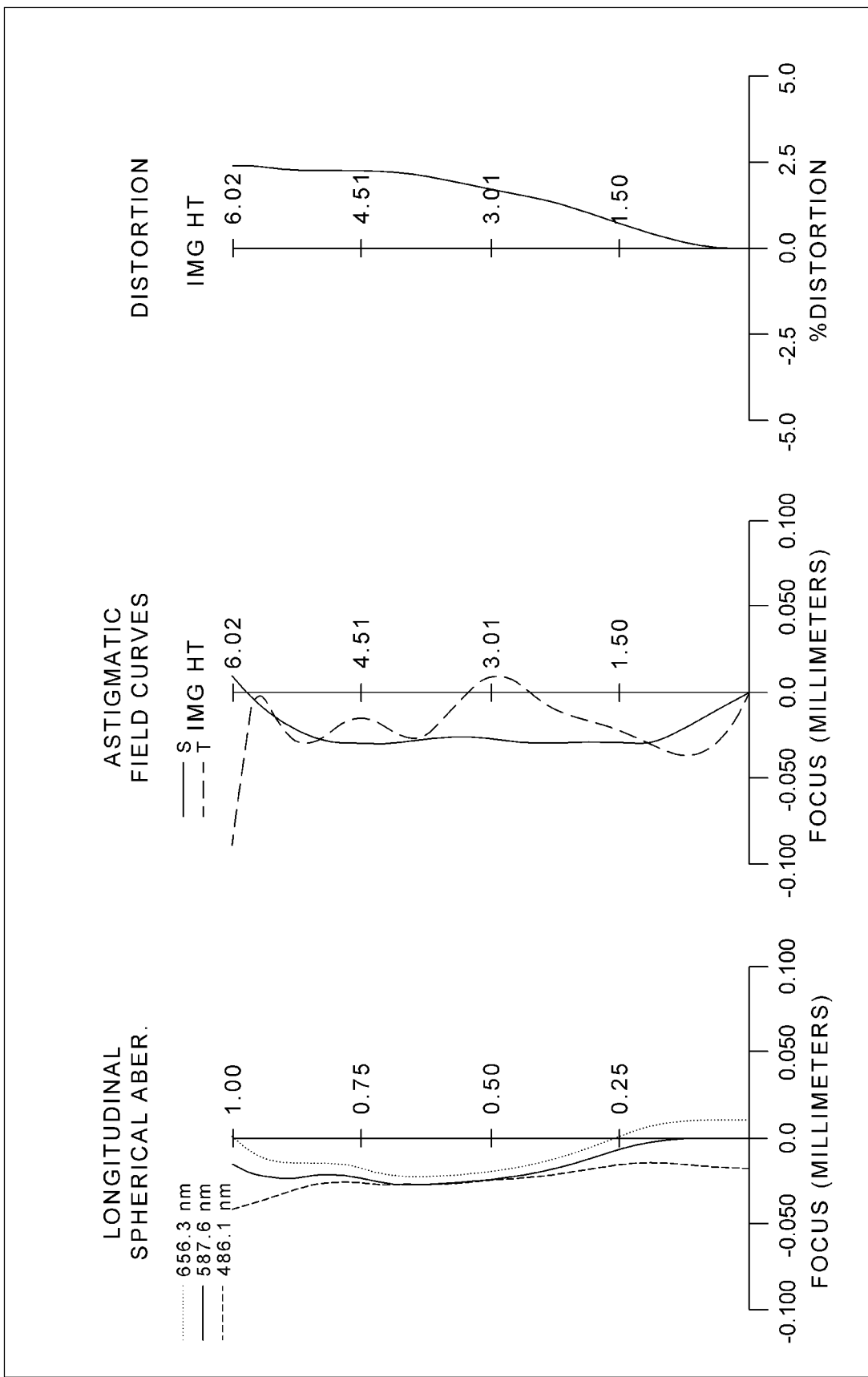
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure when the object distance is infinite. FIG. 5B shows, in order from left to right, longitudinal spherical aberration curves, astigmatic field curves and a distortion curve of the imaging apparatus according to the 5th embodiment.

In FIG. 5A, the imaging apparatus includes a photographing optical lens assembly (not otherwise herein labeled) of the present disclosure and an image sensor 595. The photographing optical lens assembly includes, in order from an object side to an image side, an aperture stop 500, a first lens element 510, a second lens element 520, a third lens element 530, a fourth lens element 540, a first stop 501, a fifth lens element 550, a sixth lens element 560, a seventh lens element 570, a second stop 502, an eighth lens element 580, a filter 593, and an image surface 594. There are air gaps in the paraxial region between adjacent lens elements among the first lens element 510, the second lens element 520, the third lens element 530, the fourth lens element 540, the fifth lens element 550, the sixth lens element 560, the seventh lens element 570, and the eighth lens element 580. There is a variable axial distance E between the seventh lens element 570 and the eighth lens element 580, and it can be realized by the driving device shown in FIG. 11A or FIG. 11B.

The first lens element 510 has positive refractive power and is made of plastic material. The first lens element 510 has an object-side surface 511 being convex in a paraxial region thereof, and an image-side surface 512 being concave in a paraxial region thereof. Both the object-side surface 511 and the image-side surface 512 are aspheric.

The second lens element 520 has negative refractive power and is made of plastic material. The second lens element 520 has an object-side surface 521 being convex in a paraxial region thereof, and an image-side surface 522 being concave in a paraxial region thereof. Both the object-side surface 521 and the image-side surface 522 are aspheric.

The third lens element 530 has negative refractive power and is made of plastic material. The third lens element 530 has an object-side surface 531 being convex in a paraxial region thereof, and an image-side surface 532 being concave in a paraxial region thereof. Both the object-side surface 531 and the image-side surface 532 are aspheric.

The fourth lens element 540 has positive refractive power and is made of plastic material. The fourth lens element 540 has an object-side surface 541 being concave in a paraxial region thereof, and an image-side surface 542 being convex in a paraxial region thereof. Both the object-side surface 541 and the image-side surface 542 are aspheric.

The fifth lens element 550 has positive refractive power and is made of plastic material. The fifth lens element 550 has an object-side surface 551 being convex in a paraxial region thereof, and an image-side surface 552 being concave in a paraxial region thereof. Both the object-side surface 551 and the image-side surface 552 are aspheric.

The sixth lens element 560 has negative refractive power and is made of plastic material. The sixth lens element 560 has an object-side surface 561 being convex in a paraxial region thereof, and an image-side surface 562 being concave in a paraxial region thereof. Both the object-side surface 561 and the image-side surface 562 are aspheric.

The seventh lens element 570 has positive refractive power and is made of plastic material. The seventh lens element 570 has an object-side surface 571 being convex in a paraxial region with at least one inflection point in an off-axis region thereof, and an image-side surface 572 being concave in a paraxial region with at least one inflection point in an off-axis region thereof. Both the object-side surface 571 and the image-side surface 572 are aspheric.

The eighth lens element 580 has negative refractive power and is made of plastic material. The eighth lens element 580 has an object-side surface 581 being concave in a paraxial region with at least one inflection point in an off-axis region thereof, and an image-side surface 582 being concave in a paraxial region with at least one inflection point in an off-axis region thereof. Both the object-side surface 581 and the image-side surface 582 are aspheric.

The photographing optical lens assembly further includes a filter 593 disposed between the eighth lens element 580 and the image surface 584. The filter 593 is made of glass material and does not affect the focal length of the photographing optical lens assembly. The image sensor 595 is disposed on or near the image surface 594

The detailed optical data of the 5th embodiment are shown in TABLE 9, and the aspheric surface data are shown in TABLE 10.

TABLE 9

(5th Embodiment) Infinity /Macro
f = 6.77/6.73 mm, Fno = 1.70/1.74, HFOV = 41.0/40.8 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Ape. Stop | Plano | | −0.926 | | | | |
| 2 | Lens 1 | 2.569 | ASP | 1.168 | Plastic | 1.545 | 56.1 | 5.64 |
| 3 | | 13.146 | ASP | 0.055 | | | | |
| 4 | Lens 2 | 12.821 | ASP | 0.300 | Plastic | 1.686 | 18.4 | −15.48 |
| 5 | | 5.753 | ASP | 0.505 | | | | |
| 6 | Lens 3 | 19.278 | ASP | 0.320 | Plastic | 1.686 | 18.4 | −143.66 |
| 7 | | 16.015 | ASP | 0.102 | | | | |
| 8 | Lens 4 | −21.650 | ASP | 0.491 | Plastic | 1.544 | 56.0 | 137.33 |
| 9 | | −16.920 | ASP | −0.152 | | | | |
| 10 | First Stop | Plano | | 0.257 | | | | |
| 11 | Lens 5 | 19.004 | ASP | 0.430 | Plastic | 1.544 | 56.0 | 59.66 |
| 12 | | 45.485 | ASP | 0.565 | | | | |
| 13 | Lens 6 | 9.716 | ASP | 0.441 | Plastic | 1.566 | 37.4 | −29.08 |
| 14 | | 6.010 | ASP | 0.293 | | | | |
| 15 | Lens 7 | 2.935 | ASP | 0.570 | Plastic | 1.544 | 56.0 | 9.42 |
| 16 | | 6.399 | ASP | −0.586/−0.556 | | | | |
| 17 | Second Stop | Plano | | 1.482 | | | | |
| 18 | Lens 8 | −11.748 | ASP | 0.641 | Plastic | 1.534 | 55.9 | −5.66 |
| 19 | | 4.149 | ASP | 0.500 | | | | |
| 20 | Filter | Plano | | 0.210 | Glass | 1.517 | 64.2 | — |
| 21 | | Plano | | 0.249/0.294 | | | | |
| 22 | Image Surface | Plano | | — | | | | |

Remark: Reference wavelength is d-line 587.6 nm.
* The effective radius of Surface 1 is 1.992 mm.
* The effective radius of Surface 10 is 2.088 mm.
* The effective radius of Surface 17 is 4.402 mm.

TABLE 10

Aspheric Coefficient

| Surface # | 2 | 3 | 4 | 5 | 6 | 7 |
|---|---|---|---|---|---|---|
| k= | −5.2004E−01 | −8.4517E+01 | 4.1191E+01 | 8.6643E+00 | 3.6045E+01 | 2.8954E+01 |
| A4= | 2.6936E−03 | −1.7002E−02 | −2.6572E−02 | −1.2298E−02 | −3.0399E−02 | −1.0285E−02 |
| A6= | 4.0357E−03 | 2.1353E−02 | 3.1003E−02 | 1.5785E−02 | 1.7909E−03 | −4.0702E−02 |
| A8= | −3.7918E−03 | −1.0665E−02 | −1.8069E−02 | −1.1927E−02 | −7.2121E−04 | 6.7667E−02 |
| A10= | 2.4306E−03 | 2.2774E−03 | 6.1913E−03 | 5.7985E−03 | −1.7413E−03 | −7.0423E−02 |
| A12= | −8.6632E−04 | 3.9330E−05 | −1.1484E−03 | −1.5786E−03 | 1.8609E−03 | 4.1490E−02 |
| A14= | 1.6471E−04 | −9.0116E−05 | 1.1901E−04 | 2.1636E−04 | −5.4844E−04 | −1.3144E−02 |
| A16= | −1.3436E−05 | 9.2007E−06 | −6.0240E−06 | | 5.0026E−05 | 2.1099E−03 |
| A18= | | | | | | −1.3454E−04 |

| Surface # | 8 | 9 | 11 | 12 | 13 | 14 |
|---|---|---|---|---|---|---|
| k= | 3.6425E+01 | 3.6000E+01 | −5.0139E+01 | 9.5701E+01 | 2.7886E−01 | −9.9000E+01 |
| A4= | 3.8970E−02 | 5.2507E−02 | 4.0138E−02 | 4.0946E−03 | −1.3890E−02 | −1.4604E−02 |
| A6= | −9.9445E−02 | −1.1169E−01 | −1.0333E−01 | −2.9033E−02 | 6.2238E−05 | −4.0812E−03 |
| A8= | 1.5296E−01 | 1.1005E−01 | 8.4695E−02 | 1.4285E−02 | −2.5902E−03 | 2.5261E−03 |
| A10= | −1.4964E−01 | −6.1277E−02 | −3.7025E−02 | −2.9185E−03 | 1.4118E−03 | −9.7223E−04 |
| A12= | 8.5158E−02 | 1.5968E−02 | 6.0866E−03 | −1.3567E−03 | −4.6143E−04 | 2.3409E−04 |
| A14= | −2.7354E−02 | 2.1354E−04 | 1.2412E−03 | 7.3028E−04 | 9.9552E−05 | −3.1881E−05 |
| A16= | 4.6330E−03 | −1.1900E−03 | −7.0244E−04 | −1.4720E−04 | −1.4024E−05 | 2.3864E−06 |
| A18= | −3.2252E−04 | 2.7031E−04 | 1.1227E−04 | 1.3647E−05 | 1.1659E−06 | −9.1574E−08 |
| A20= | | −1.9992E−05 | −6.4239E−06 | −4.8354E−07 | −4.1980E−08 | 1.4073E−09 |

| Surface # | 15 | 16 | 18 | 19 |
|---|---|---|---|---|
| k= | −1.2355E+00 | −1.5612E+01 | 4.4429E+00 | −4.5968E−01 |
| A4= | −3.9099E−02 | 1.5123E−02 | −4.8345E−02 | −5.1104E−02 |
| A6= | 6.9138E−03 | −1.3081E−02 | 9.6168E−03 | 1.0467E−02 |
| A8= | −3.9242E−03 | 3.2890E−03 | −1.1619E−03 | −1.7220E−03 |
| A10= | 1.3378E−03 | −5.1358E−04 | 1.1773E−04 | 1.9477E−04 |
| A12= | −2.7175E−04 | 5.0551E−05 | −9.3958E−06 | −1.4289E−05 |
| A14= | 3.3414E−05 | −3.1105E−06 | 5.1808E−07 | 6.5707E−07 |
| A16= | −2.3918E−06 | 1.1900E−07 | −1.7959E−08 | −1.8132E−08 |
| A18= | 9.1219E−08 | −2.6505E−09 | 3.5046E−10 | 2.7408E−10 |
| A20= | −1.4318E−09 | 2.6340E−11 | −2.9395E−12 | −1.7531E−12 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again, wherein HFOVinf and HFOVmacro are the half of a maximum field of view when the object distance is infinite and 500 mm, respectively.

Moreover, these parameters can be calculated from TABLE 9 and TABLE 10 and satisfy the conditions stated in table below.

| 5th Embodiment | | | |
|---|---|---|---|
| finf [mm] | 6.77 | ImgH [mm] | 6.016 |
| Fnoinf | 1.70 | ImgH/finf | 0.89 |
| HFOVinf [deg.] | 41.0 | ImgH/BLinf | 6.27 |
| HFOVmacro [deg.] | 40.8 | TLinf/finf | 1.16 |
| Nmax | 1.686 | TLinf/ImgH | 1.30 |
| Vdmin | 18.4 | Y11/Ylast | 0.42 |
| ΣCT/TLinf | 0.56 | |(ATinf − ATmacro)|*10 [mm] | 0.30 |
| finf/EPDinf | 1.70 | |(ATinf − ATmacro)|/CTmin | 0.10 |
| SLinf/TLinf | 0.88 | |(ATinf − ATmacro)/(TLinf − TLmacro)| | 0.40 |
| TLinf [mm] | 7.84 | |(ATinf − ATmacro)/(BLinf − BLmacro)| | 0.67 |

6th Embodiment

Figure 6A:
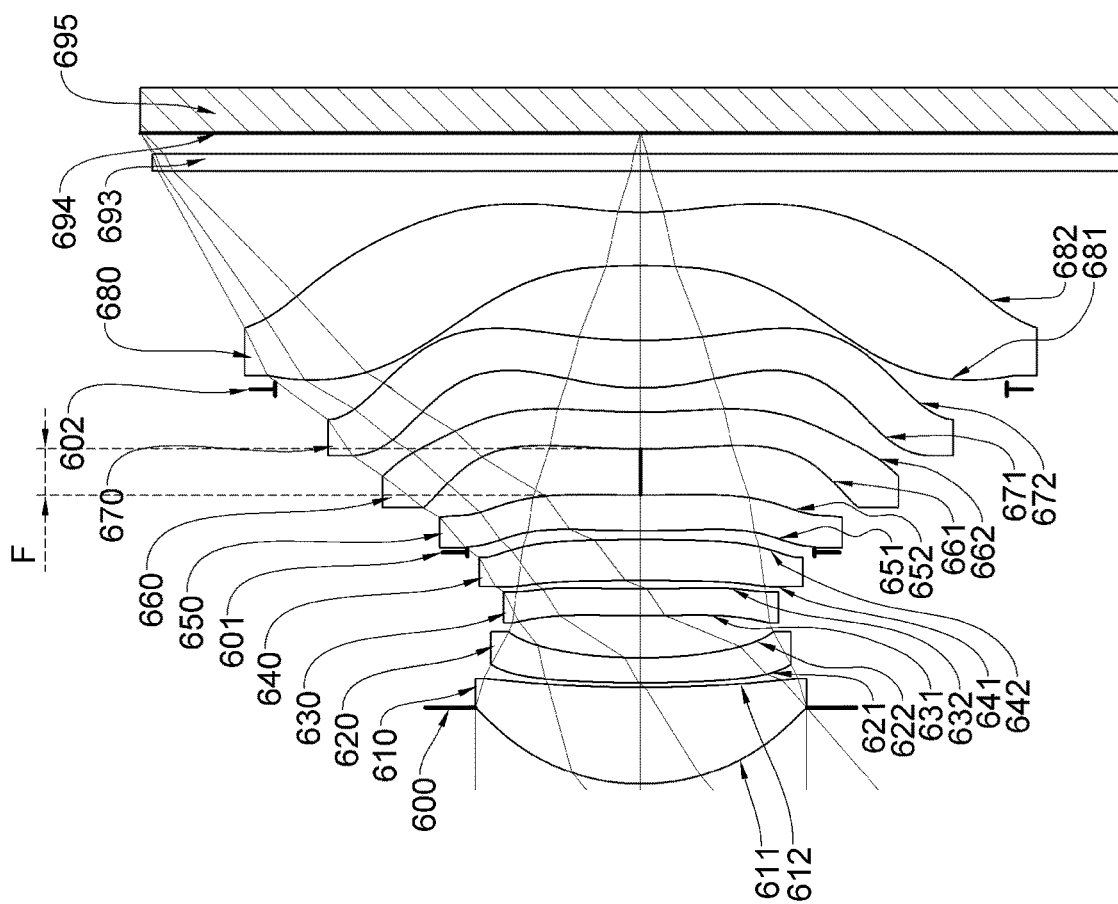
FIG. 6A is a schematic view of an imaging apparatus according to the 6th embodiment of the present disclosure.
Figure 6B:
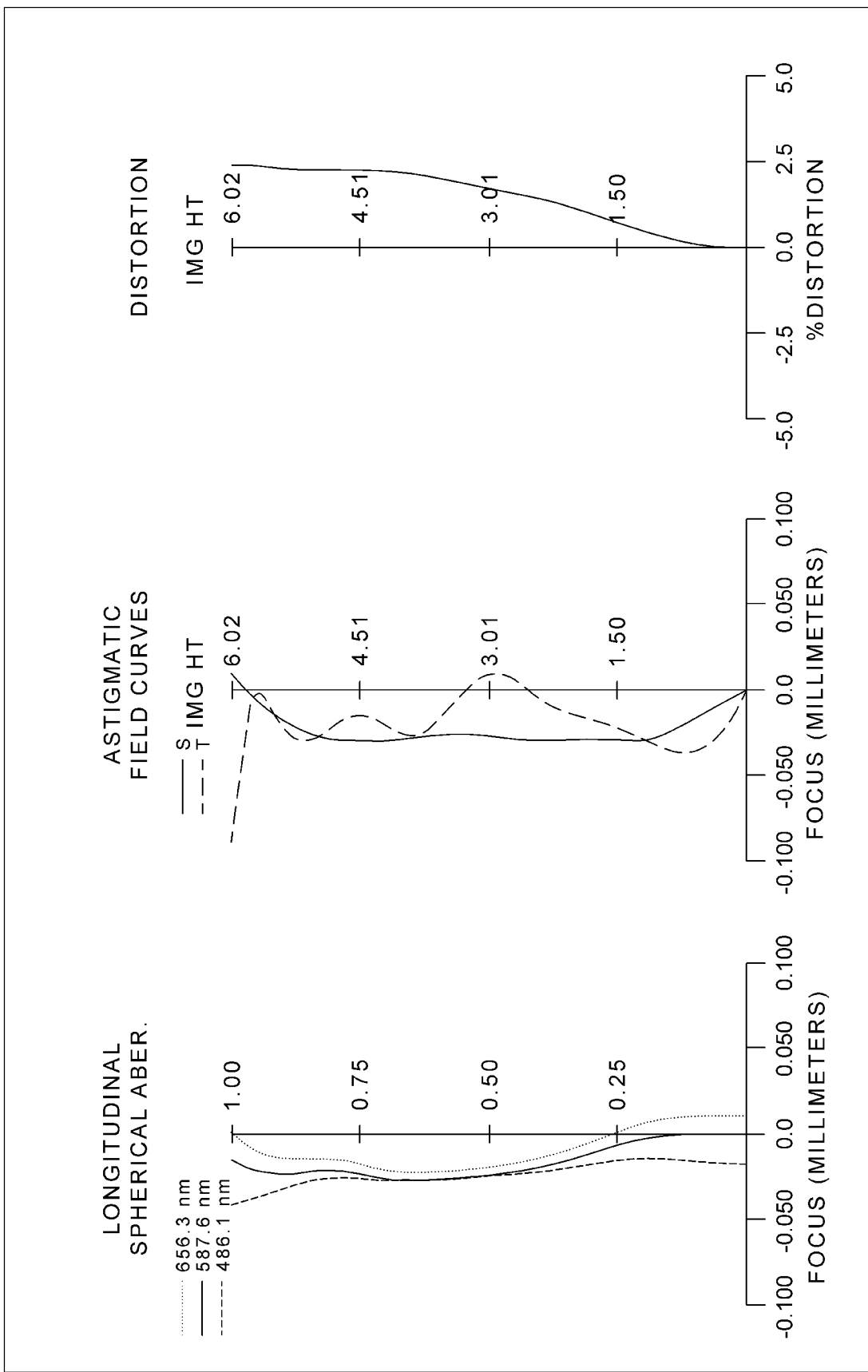
FIG. 6B shows longitudinal spherical aberration curves, astigmatic field curves and a distortion curve of the imaging apparatus according to the 6th embodiment.

The imaging apparatus of the 6th embodiment of the present invention uses the same optical system as the 5th embodiment, but the imaging apparatus of the 6th embodiment includes two different variable axial distances. FIG. 6A is a schematic view of an imaging apparatus according to the 6th embodiment of the present disclosure when the object distance is infinite. FIG. 6B shows, in order from left to right, longitudinal spherical aberration curves, astigmatic field curves and a distortion curve of the imaging apparatus according to the 6th embodiment.

In FIG. 6A, the imaging apparatus includes a photographing optical lens assembly (not otherwise herein labeled) of the present disclosure and an image sensor 695. The photographing optical lens assembly includes, in order from an object side to an image side, an aperture stop 600, a first lens element 610, a second lens element 620, a third lens element 630, a fourth lens element 640, a first stop 601, a fifth lens element 650, a sixth lens element 660, a seventh lens element 670, a second stop 602, an eighth lens element 680, a filter 693, and an image surface 694. There are air gaps in the paraxial region between adjacent lens elements among the first lens element 610, the second lens element 620, the third lens element 630, the fourth lens element 640, the fifth lens element 650, the sixth lens element 660, the seventh lens element 670, and the eighth lens element 680. There is a variable axial distance F between the fifth lens element 650 and the sixth lens element 660, and it can be realized by the driving device shown in FIG. 11A or FIG. 11B.

The detailed optical data of the 6th embodiment are shown in TABLE 11, and the aspheric surface data are shown in TABLE 12.

TABLE 11

(6th Embodiment) Infinity /Macro
f = 6.77/6.77 mm, Fno = 1.70/1.74, HFOV = 41.0/40.7 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Ape. Stop | Plano | | −0.926 | | | | |
| 2 | Lens 1 | 2.569 | ASP | 1.168 | Plastic | 1.545 | 56.1 | 5.64 |
| 3 | | 13.146 | ASP | 0.055 | | | | |
| 4 | Lens 2 | 12.821 | ASP | 0.300 | Plastic | 1.686 | 18.4 | −15.48 |
| 5 | | 5.753 | ASP | 0.505 | | | | |
| 6 | Lens 3 | 19.278 | ASP | 0.320 | Plastic | 1.686 | 18.4 | −143.66 |
| 7 | | 16.015 | ASP | 0.102 | | | | |
| 8 | Lens 4 | −21.650 | ASP | 0.491 | Plastic | 1.544 | 56.0 | 137.33 |
| 9 | | −16.920 | ASP | −0.152 | | | | |
| 10 | First Stop | Plano | | 0.257 | | | | |
| 11 | Lens 5 | 19.004 | ASP | 0.430 | Plastic | 1.544 | 56.0 | 59.66 |
| 12 | | 45.485 | ASP | 0.565 /0.575 | | | | |
| 13 | Lens 6 | 9.716 | ASP | 0.441 | Plastic | 1.566 | 37.4 | −29.08 |
| 14 | | 6.010 | ASP | 0.293 | | | | |
| 15 | Lens 7 | 2.935 | ASP | 0.570 | Plastic | 1.544 | 56.0 | 9.42 |
| 16 | | 6.399 | ASP | −0.586 | | | | |
| 17 | Second Stop | Plano | | 1.482 | | | | |
| 18 | Lens 8 | −11.748 | ASP | 0.641 | Plastic | 1.534 | 55.9 | −5.66 |
| 19 | | 4.149 | ASP | 0.500 | | | | |
| 20 | Filter | Plano | | 0.210 | Glass | 1.517 | 64.2 | — |
| 21 | | Plano | | 0.249/0.328 | | | | |
| 22 | Image Surface | Plano | | — | | | | |

Remark: Reference wavelength is d-line 587.6 nm.
* The effective radius of Surface 1 is 1.992 mm.
* The effective radius of Surface 10 is 2.088 mm.
* The effective radius of Surface 17 is 4.402 mm.

TABLE 12

Aspheric Coefficient

| Surface # | 2 | 3 | 4 | 5 | 6 | 7 |
|---|---|---|---|---|---|---|
| k= | −5.2004E−01 | −8.4517E+01 | 4.1191E+01 | 8.6643E+00 | 3.6045E+01 | 2.8954E+01 |
| A4= | 2.6936E−03 | −1.7002E−02 | −2.6572E−02 | −1.2298E−02 | −3.0399E−02 | −1.0285E−02 |
| A6= | 4.0357E−03 | 2.1353E−02 | 3.1003E−02 | 1.5785E−02 | 1.7909E−03 | −4.0702E−02 |
| A8= | −3.7918E−03 | −1.0665E−02 | −1.8069E−02 | −1.1927E−02 | −7.2121E−04 | 6.7667E−02 |
| A10= | 2.4306E−03 | 2.2774E−03 | 6.1913E−03 | 5.7985E−03 | −1.7413E−03 | −7.0423E−02 |
| A12= | −8.6632E−04 | 3.9330E−05 | −1.1484E−03 | −1.5786E−03 | 1.8609E−03 | 4.1490E−02 |
| A14= | 1.6471E−04 | −9.0116E−05 | 1.1901E−04 | 2.1636E−04 | −5.4844E−04 | −1.3144E−02 |
| A16= | −1.3436E−05 | 9.2007E−06 | −6.0240E−06 | | 5.0026E−05 | 2.1099E−03 |
| A18= | | | | | | −1.3454E−04 |

| Surface # | 8 | 9 | 11 | 12 | 13 | 14 |
|---|---|---|---|---|---|---|
| k= | 3.6425E+01 | 3.6000E+01 | −5.0139E+01 | 9.5701E+01 | 2.7886E−01 | −9.9000E+01 |
| A4= | 3.8970E−02 | 5.2507E−02 | 4.0138E−02 | 4.0946E−03 | −1.3890E−02 | −1.4604E−02 |
| A6= | −9.9445E−02 | −1.1169E−01 | −1.0333E−01 | −2.9033E−02 | 6.2238E−05 | −4.0812E−03 |
| A8= | 1.5296E−01 | 1.1005E−01 | 8.4695E−02 | 1.4285E−02 | −2.5902E−03 | 2.5261E−03 |
| A10= | −1.4964E−01 | −6.1277E−02 | −3.7025E−02 | −1.9185E−03 | 1.4118E−03 | −9.7223E−04 |
| A12= | 8.5158E−02 | 1.5968E−02 | 6.0866E−03 | −1.3567E−04 | −4.6143E−04 | 2.3409E−04 |
| A14= | −2.7354E−02 | 2.1354E−04 | 1.2412E−03 | 7.3028E−04 | 9.9552E−05 | −3.1881E−05 |
| A16= | 4.6330E−03 | −1.1900E−03 | −7.0244E−04 | −1.4720E−04 | −1.4024E−05 | 2.3864E−06 |
| A18= | −3.2252E−04 | 2.7031E−04 | 1.1227E−04 | 1.3647E−05 | 1.1659E−06 | −9.1574E−08 |
| A20= | | −1.9992E−05 | −6.4239E−06 | −4.8354E−07 | −4.1980E−08 | 1.4073E−09 |

TABLE 12-continued

| Aspheric Coefficient | | | | |
|---|---|---|---|---|
| Surface # | 15 | 16 | 18 | 19 |
| k= | −1.2355E+00 | −1.5612E+01 | 4.4429E+00 | −4.5968E−01 |
| A4= | −3.9099E−02 | 1.5123E−02 | −4.8345E−02 | −5.1104E−02 |
| A6= | 6.9138E−03 | −1.3081E−02 | 9.6168E−03 | 1.0467E−02 |
| A8= | −3.9242E−03 | 3.2890E−03 | −1.1619E−03 | −1.7220E−03 |
| A10= | 1.3378E−03 | −5.1358E−04 | 1.1773E−04 | 1.9477E−04 |
| A12= | −2.7175E−04 | 5.0551E−05 | −9.3958E−06 | −1.4289E−05 |
| A14= | 3.3414E−05 | −3.1105E−06 | 5.1808E−07 | 6.5707E−07 |
| A16= | −2.3918E−06 | 1.1900E−07 | −1.7959E−08 | −1.8132E−08 |
| A18= | 9.1219E−08 | −2.6505E−09 | 3.5046E−10 | 2.7408E−10 |
| A20= | −1.4318E−09 | 2.6340E−11 | −2.9395E−12 | −1.7531E−12 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again, wherein HFOVinf and HFOVmacro are the half of a maximum field of view when the object distance is infinite and 500 mm, respectively.

Moreover, these parameters can be calculated from TABLE 11 and TABLE 12 and satisfy the conditions stated in table below.

| 6th Embodiment | | | |
|---|---|---|---|
| finf [mm] | 6.77 | ImgH [mm] | 6.016 |
| Fnoinf | 1.70 | ImgH/finf | 0.89 |
| HFOVinf [deg.] | 41.0 | ImgH/BLinf | 6.27 |
| HFOVmacro [deg.] | 40.8 | TLinf/finf | 1.16 |
| Nmax | 1.686 | TLinf/ImgH | 1.30 |
| Vdmin | 18.4 | Yll/Ylast | 0.42 |
| ΣCT/TLinf | 0.56 | \|(ATinf − ATmacro)\|*10 [mm] | 0.10 |
| finf/EPDinf | 1.70 | \|(ATinf − ATmacro)\|/CTmin | 0.03 |
| SLinf/TLinf | 0.88 | \|(ATinf − ATmacro)/(TLinf − TLmacro)\| | 0.11 |
| TLinf [mm] | 7.84 | \|(ATinf − ATmacro)/(BLinf − BLmacro)\| | 0.13 |

7th Embodiment

Figure 7A:
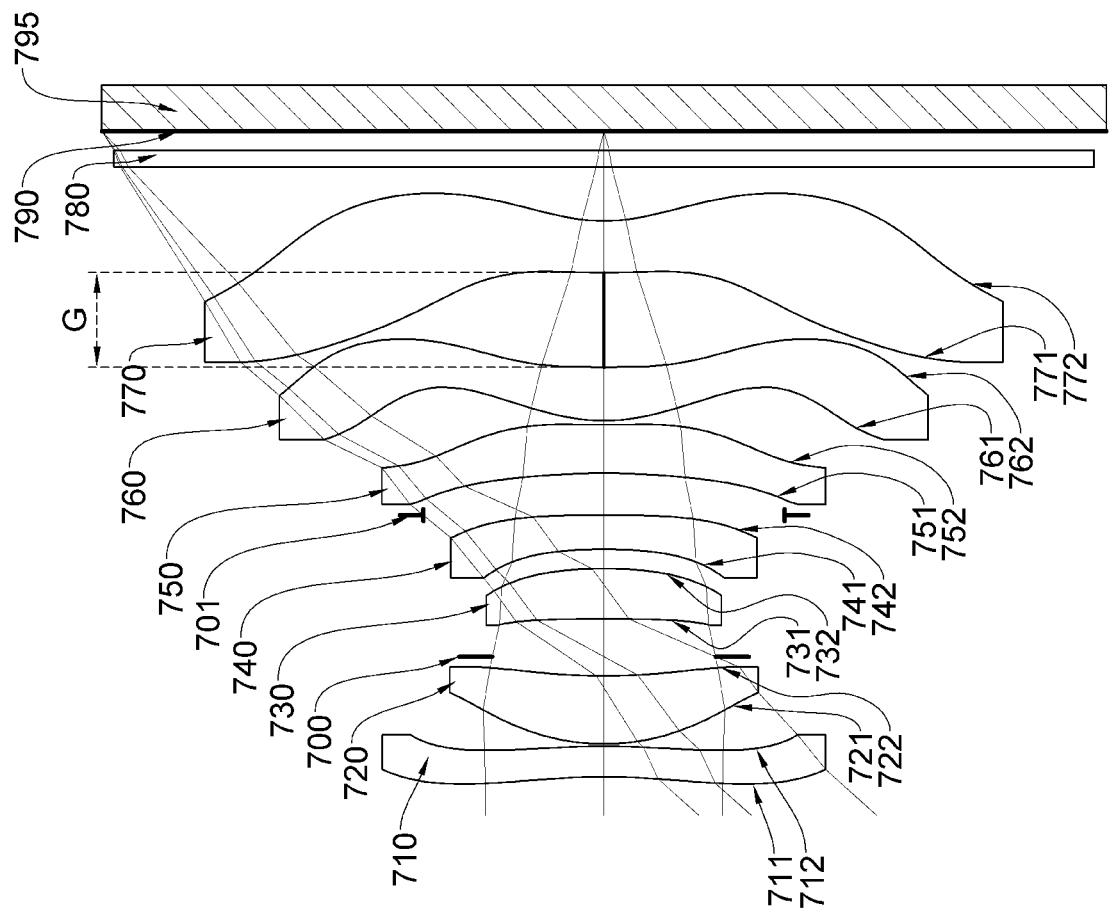
FIG. 7A is a schematic view of an imaging apparatus according to the 7th embodiment of the present disclosure.
Figure 7B:
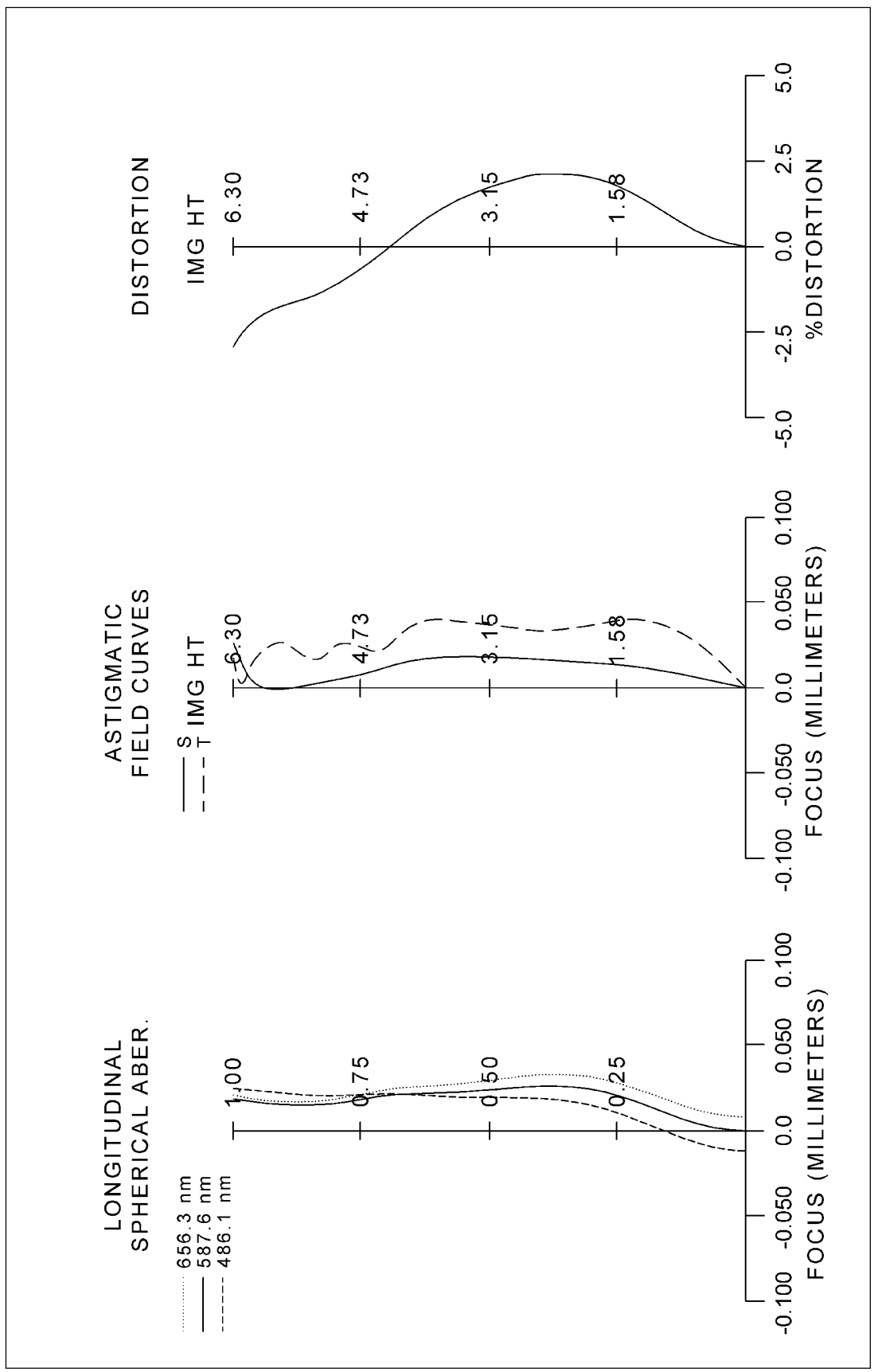
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure when the object distance is infinite. FIG. 7B shows, in order from left to right, longitudinal spherical aberration curves, astigmatic field curves and a distortion curve of the imaging apparatus according to the 7th embodiment.

In FIG. 7A, the imaging apparatus includes a photographing optical lens assembly (not otherwise herein labeled) of the present disclosure and an image sensor 795. The photographing optical lens assembly includes, in order from an object side to an image side, a first lens element 710, a second lens element 720, an aperture stop 700, a third lens element 730, a fourth lens element 740, a stop 701, a fifth lens element 750, a sixth lens element 760, a seventh lens element 770, a filter 780, and an image surface 790. There are air gaps in the paraxial region between adjacent lens elements among the first lens element 710, the second lens element 720, the third lens element 730, the fourth lens element 740, the fifth lens element 750, the sixth lens element 760, and the seventh lens element 770. There is a variable axial distance G between the sixth lens element 760 and the seventh lens element 770, which can change between the infinity mode and macro mode, and it can be realized by the driving device shown in FIG. 11A or FIG. 11B.

The first lens element 710 has negative refractive power and is made of plastic material. The first lens element 710 has an object-side surface 711 being concave in a paraxial region thereof, and an image-side surface 712 being convex in a paraxial region thereof. Both the object-side surface 711 and the image-side surface 712 are aspheric.

The second lens element 720 has positive refractive power and is made of plastic material. The second lens element 720 has an object-side surface 721 being convex in a paraxial region thereof, and an image-side surface 722 being concave in a paraxial region thereof. Both the object-side surface 721 and the image-side surface 722 are aspheric.

The third lens element 730 has positive refractive power and is made of plastic material. The third lens element 730 has an object-side surface 731 being concave in a paraxial region thereof, and an image-side surface 732 being convex in a paraxial region thereof. Both the object-side surface 731 and the image-side surface 732 are aspheric.

The fourth lens element 740 has negative refractive power and is made of plastic material. The fourth lens element 740 has an object-side surface 741 being concave in a paraxial region thereof, and an image-side surface 742 being convex in a paraxial region thereof. Both the object-side surface 741 and the image-side surface 742 are aspheric.

The fifth lens element 750 has negative refractive power and is made of plastic material. The fifth lens element 750 has an object-side surface 751 being concave in a paraxial region thereof, and an image-side surface 752 being concave in a paraxial region thereof. Both the object-side surface 751 and the image-side surface 752 are aspheric.

The sixth lens element 760 has positive refractive power and is made of plastic material. The sixth lens element 760 has an object-side surface 761 being convex in a paraxial region with at least one inflection point in an off-axis region thereof, and an image-side surface 762 being concave in a paraxial region with at least one inflection point in an off-axis region thereof. Both the object-side surface 761 and the image-side surface 762 are aspheric.

The seventh lens element 770 has negative refractive power and is made of plastic material. The seventh lens element 770 has an object-side surface 771 being convex in a paraxial region with at least one inflection point in an off-axis region thereof, and an image-side surface 772 being concave in a paraxial region with at least one inflection point in an off-axis region thereof. Both the object-side surface 771 and the image-side surface 772 are aspheric.

The photographing optical lens assembly further includes a filter 780 disposed between the seventh lens element 770 and the image surface 790. The filter 780 is made of glass material and does not affect the focal length of the photographing optical lens assembly. The image sensor 795 is disposed on or near the image surface 790

The detailed optical data of the 7th embodiment are shown in TABLE 13, and the aspheric surface data are shown in TABLE 14.

TABLE 13

(7th Embodiment) Infinity /Macro
f= 5.81/5.80 mm, Fno = 1.95/1.99, HFOV = 48.1/47.9 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Lens 1 | −7.682 | ASP | 0.381 | Plastic | 1.639 | 23.5 | −60.99 |
| 2 | | −9.754 | ASP | 0.030 | | | | |
| 3 | Lens 2 | 2.702 | ASP | 0.854 | Plastic | 1.544 | 56.0 | 7.42 |
| 4 | | 7.266 | ASP | 0.243 | | | | |
| 5 | Ape. Stop | Plano | | 0.472 | | | | |
| 6 | Lens 3 | −51.178 | ASP | 0.632 | Plastic | 1.544 | 56.0 | 11.81 |
| 7 | | −5.734 | ASP | 0.242 | | | | |
| 8 | Lens 4 | −7.933 | ASP | 0.430 | Plastic | 1.669 | 19.4 | −15.21 |
| 9 | | −36.721 | ASP | 0.000 | | | | |
| 10 | Stop | Plano | | 0.528 | | | | |
| 11 | Lens 5 | −7.868 | ASP | 0.605 | Plastic | 1.566 | 37.4 | −8.21 |
| 12 | | 11.667 | ASP | 0.054 | | | | |
| 13 | Lens 6 | 2.229 | ASP | 0.672 | Plastic | 1.544 | 56.0 | 4.33 |
| 14 | | 37.823 | ASP | 1.186/1.196 | | | | |
| 15 | Lens 7 | 8.905 | ASP | 0.650 | Plastic | 1.544 | 56.0 | −5.52 |
| 16 | | 2.188 | ASP | 0.677 | | | | |
| 17 | Filter | Plano | | 0.210 | Glass | 1.517 | 64.2 | — |
| 18 | | Plano | | 0.241/0.295 | | | | |
| 19 | Image Surface | Plano | | — | | | | |

Remark: Reference wavelength is d-line 587.6 nm.
* The effective radius of Surface 10 is 2.265 mm.

TABLE 14

Aspheric Coefficient

| Surface # | 1 | 2 | 3 | 4 | 6 |
|---|---|---|---|---|---|
| k= | −5.0000E+01 | −4.2666E+01 | −1.0000E+00 | 1.8647E+00 | 1.2118E−09 |
| A4= | 3.5392E−03 | 9.4383E−03 | −1.6320E−03 | −7.4949E−03 | −1.3473E−02 |
| A6= | 7.5821E−04 | −8.0415E−04 | 5.4123E−03 | −2.1850E−03 | −2.3616E−04 |
| A8= | −8.4669E−05 | 4.6381E−04 | −4.8504E−03 | 3.4056E−03 | −6.7168E−03 |
| A10= | −8.3725E−06 | −1.3579E−04 | 2.7743E−03 | −3.3151E−03 | 8.8583E−03 |
| A12= | 2.9175E−06 | 1.9698E−05 | −9.9747E−04 | 1.3698E−03 | −6.3013E−03 |
| A14= | −1.7406E−07 | −9.2276E−07 | 1.7528E−04 | −2.6389E−04 | 2.2501E−03 |
| A16= | | | −1.1812E−05 | 1.9728E−05 | −3.2406E−04 |

| Surface # | 7 | 8 | 9 | 11 | 12 |
|---|---|---|---|---|---|
| k= | 1.4529E−01 | −5.1589E−01 | 1.8409E−09 | −4.4959E+00 | 2.5825E−09 |
| A4= | −2.8439E−02 | −4.3343E−02 | −1.3752E−02 | 2.1914E−02 | −9.5418E−02 |
| A6= | −6.8332E−03 | −4.7967E−03 | −1.3475E−02 | 3.7862E−03 | 3.9094E−02 |
| A8= | 9.6336E−03 | 5.5333E−03 | 1.0720E−02 | 3.7862E−03 | −1.2925E−02 |
| A10= | −5.0017E−03 | 1.8910E−03 | −4.5885E−03 | −7.7415E−04 | 2.9682E−03 |
| A12= | 6.6118E−04 | −3.3907E−03 | 1.0662E−03 | 1.8595E−04 | −4.0403E−04 |
| A14= | 2.2293E−04 | 1.2096E−03 | −1.4337E−04 | −4.4692E−05 | 3.0264E−05 |
| A16= | −6.8062E−05 | −1.4911E−04 | 1.0013E−05 | 6.0046E−06 | −1.1010E−06 |
| A18= | | | | −3.0367E−07 | 1.3405E−08 |

| Surface # | 13 | 14 | 15 | 16 |
|---|---|---|---|---|
| k= | −6.4559E+00 | −5.0000E+01 | 1.7953E−01 | −9.7146E−01 |
| A4= | 7.8043E−05 | 7.1836E−02 | −5.7258E−02 | −6.7543E−02 |
| A6= | 3.6193E−03 | −2.8635E−02 | 4.9668E−03 | 1.3596E−02 |
| A8= | −4.3267E−03 | 5.8426E−03 | 8.4477E−04 | −2.1511E−03 |

TABLE 14-continued

| Aspheric Coefficient | | | | |
|---|---|---|---|---|
| A10= | 1.3906E−03 | −7.6093E−04 | −2.2432E−04 | 2.4164E−04 |
| A12= | −2.4514E−04 | 6.5686E−05 | 2.2203E−05 | −1.8479E−05 |
| A14= | 2.6176E−05 | −3.7032E−06 | −1.2034E−06 | 9.2106E−07 |
| A16= | −1.6654E−06 | 1.2804E−07 | 3.7545E−08 | −2.8274E−08 |
| A18= | 5.7825E−08 | −2.3696E−09 | −6.3290E−10 | 4.8250E−10 |
| A20= | −8.4231E−10 | 1.6689E−11 | 4.4636E−12 | −3.4941E−12 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again, wherein HFOVinf and HFOVmacro are the half of a maximum field of view when the object distance is infinite and 500 mm, respectively.

Moreover, these parameters can be calculated from TABLE 13 and TABLE 14 and satisfy the conditions stated in table below.

| 7th Embodiment | | | |
|---|---|---|---|
| finf [mm] | 5.81 | ImgH [mm] | 6.300 |
| Fnoinf | 1.95 | ImgH/finf | 1.08 |
| HFOVinf [deg.] | 48.1 | ImgH/BLinf | 5.59 |
| HFOVmacro [deg.] | 47.9 | TLinf/finf | 1.40 |
| Nmax | 1.669 | TLinf/ImgH | 1.29 |
| Vdmin | 19.4 | Y11/Ylast | 0.56 |
| ΣCT/TLinf | 0.52 | |(ATinf − ATmacro)|*10 [mm] | 0.10 |
| finf/EPDinf | 1.95 | |(ATinf − ATmacro)|/CTmin | 0.03 |
| SLinf/TLinf | 0.81 | |(ATinf − ATmacro)/(TLinf − TLmacro)| | 0.157 |
| TLinf [mm] | 8.11 | |(ATinf − ATmacro)/(BLinf − BLmacro)| | 0.19 |

8th Embodiment

Figure 8A:
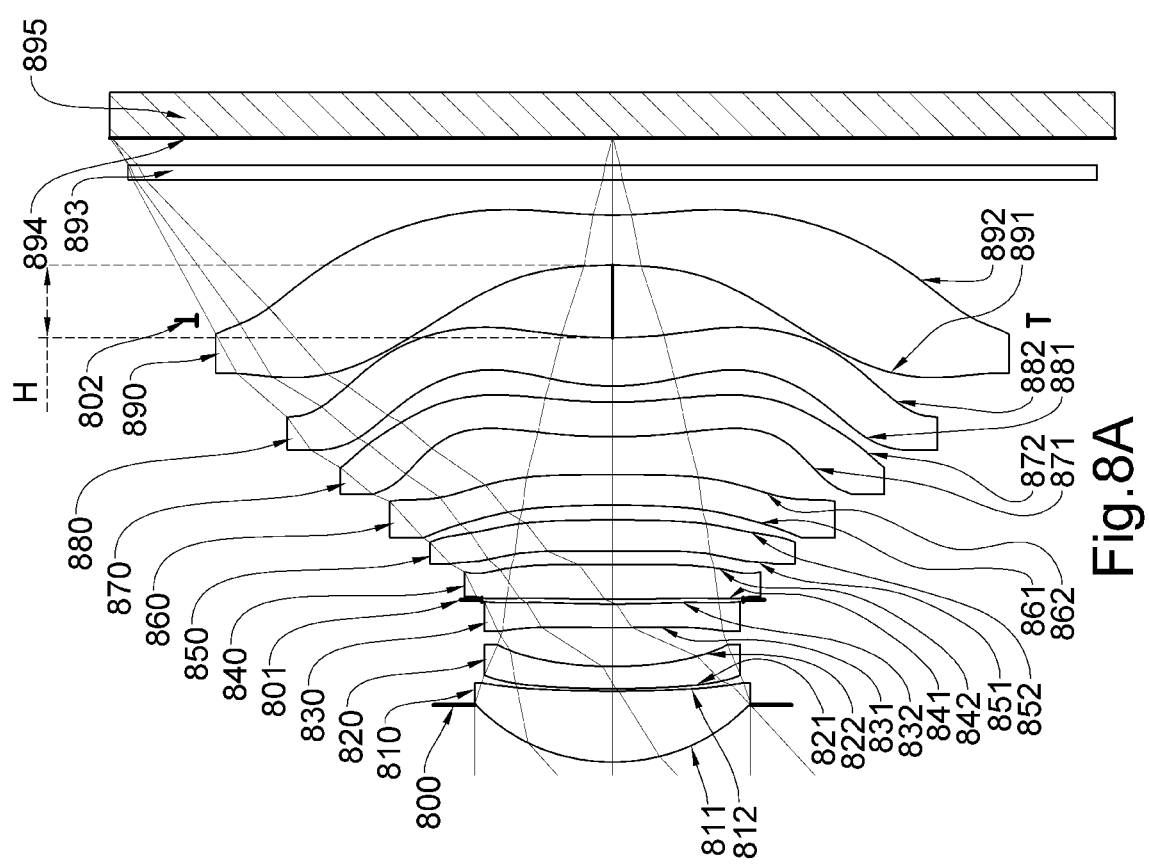
FIG. 8A is a schematic view of an imaging apparatus according to the 8th embodiment of the present disclosure.
Figure 8B:
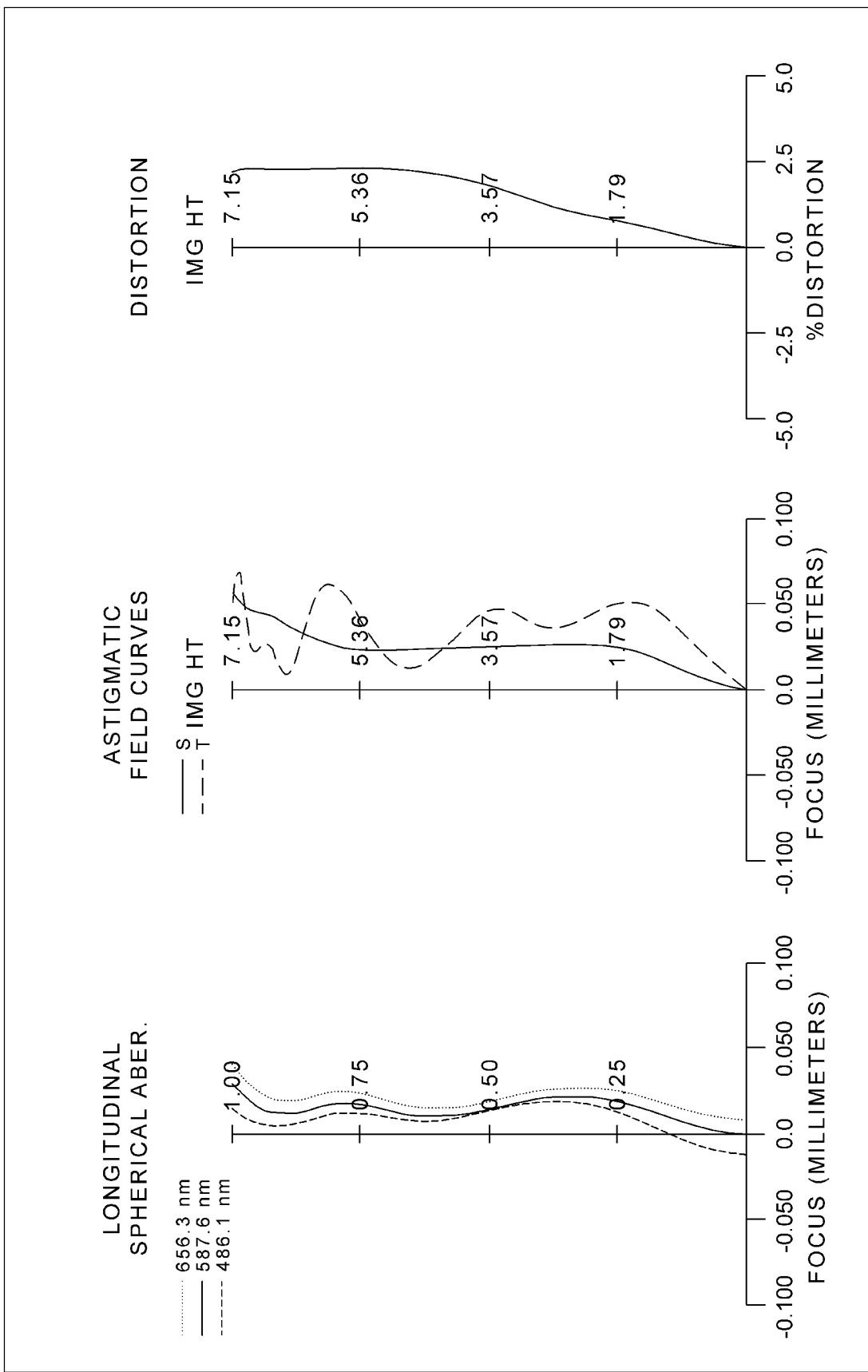
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure when the object distance is infinite. FIG. 8B shows, in order from left to right, longitudinal spherical aberration curves, astigmatic field curves and a distortion curve of the imaging apparatus according to the 8th embodiment.

In FIG. 8A, the imaging apparatus includes a photographing optical lens assembly (not otherwise herein labeled) of the present disclosure and an image sensor 895. The photographing optical lens assembly includes, in order from an object side to an image side, an aperture stop 800, a first lens element 810, a second lens element 820, a third lens element 830, a first stop 801, a fourth lens element 840, a fifth lens element 850, a sixth lens element 860, a seventh lens element 870, an eighth lens element 880, a ninth lens element 890, a second stop 802, a filter 893, and an image surface 894. There are air gaps in the paraxial region between adjacent lens elements among the first lens element 810, the second lens element 820, the third lens element 830, the fourth lens element 840, the fifth lens element 850, the sixth lens element 860, the seventh lens element 870, the eighth lens element 880, and the ninth lens element 890. There is a variable axial distance H between the eighth lens element 880 and the ninth lens element 890, and it can be realized by the driving device shown in FIG. 11A or FIG. 11B.

The first lens element 810 has positive refractive power and is made of plastic material. The first lens element 810 has an object-side surface 811 being convex in a paraxial region thereof, and an image-side surface 812 being concave in a paraxial region thereof. Both the object-side surface 811 and the image-side surface 812 are aspheric.

The second lens element 820 has negative refractive power and is made of plastic material. The second lens element 820 has an object-side surface 821 being convex in a paraxial region thereof, and an image-side surface 822 being concave in a paraxial region thereof. Both the object-side surface 821 and the image-side surface 822 are aspheric.

The third lens element 830 has negative refractive power and is made of plastic material. The third lens element 830 has an object-side surface 831 being convex in a paraxial region thereof, and an image-side surface 832 being concave in a paraxial region thereof. Both the object-side surface 831 and the image-side surface 832 are aspheric.

The fourth lens element 840 has positive refractive power and is made of plastic material. The fourth lens element 840 has an object-side surface 841 being convex in a paraxial region thereof, and an image-side surface 842 being concave in a paraxial region thereof. Both the object-side surface 841 and the image-side surface 842 are aspheric.

The fifth lens element 850 has positive refractive power and is made of plastic material. The fifth lens element 850 has an object-side surface 851 being convex in a paraxial region thereof, and an image-side surface 852 being convex in a paraxial region thereof. Both the object-side surface 851 and the image-side surface 852 are aspheric.

The sixth lens element 860 has negative refractive power and is made of plastic material. The sixth lens element 860 has an object-side surface 861 being concave in a paraxial region thereof, and an image-side surface 862 being convex in a paraxial region thereof. Both the object-side surface 861 and the image-side surface 862 are aspheric.

The seventh lens element 870 has negative refractive power and is made of plastic material. The seventh lens element 870 has an object-side surface 871 being convex in a paraxial region thereof, and an image-side surface 872 being concave in a paraxial region thereof. Both the object-side surface 871 and the image-side surface 872 are aspheric.

The eighth lens element 880 has positive refractive power and is made of plastic material. The eighth lens element 880 has an object-side surface 881 being convex in a paraxial region with at least one inflection point in an off-axis region thereof, and an image-side surface 882 being concave in a paraxial region with at least one inflection point in an off-axis region thereof. Both the object-side surface 881 and the image-side surface 882 are aspheric.

The ninth lens element 890 has negative refractive power and is made of plastic material. The ninth lens element 890 has an object-side surface 891 being concave in a paraxial region with at least one inflection point in an off-axis region thereof, and an image-side surface 892 being concave in a paraxial region with at least one inflection point in an off-axis region thereof. Both the object-side surface 891 and the image-side surface 892 are aspheric.

The photographing optical lens assembly further includes a filter 893 disposed between the ninth lens element 890 and the image surface 894. The filter 180 is made of glass material and does not affect the focal length of the photographing optical lens assembly. The image sensor 895 is disposed on or near the image surface 894

The detailed optical data of the 8th embodiment are shown in TABLE 15, and the aspheric surface data are shown in TABLE 16.

TABLE 15

(8th Embodiment) Infinity /Macro
f = 7.60/7.56 mm, Fno = 1.94/2.00, HFOV = 42.5/42.2 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Ape. Stop | Plano | | −0.815 | | | | |
| 2 | Lens 1 | 2.794 | ASP | 1.008 | Plastic | 1.545 | 56.1 | 6.02 |
| 3 | | 16.439 | ASP | 0.035 | | | | |
| 4 | Lens 2 | 11.763 | ASP | 0.315 | Plastic | 1.620 | 23.4 | −14.76 |
| 5 | | 5.092 | ASP | 0.554 | | | | |
| 6 | Lens 3 | 21.653 | ASP | 0.335 | Plastic | 1.686 | 18.4 | −54.41 |
| 7 | | 13.617 | ASP | 0.062 | | | | |
| 8 | First Stop | Plano | | 0.006 | | | | |
| 9 | Lens 4 | 27.178 | ASP | 0.494 | Plastic | 1.544 | 56.0 | 64.09 |
| 10 | | 122.430 | ASP | 0.191 | | | | |
| 11 | Lens 5 | 50.720 | ASP | 0.448 | Plastic | 1.544 | 56.0 | 22.82 |
| 12 | | −16.389 | ASP | 0.210 | | | | |
| 13 | Lens 6 | −14.141 | ASP | 0.431 | Plastic | 1.577 | 33.5 | −27.16 |
| 14 | | −145.706 | ASP | 0.543 | | | | |
| 15 | Lens 7 | 8.904 | ASP | 0.493 | Plastic | 1.566 | 37.4 | −63.55 |
| 16 | | 6.994 | ASP | 0.229 | | | | |
| 17 | Lens 8 | 3.228 | ASP | 0.689 | Plastic | 1.544 | 56.0 | 10.46 |
| 18 | | 6.900 | ASP | 1.032/1.062 | | | | |
| 19 | Lens 9 | −8.117 | ASP | 0.714 | Plastic | 1.534 | 55.9 | −6.20 |
| 20 | | 5.762 | ASP | −1.500 | | | | |
| 21 | Second Stop | Plano | | 2.000 | | | | |
| 22 | Filter | Plano | | 0.210 | Glass | 1.517 | 64.2 | — |
| 23 | | Plano | | 0.386/0.459 | | | | |
| 24 | Image Surface | Plano | | — | | | | |

Remark: Reference wavelength is d-line 587.6 nm.
* The effective radius of Surface 8 is 1.860 mm.
* The effective radius of Surface 21 is 5.910 mm.

TABLE 16

Aspheric Coefficient

| Surface # | 2 | 3 | 4 | 5 | 6 | 7 |
|---|---|---|---|---|---|---|
| k= | −3.6970E−01 | −2.9196E+01 | 9.9899E+00 | 5.0171E+00 | −6.5623E+01 | 1.2687E+01 |
| A4= | 3.0893E−03 | −1.6802E−02 | −2.2355E−02 | −1.1638E−02 | −1.8988E−02 | −1.3815E−02 |
| A6= | 9.2110E−04 | 2.2336E−02 | 2.5457E−02 | 1.0342E−02 | 2.4998E−03 | 1.4739E−03 |
| A8= | −6.7480E−04 | −1.3582E−02 | −1.4137E−02 | −7.4706E−03 | −3.1646E−03 | −6.9329E−03 |
| A10= | 5.7422E−04 | 5.0782E−03 | 4.8111E−03 | 3.6387E−03 | 2.3837E−03 | 5.4222E−03 |
| A12= | −2.4091E−04 | −1.1526E−03 | −8.7594E−04 | −9.2912E−04 | −6.7564E−04 | −1.4671E−03 |
| A14= | 5.2347E−05 | 1.4780E−04 | 6.9555E−05 | 1.0208E−04 | 6.0788E−05 | 1.4052E−04 |
| A16= | −4.7657E−06 | −8.5064E−06 | | | | |

TABLE 16-continued

Aspheric Coefficient

| Surface # | 9 | 10 | 11 | 12 | 13 | 14 |
|---|---|---|---|---|---|---|
| k= | 5.0000E+01 | −1.7175E+01 | 5.0000E+01 | 2.6791E+01 | 1.3941E+01 | −2.6770E+01 |
| A4= | −2.6813E−03 | −6.9926E−03 | −3.9571E−03 | 2.4704E−02 | 1.6653E−02 | −2.2475E−03 |
| A6= | 1.0185E−02 | −1.6928E−03 | −4.1299E−03 | −2.4193E−02 | −2.2086E−02 | −1.5712E−02 |
| A8= | −2.1215E−02 | −2.1374E−03 | −1.1881E−02 | 7.7232E−03 | 1.0243E−02 | 9.0839E−03 |
| A10= | 1.4860E−02 | 2.0345E−03 | 1.3896E−02 | −1.3785E−03 | −2.9670E−03 | −2.8352E−03 |
| A12= | −5.2763E−03 | −9.4161E−04 | −7.6145E−03 | 2.3939E−04 | 5.9148E−04 | 5.4239E−04 |
| A14= | 9.8054E−04 | 2.2449E−04 | 2.4692E−03 | −3.9215E−05 | −7.5900E−05 | −6.2794E−05 |
| A16= | −7.4418E−05 | −1.9426E−05 | −4.6873E−04 | 3.6436E−06 | 5.4270E−06 | 4.2413E−06 |
| A18= | | | 4.7735E−05 | −1.2934E−07 | −1.6074E−07 | −1.5288E−07 |
| A20= | | | −2.0141E−06 | | | 2.2564E−09 |

| Surface # | 15 | 16 | 17 | 18 | 19 | 20 |
|---|---|---|---|---|---|---|
| k= | 3.6320E−19 | −1.2994E+01 | −1.2817E+00 | −1.2488E+01 | −5.7634E−02 | −1.0087E+0 |
| A4= | 1.4008E−02 | −1.9542E−03 | −2.2436E−02 | 9.7567E−03 | −2.8307E−02 | −3.2141E−02 |
| A6= | −1.4826E−02 | −6.1642E−03 | −4.2652E−04 | −8.0607E−03 | 4.5049E−03 | 4.9224E−03 |
| A8= | 5.1384E−03 | 2.0315E−03 | −9.2564E−04 | 1.3779E−03 | −3.0999E−04 | −5.0203E−04 |
| A10= | −1.2404E−03 | −3.5358E−04 | 4.4717E−04 | −8.5915E−05 | 6.5590E−06 | 3.1555E−05 |
| A12= | 2.0940E−04 | 3.2318E−05 | −8.0460E−05 | −3.0586E−06 | 5.8618E−07 | −1.1137E−06 |
| A14= | −2.5704E−05 | −1.1526E−06 | 7.5847E−06 | 7.8751E−07 | −5.2241E−08 | 1.4646E−08 |
| A16= | 2.1504E−06 | −3.0099E−08 | −3.9754E−07 | −4.8424E−08 | 1.8220E−09 | 3.0818E−10 |
| A18= | −1.0349E−07 | 3.4557E−09 | 1.0987E−08 | 1.3507E−09 | −3.0840E−11 | −1.2673E−11 |
| A20= | 2.0874E−09 | −7.2187E−11 | −1.2519E−10 | −1.4752E−11 | 2.0816E−13 | 1.1931E−13 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again, wherein HFOVinf and HFOVmacro are the half of a maximum field of view when the object distance is infinite and 500 mm, respectively.

Moreover, these parameters can be calculated from TABLE 15 and TABLE 16 and satisfy the conditions stated in table below.

| 8th Embodiment | | | |
|---|---|---|---|
| finf [mm] | 7.60 | ImgH [mm] | 7.145 |
| Fnoinf | 1.94 | ImgH/finf | 0.94 |
| HFOVinf [deg.] | 42.5 | ImgH/BLinf | 6.52 |
| HFOVmacro [deg.] | 42.2 | TLinf/finf | 1.17 |
| Nmax | 1.686 | TLinf/ImgH | 1.24 |
| Vdmin | 18.4 | Y11/Ylast | 0.35 |
| ΣCT/TLinf | 0.55 | \|(ATinf − ATmacro)\|*10 [mm] | 0.30 |
| finf/EPDinf | 1.94 | \|(ATinf − ATmacro)\|/CTmin | 0.10 |
| SLinf/TLinf | 0.91 | \|(ATinf − ATmacro)/(TLinf − TLmacro)\| | 0.29 |
| TLinf [mm] | 8.88 | \|(ATinf − ATmacro)/(BLinf − BLmacro)\| | 0.41 |

9th Embodiment

Figure 9A:
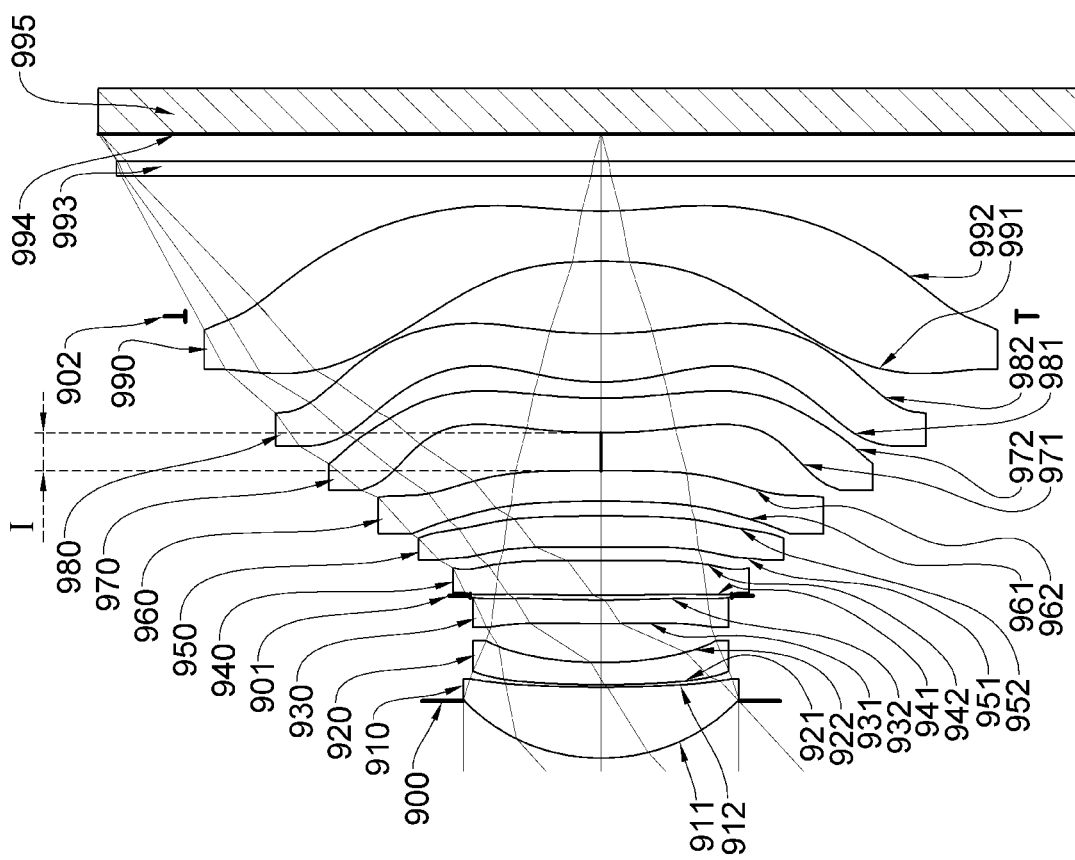
FIG. 9A is a schematic view of an imaging apparatus according to the 9th embodiment of the present disclosure.
Figure 9B:
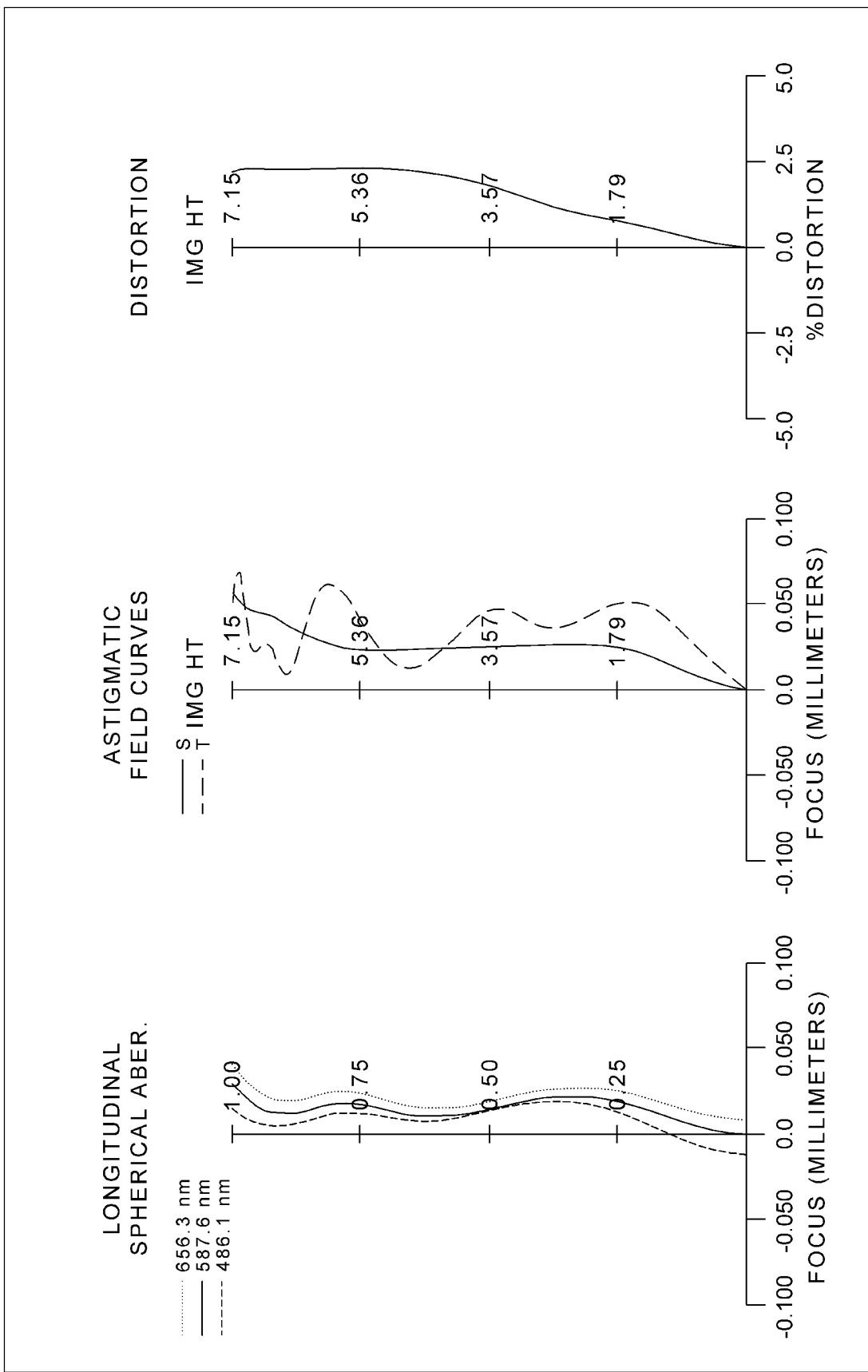
FIG. 9B shows longitudinal spherical aberration curves, astigmatic field curves and a distortion curve of the imaging apparatus according to the 9th embodiment.

The imaging apparatus of the 9th embodiment of the present invention uses the same optical system as the 8th embodiment. FIG. 9A is a schematic view of an imaging apparatus according to the 9th embodiment of the present disclosure when the object distance is infinite. FIG. 9B shows, in order from left to right, longitudinal spherical aberration curves, astigmatic field curves and a distortion curve of the imaging apparatus according to the 9th embodiment.

In FIG. 9A, the imaging apparatus includes a photographing optical lens assembly (not otherwise herein labeled) of the present disclosure and an image sensor 995. The photographing optical lens assembly includes, in order from an object side to an image side, an aperture stop 900, a first lens element 910, a second lens element 920, a third lens element 930, a first stop 901, a fourth lens element 940, a fifth lens element 950, a sixth lens element 960, a seventh lens element 970, an eighth lens element 980, a ninth lens element 990, a second stop 902, a filter 993, and an image surface 994. There are air gaps in the paraxial region between adjacent lens elements among the first lens element 910, the second lens element 920, the third lens element 930, the fourth lens element 940, the fifth lens element 950, the sixth lens element 960, the seventh lens element 970, the eighth lens element 980, and the ninth lens element 990. There is a variable axial distance I between the sixth lens element 960 and the seventh lens element 970, and it can be realized by the driving device shown in FIG. 11A or FIG. 11B.

The detailed optical data of the 9th embodiment are shown in TABLE 17, and the aspheric surface data are shown in TABLE 18.

TABLE 17

(9th Embodiment) Infinity /Macro
f = 7.60/7.60 mm, Fno = 1.94/2.00, HFOV = 42.5/42.3 deg.

| Surface # | | Curvature Radius | | Thickness Infinity/Macro | Material | Index | Abbe # | Focal Length |
|---|---|---|---|---|---|---|---|---|
| 0 | Object | Plano | | Infinity/500 | | | | |
| 1 | Ape. Stop | Plano | | −0.815 | | | | |
| 2 | Lens 1 | 2.794 | ASP | 1.008 | Plastic | 1.545 | 56.1 | 6.02 |
| 3 | | 16.439 | ASP | 0.035 | | | | |
| 4 | Lens 2 | 11.763 | ASP | 0.315 | Plastic | 1.620 | 23.4 | −14.76 |
| 5 | | 5.092 | ASP | 0.554 | | | | |
| 6 | Lens 3 | 21.653 | ASP | 0.335 | Plastic | 1.686 | 18.4 | −54.41 |
| 7 | | 13.617 | ASP | 0.062 | | | | |
| 8 | First Stop | Plano | | 0.006 | | | | |
| 9 | Lens 4 | 27.178 | ASP | 0.494 | Plastic | 1.544 | 56.0 | 64.09 |
| 10 | | 122.430 | ASP | 0.191 | | | | |
| 11 | Lens 5 | 50.720 | ASP | 0.448 | Plastic | 1.544 | 56.0 | 22.82 |
| 12 | | −16.389 | ASP | 0.210 | | | | |
| 13 | Lens 6 | −14.141 | ASP | 0.431 | Plastic | 1.577 | 33.5 | −27.16 |
| 14 | | −145.706 | ASP | 0.543 /0.563 | | | | |
| 15 | Lens 7 | 8.904 | ASP | 0.493 | Plastic | 1.566 | 37.4 | −63.55 |
| 16 | | 6.994 | ASP | 0.229 | | | | |
| 17 | Lens 8 | 3.228 | ASP | 0.689 | Plastic | 1.544 | 56.0 | 10.46 |
| 18 | | 6.900 | ASP | 1.032 | | | | |
| 19 | Lens 9 | −8.117 | ASP | 0.714 | Plastic | 1.534 | 55.9 | −6.20 |
| 20 | | 5.762 | ASP | −1.500 | | | | |
| 21 | Second Stop | Plano | | 2.000 | | | | |
| 22 | Filter | Plano | | 0.210 | Glass | 1.517 | 64.2 | — |
| 23 | | Plano | | 0.386/0.486 | | | | |
| 24 | Image Surface | Plano | | — | | | | |

Remark: Reference wavelength is d-line 587.6 nm.
* The effective radius of Surface 8 is 1.860 mm.
* The effective radius of Surface 21 is 5.910 mm.

TABLE 18

Aspheric Coefficient

| Surface # | 2 | 3 | 4 | 5 | 6 | 7 |
|---|---|---|---|---|---|---|
| k= | −3.6970E−01 | −2.9196E+01 | 9.9899E+00 | 5.0171E+00 | −6.5623E+01 | 1.2687E+01 |
| A4= | 3.0893E−03 | −1.6802E−02 | −2.2355E−02 | −1.1638E−02 | −1.8988E−02 | −1.3815E−02 |
| A6= | 9.2110E−04 | 2.2336E−02 | 2.5457E−02 | 1.0342E−02 | 2.4998E−03 | 1.4739E−03 |
| A8= | −6.7480E−04 | −1.3582E−02 | −1.4137E−02 | −7.4706E−03 | −3.1646E−03 | −6.9329E−03 |
| A10= | 5.7422E−04 | 5.0782E−03 | 4.8111E−03 | 3.6387E−03 | 2.3837E−03 | 5.4222E−03 |
| A12= | −2.4091E−04 | −1.1526E−03 | −8.7594E−04 | −9.2912E−04 | −6.7564E−04 | −1.4671E−03 |
| A14= | 5.2347E−05 | 1.4780E−04 | 6.9555E−05 | 1.0208E−04 | 6.0788E−05 | 1.4052E−04 |
| A16= | −4.7657E−06 | −8.5064E−06 | | | | |

| Surface # | 9 | 10 | 11 | 12 | 13 | 14 |
|---|---|---|---|---|---|---|
| k= | 5.0000E+01 | −1.7175E+01 | 5.0000E+01 | 2.6791E+01 | 1.3941E+01 | −2.6770E+01 |
| A4= | −2.6813E−03 | −6.9926E−03 | −3.9571E−03 | 2.4704E−02 | 1.6653E−02 | −2.2475E−03 |
| A6= | 1.0185E−02 | −1.6928E−03 | −4.1299E−03 | −2.4193E−02 | −2.2086E−02 | −1.5712E−02 |
| A8= | −2.1215E−02 | −2.1374E−03 | −1.1881E−02 | 7.7232E−03 | 1.0243E−02 | 9.0839E−03 |
| A10= | 1.4860E−02 | 2.0345E−03 | 1.3896E−02 | −1.3785E−03 | −2.9670E−03 | −2.8352E−03 |
| A12= | −5.2763E−03 | −9.4161E−04 | −7.6145E−03 | 2.3939E−04 | 5.9148E−04 | 5.4239E−04 |
| A14= | 9.8054E−04 | 2.2449E−04 | 2.4692E−03 | −3.9215E−05 | −7.5900E−05 | −6.2794E−05 |
| A16= | −7.4418E−05 | −1.9426E−05 | −4.6873E−04 | 3.6436E−06 | 5.4270E−06 | 4.2413E−06 |
| A18= | | | 4.7735E−05 | −1.2934E−07 | −1.6074E−07 | −1.5288E−07 |
| A20= | | | −2.0141E−06 | | | 2.2564E−09 |

TABLE 18-continued

| Aspheric Coefficient | | | | | | |
|---|---|---|---|---|---|---|
| Surface # | 15 | 16 | 17 | 18 | 19 | 20 |
| k= | 3.6320E−19 | −1.2994E+01 | −1.2817E+00 | −1.2488E+01 | −5.7634E−02 | −1.0087E+00 |
| A4= | 1.4008E−02 | −1.9542E−03 | −2.2436E−02 | 9.7567E−03 | −2.8307E−02 | −3.2141E−02 |
| A6= | −1.4826E−02 | −6.1642E−03 | −4.2652E−02 | −8.0607E−03 | 4.5049E−03 | 4.9224E−03 |
| A8= | 5.1384E−03 | 2.0315E−03 | −9.2564E−04 | 1.3779E−03 | −3.0999E−04 | −5.0203E−04 |
| A10= | −1.2404E−03 | −3.5358E−04 | 4.4717E−04 | −8.5915E−05 | 6.5590E−06 | 3.1555E−05 |
| A12= | 2.0940E−04 | 3.2318E−05 | −8.0460E−05 | −3.0586E−06 | 5.8618E−07 | −1.1137E−06 |
| A14= | −2.5704E−05 | −1.1526E−06 | 7.5847E−06 | 7.8751E−07 | −5.2241E−08 | 1.4646E−08 |
| A16= | 2.1504E−06 | −3.0099E−08 | −3.9754E−07 | −4.8424E−08 | 1.8220E−09 | 3.0818E−10 |
| A18= | −1.0349E−07 | 3.4557E−09 | 1.0987E−08 | 1.3507E−09 | −3.0840E−11 | −1.2673E−11 |
| A20= | 2.0874E−09 | −7.2187E−11 | −1.2519E−10 | −1.4752E−11 | 2.0816E−13 | 1.1931E−13 |

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again, wherein HFOVinf and HFOVmacro are the half of a maximum field of view when the object distance is infinite and 500 mm, respectively.

Moreover, these parameters can be calculated from TABLE 17 and TABLE 18 and satisfy the conditions stated in table below.

| 9th Embodiment | | | |
|---|---|---|---|
| finf [mm] | 7.60 | ImgH [mm] | 7.145 |
| Fnoinf | 1.94 | ImgH/finf | 0.94 |
| HFOVinf [deg.] | 42.5 | ImgH/BLinf | 6.52 |
| HFOVmacro [deg.] | 42.3 | TLinf/finf | 1.17 |
| Nmax | 1.686 | TLinf/ImgH | 1.24 |
| Vdmin | 18.4 | Y11/Ylast | 0.35 |
| ΣCT/TLinf | 0.55 | |(ATinf − ATmacro)|*10 [mm] | 0.20 |
| finf/EPDinf | 1.94 | |(ATinf − ATmacro)|/CTmin | 0.06 |
| SLinf/TLinf | 0.91 | |(ATinf − ATmacro)/(TLinf − TLmacro)| | 0.17 |
| TLinf [mm] | 8.88 | |(ATinf − ATmacro)/(BLinf − BLmacro)| | 0.20 |

10th Embodiment

Figure 14:
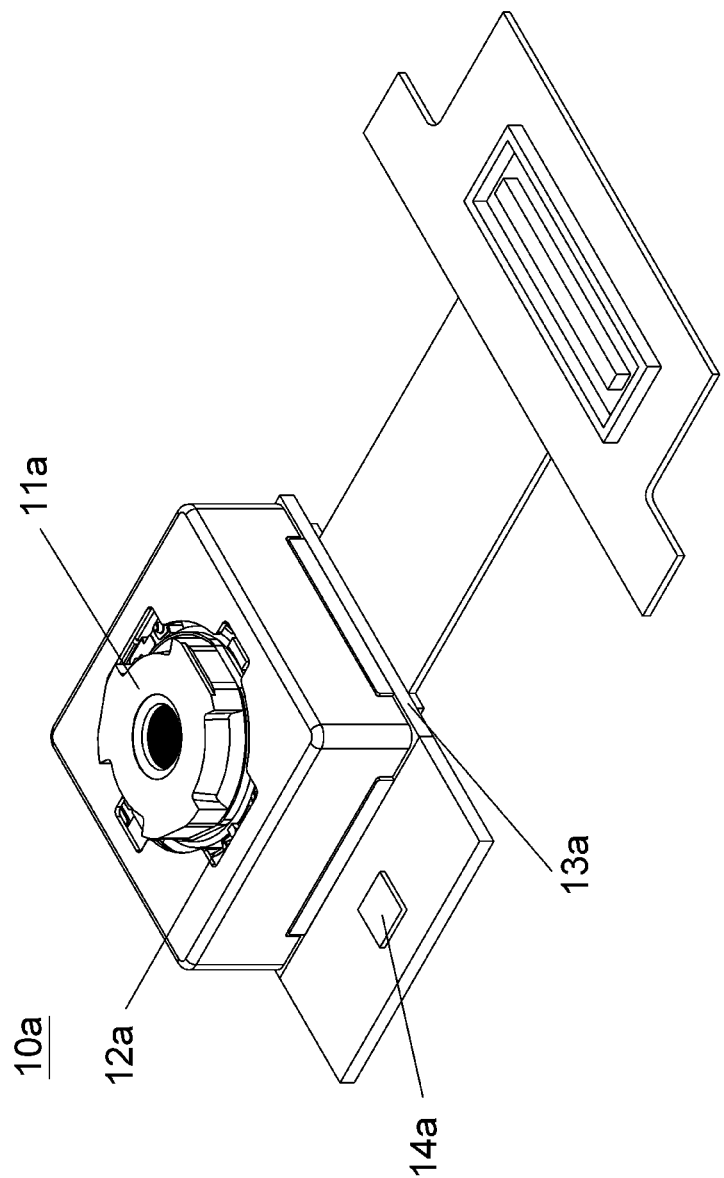
FIG. 14 shows a perspective view according to the 10th embodiment of the present disclosure.

FIG. 14 is a 3-dimensional schematic view of an imaging apparatus 10a according to the 10th embodiment of the present disclosure. In the present embodiment, the imaging apparatus 10a is a camera module. The imaging apparatus 10a includes a photographing optical lens assembly 11a, a driving device 12a and an image sensor 13a. The photographing optical lens assembly 11a includes the photographing optical lens assembly of the 1st embodiment described above and a lens barrel (not otherwise herein labeled) for carrying the photographing optical lens assembly. The imaging apparatus 10a uses the photographing optical lens assembly 11a to converge light and generates an image by, utilizes the driving device 12a for focusing so as to photograph on the image sensor 13a (that is the image sensor 195 in the 1st embodiment), and outputs the image data thereafter.

The driving device 12a may be an auto-focus module that can be driven by a voice coil motor (VCM), a micro electro-mechanical system (MEMS), a piezoelectric system, shape memory alloys or other driving systems. The driving device 12a allows the photographing optical lens assembly 11a to obtain a better imaging position, so that a clear image can be obtained wherever an imaged object is at different object distances. The driving device 12a may include a first driving device, a second driving device, and a third driving device (not shown in the figure). The configuration of each driving device can refer to FIG. 11A, FIG. 11B and FIG. 13A, FIG. 13B so as to provide changes of the variable axial distances on the optical axis in the photographing optical lens assembly 11a in order to provide photographing options at infinity or macro.

The imaging apparatus 10a may be equipped with an image sensor 13a (e.g., CMOS, CCD) with high sensitivity and low noise on the image surface to provide accurate and satisfactory quality of the image from the photographing optical lens assembly.

In addition, the imaging apparatus 10a may further include an image stabilizer 14a, which may be a motion sensing element such as an accelerometer, a gyro sensor or a Hall Effect sensor. The image stabilizer 14a in the 10th embodiment is a gyro sensor but is not limited thereto. By adjusting the photographing optical lens assembly in different axial directions to provide compensation for image blurs due to motion during exposures, the image quality under dynamic and low-light circumstances can be further improved, and enhanced image compensation functions such as optical image stabilization (OIS) or electronic image stabilization (EIS) can also be provided.

The imaging apparatus 10a of the present disclosure is not limited to be applied to the smartphone. The imaging apparatus 10a may be used in a system of moving focus and features excellent aberration corrections with satisfactory image quality. For example, the imaging apparatus 10a may be applied to a variety of applications such as car electronics, drones, smart electronic products, tablet computers, wearable devices, medical devices, precision instruments, surveillance cameras, portable video recorders, identifica-

11th Embodiment

Figure 15B:
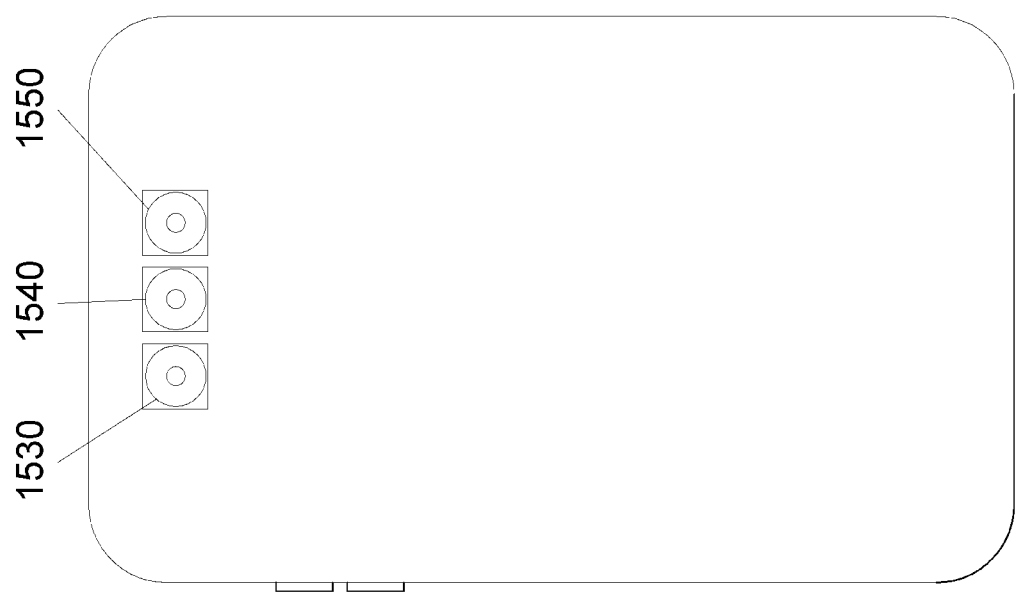
FIG. 15B is a rear view of the electronic device according to the 11th embodiment of the present disclosure.

Please refer to FIG. 15A and FIG. 15B. FIG. 15A is a front view of an electronic device 1500. FIG. 15B is a rear view of the electronic device 1500 shown in the FIG. 15A. In the present embodiment, the electronic device 1500 is a smartphone. The electronic device 1500 includes a display 1510 and an imaging apparatus 1520 on the front side thereof. The imaging apparatus 1520 can be implemented by any one of the 1st embodiment to the 9th embodiment of the present disclosure and adopts a non-circular opening configuration.

As shown in FIG. 15B, the electronic device 1500 includes an imaging apparatus 1530, an imaging apparatus 1540 and an imaging apparatus 1550 on the back side thereof. The imaging apparatus 1530 is a telephoto configuration, the imaging apparatus 1540 is a wide-angle configuration and the imaging apparatus 1550 is an ultra-wide angle configuration. The difference in the fields of view between each of the imaging apparatus 1530, the imaging apparatus 1540 and the imaging apparatus 1550 is at least 30 degrees.

12th Embodiment

Figure 16A:
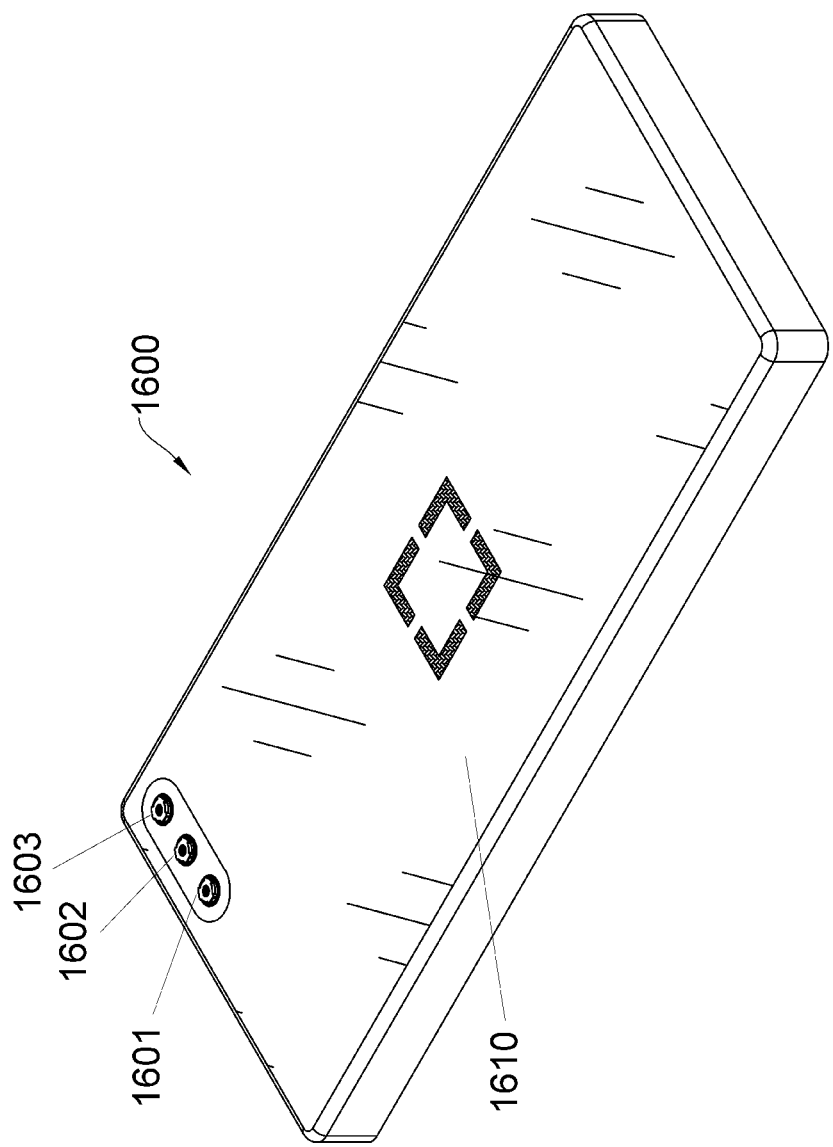
FIG. 16A is a front view of the electronic device according to the 12th embodiment of the present disclosure.
Figure 16B:
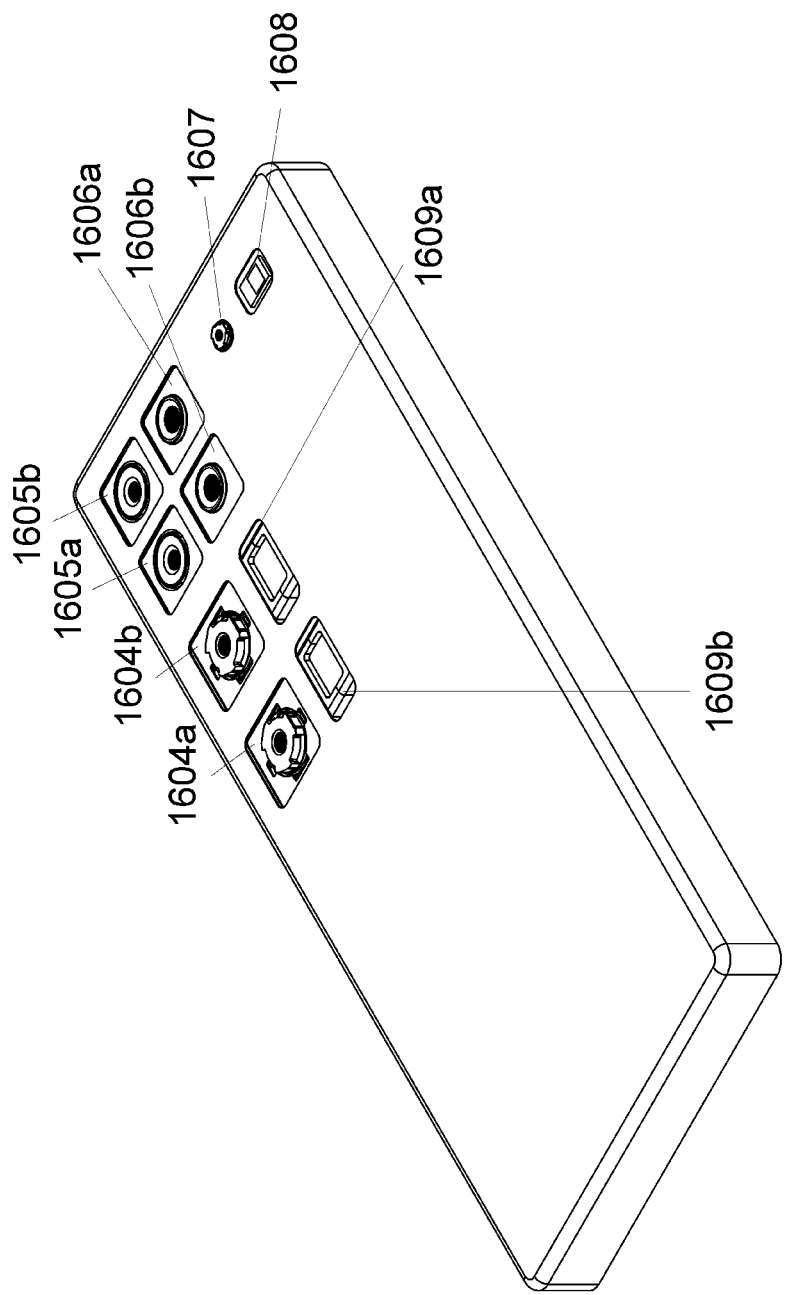
FIG. 16B is a rear view of the electronic device according to the 12th embodiment of the present disclosure.

Please refer to FIG. 16A and FIG. 16B. FIG. 16A is a front view of an electronic device 1600 according to the 12th embodiment of the present disclosure. FIG. 16B is a rear view of the electronic device 1600 shown in the FIG. 16A. In the present embodiment, the electronic device 1600 is a smartphone. As shown in FIG. 16A, the electronic device 1600 includes a display 1610, a TOF (Time of Flight) module 1601, an imaging apparatus 1602 and an imaging apparatus 1603 on the front side thereof. The imaging apparatus 1602 and the imaging apparatus 1603 are positioned above the top of the display 1610, facing toward the same direction and being arranged horizontally on the upper edge of electronic device 1600. The imaging apparatus 1602 is an ultra-wide angle configuration, and the imaging apparatus 1603 is a wide-angle configuration. The field of view of the imaging apparatus 1602 is larger than that of the imaging apparatus 1603 by at least 30 degrees.

As shown in FIG. 16B, the electronic device 1600 includes a TOF (Time of Flight) module 1607, a flash module 1608, an imaging apparatus 1604a, an imaging apparatus 1604b, an imaging apparatus 1605a, an imaging apparatus 1605b, an imaging apparatus 1606a, an imaging apparatus 1606b, an imaging apparatus 1609a and an imaging apparatus 1609b on the back side thereof. The imaging apparatus 1604a, the imaging apparatus 1604b, the imaging apparatus 1605a, the imaging apparatus 1605b, the imaging apparatus 1606a, the imaging apparatus 1606b, the imaging apparatus 1609a and the imaging apparatus 1609b face toward the same direction, and being divided into two rows vertically arranged on the back side of the electronic device 1600. The TOF (Time of Flight) module 1607 and the flash module 1608 are disposed on the upper edge of the back side of the electronic device 1600. The imaging apparatuses 1604a, 1604b are wide-angle configurations utilizing the photographing optical lens assembly according to the 1st embodiment of the present disclosure. The imaging apparatuses 1605a, 1605b are ultra-wide angle configurations. The imaging apparatuses 1606a, 1606b are telephoto configurations. The imaging apparatuses 1609a, 1609b are telephoto configurations with non-circular openings and containing at least one optical element which allow directional changes of the optical path. The fields of view of the imaging apparatuses 1605a, 1605b are larger than that of the imaging apparatuses 1604a, 1604b by at least 30 degrees. The fields of view of the imaging apparatuses 1604a, 1604b are larger than that of the imaging apparatus 1606a, 1606b, 1609a, and 1609b by at least 30 degrees.

The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging apparatus, comprising a photographing optical lens assembly and an image sensor;
    the photographing optical lens assembly comprising a plurality of lens elements which is at least eight and at most ten lens elements, the plurality of lens elements comprising, in order from an object side to an image side, a first lens element, a second lens element and a last lens element; each of the plurality of lens elements having an object-side surface facing the object side and an image-side surface facing the image side, and the image sensor being disposed on the image side of the last lens element;
    wherein the object-side surface of a seventh lens element is convex in a paraxial region thereof, at least one of the lens elements is plastic, and at least one of the lens elements comprises at least one inflection point; there is at least one variable axial distance between two adjacent lens elements thereof;
    wherein a minimum among Abbe numbers of the lens elements of the photographing optical lens assembly is Vdmin; the photographing optical lens assembly comprises an object distance between an imaged object and the object-side surface of the first lens element; when the object distance is infinite, an axial distance between the object-side surface of the first lens element and the image sensor is TLinf, a focal length of the photographing optical lens assembly is finf, and an any one of the at least one variable axial distance is ATinf; when the object distance is 500 mm, the any one of the at least one variable axial distance is ATmacro, and the axial distance between the object-side surface of the first lens element and the image sensor is TLmacro, an axial distance between the first lens element and the second lens element is smaller than an axial distance between the seventh lens element and an eighth lens element; and the following conditions are satisfied:

0.60<TLinf/finf<2.50;

10.0<Vdmin<28.0; and 0.05<|(ATinf−ATmacro)/(TLinf−TLmacro)|<0.80.

2. The imaging apparatus of claim 1, wherein the first lens element has positive refractive power, the second lens element has negative refractive power, a maximum among refractive indexes of the lens elements of the photographing optical lens assembly is Nmax, and the following condition is satisfied:

1.665<Nmax<1.780.

3. The imaging apparatus of claim 1, wherein when the object distance is infinite, the focal length of the photographing optical lens assembly is finf, and an entrance pupil diameter of the photographing optical lens assembly is EPDinf, and the following condition is satisfied:

1.20<finf/EPDinf<2.0.

4. The imaging apparatus of claim 1, wherein the minimum among Abbe numbers of the lens elements of the photographing optical lens assembly is Vdmin, and the following condition is satisfied:

12.0<Vdmin<20.0.

5. The imaging apparatus of claim 1, wherein a minimum among central thicknesses of the lens elements of the photographing optical lens assembly is CTmin; when the object distance is infinite, the any one of the at least one variable axial distance is ATinf; when the object distance is 500 mm, the any one of the at least one variable axial distance is ATmacro, and the following condition is satisfied:

0.01<|(ATinf−ATmacro)|/CTmin<0.50.

6. The imaging apparatus of claim 1, wherein when the object distance is infinite, half of a maximum field of view of the photographing optical lens assembly is HFOVinf; when the object distance is 500 mm, half of a maximum field of view of the photographing optical lens assembly is HFOVmacro, and the following conditions are satisfied:

35.0 degrees<HFOVinf<65.0 degrees; and 35.0 degrees<HFOVmacro<65.0 degrees.

7. The imaging apparatus of claim 1, wherein the photographing optical lens assembly comprises an aperture stop; when the object distance is infinite, an axial distance between the aperture stop and the image sensor is SLinf, the axial distance between the object-side surface of the first lens element and the image sensor is TLinf, and the following condition is satisfied:

0.70<SLinf/TLinf<1.0.

8. The imaging apparatus of claim 1, wherein a sum of central thicknesses of the lens elements is ΣCT, a maximal image height of the photographing optical lens assembly is ImgH; when the object distance is infinite, the axial distance between the object-side surface of the first lens element and the image sensor is TLinf, and the following conditions are satisfied:

0.48<ΣCT/TLinf<0.80; and 5.20 mm<ImgH<10.0 mm.

9. The imaging apparatus of claim 1, wherein a maximal image height of the photographing optical lens assembly is ImgH; when the object distance is infinite, the axial distance between the object-side surface of the first lens element and the image sensor is TLinf, and the following condition is satisfied:

1.0<TLinf/ImgH<1.80.

10. The imaging apparatus of claim 1, wherein a maximal image height of the photographing optical lens assembly is ImgH; when the object distance is infinite, the any one of the at least one variable axial distance is ATinf, an axial distance between the image-side surface of the last lens element and the image sensor is BLinf, the focal length of the photographing optical lens assembly is finf; when the object distance is 500 mm, the any one of the at least one variable axial distance is ATmacro, the axial distance between the image-side surface of the last lens element and the image sensor is BLmacro, and the following conditions are satisfied:

0.07<|(ATinf−ATmacro)/(BLinf−BLmacro)|<0.90; and 0.72<ImgH/finf<1.80.

11. The imaging apparatus of claim 1, wherein the last lens element has negative refractive power; a maximal image height of the photographing optical lens assembly is ImgH; when the object distance is infinite, an axial distance between the image-side surface of the last lens element and the image sensor is BLinf, and the following condition is satisfied:

3.70<ImgH/BLinf<10.0.

12. The imaging apparatus of claim 1, wherein the imaging apparatus comprises a first driving device and a second driving device; the image-side surface of the last lens element is concave in a paraxial region thereof and comprises a convex critical point in an off-axial region thereof.

13. The imaging apparatus of claim 12, wherein a central region of an image is corrected when at least one of the plurality of lens elements is moved by the first driving device, and a peripheral region of the image is corrected when at least one of the plurality of lens elements is moved by the second driving device.

14. The imaging apparatus of claim 12, wherein at least one of the first driving device and the second driving device comprises shape memory alloys or piezoelectric materials.

15. The imaging apparatus of claim 12, wherein when the first driving device is actuated, an axial distance between any two lens elements of the photographing optical lens assembly remains the same; the image sensor comprises at least 50 million pixels.

16. The imaging apparatus of claim 12, wherein the at least one variable axial distance changes between the two adjacent lens elements when the second driving device moves one of the two adjacent lens elements; when the object distance is infinite, the any one of the at least one variable axial distance is ATinf; when the object distance is 500 mm, the any one of the at least one variable axial distance is ATmacro; and the following condition is satisfied:

0.07 mm<|(ATinf−ATmacro)|*10<1.0 mm.

17. The imaging apparatus of claim 12, wherein there is a displacement of the second driving device when the first driving device is actuated.

18. The imaging apparatus of claim 1, wherein an Abbe number of a lens element of the photographing optical lens assembly is V, and at least two lens elements in the photographing optical lens assembly satisfy the following condition:

$$V<20.0.$$

19. The imaging apparatus of claim 1, wherein there is one variable axial distance in the photographing optical lens assembly.

20. The imaging apparatus of claim 1, wherein the variable axial distance is disposed on the image side of the sixth lens element.

21. The imaging apparatus of claim 1, wherein an axial distance between two adjacent lens elements which are closest to the image sensor is a maximum among all axial distances between adjacent lens elements of the photographing optical lens assembly.

22. The imaging apparatus of claim 1, wherein the imaging apparatus comprises an optical image stabilization device.

23. An electronic device, comprising at least two imaging apparatuses facing a same side, wherein the at least two imaging apparatuses comprise:
- a first imaging apparatus, comprising the imaging apparatus of claim 1; and
- a second imaging apparatus, comprising an optical lens assembly and an image sensor;
- wherein a field of view of the first imaging apparatus differs from a field of view of the second imaging apparatus by at least 30 degrees.

* * * * *